(12) United States Patent
Berrocal et al.

(10) Patent No.: US 11,097,390 B2
(45) Date of Patent: Aug. 24, 2021

(54) PNEUMATIC SAFETY INTERLOCK

(71) Applicant: ATI Industrial Automation, Inc., Apex, NC (US)

(72) Inventors: William G. Berrocal, Holly Springs, NC (US); Mack Earl Manning, Cary, NC (US); John M. Winterroth, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 16/550,928

(22) Filed: Aug. 26, 2019

(65) Prior Publication Data
US 2019/0375067 A1 Dec. 12, 2019

Related U.S. Application Data

(63) Continuation-in-part of application No. 14/939,113, filed on Nov. 12, 2015, now Pat. No. 10,661,449.
(Continued)

(51) Int. Cl.
*B23Q 3/155* (2006.01)
*B23B 31/30* (2006.01)
(Continued)

(52) U.S. Cl.
CPC .......... *B23Q 3/1554* (2013.01); *B23B 31/30* (2013.01); *B25J 15/0416* (2013.01);
(Continued)

(58) Field of Classification Search
CPC .. Y10S 483/901; Y10T 483/11; Y10T 483/13; Y10T 483/136; Y10T 483/138;
(Continued)

(56) References Cited

U.S. PATENT DOCUMENTS 3,788,658 A    1/1974  Benjamin
4,551,903 A  * 11/1985  Bisiach ............... B25J 15/0491
                                                              483/16
(Continued)

FOREIGN PATENT DOCUMENTS

DE    3812527 A1   10/1989
DE   29711064 U1    2/1998
(Continued)

OTHER PUBLICATIONS

European Patent Office (EPO) Machine Translation of WO2015074710A1—Kohler, Wolfgang, "Device and Method for Locking and Unlocking a Receiving Plate", May 28, 2015.*
(Continued)

*Primary Examiner* — Erica E Cadugan
*Assistant Examiner* — Michael Vitale
(74) *Attorney, Agent, or Firm* — Coats & Bennett, PLLC

(57) ABSTRACT

A robotic tool changer ensures inherently safe decoupling operation by only providing pneumatic fluid to a decouple port of a pneumatic coupling mechanism in the case that the tool changer is seated on, and properly aligned with, a tool stand. Pneumatic fluid to decouple the pneumatic coupling mechanism is routed from an air source to the tool stand. A pass-through in the tool stand returns the pneumatic fluid to a pneumatic path in the tool changer leading to a decouple port of the pneumatic coupling mechanism. Hence, the tool changer must be seated on the tool stand for the decouple port to receive pneumatic fluid to operate. Furthermore, a safety coupling is interposed on the pneumatic path between the tool stand and the decouple port. The safety coupling requires the tool changer to be seated on, and properly aligned with, the tool stand to effect the flow of pneumatic fluid—otherwise, the pneumatic fluid is bled to the atmosphere.

11 Claims, 40 Drawing Sheets

Related U.S. Application Data which is a continuation-in-part of application No. 14/749,708, filed on Jun. 25, 2015, now abandoned.

(60) Provisional application No. 62/067,200, filed on Oct. 22, 2014, provisional application No. 62/039,848, filed on Aug. 20, 2014.

(51) Int. Cl.
  *B25J 15/04* (2006.01)
  *B25J 19/06* (2006.01)

(52) U.S. Cl.
  CPC ........... *B25J 15/0491* (2013.01); *B25J 19/06* (2013.01); *Y10S 483/901* (2013.01); *Y10T 483/18* (2015.01)

(58) Field of Classification Search
  CPC ............... Y10T 483/17; Y10T 483/179; Y10T 483/1793; Y10T 483/18; B25J 15/048; B25J 15/0416; B25J 15/0425; B25J 15/0491
  USPC .......... 700/179; 483/2, 7, 10, 11, 16, 54, 55, 483/901, 58; 403/322.1, 322.2; 29/48.5 R
  See application file for complete search history.

(56) References Cited

U.S. PATENT DOCUMENTS

| | | | |
|---|---|---|---|
| 4,636,135 A | 1/1987 | Bancon | |
| 4,664,588 A | 5/1987 | Newell | |
| 4,767,257 A * | 8/1988 | Kato | B25J 19/0025 414/744.5 |
| 4,793,053 A | 12/1988 | Zuccaro et al. | |
| RE32,854 E | 2/1989 | McCormick et al. | |
| 4,826,230 A | 5/1989 | Truchet | |
| 5,018,266 A * | 5/1991 | Hutchinson | B23B 31/113 483/1 |
| 5,211,501 A | 5/1993 | Nakamura et al. | |
| 5,779,609 A * | 7/1998 | Cullen | B23K 9/287 219/98 |
| 6,101,888 A | 8/2000 | Yonezawa | |
| 6,457,916 B2 | 10/2002 | Wienhold | |
| 6,840,895 B2 | 1/2005 | Perry et al. | |
| 7,156,795 B2 | 1/2007 | Nolte et al. | |
| 7,252,453 B1 | 8/2007 | Little | |
| 8,005,570 B2 | 8/2011 | Gloden et al. | |
| 8,132,816 B2 | 3/2012 | Norton et al. | |
| 8,360,377 B2 * | 1/2013 | Geyer | B23Q 3/15553 248/309.1 |
| 2002/0192013 A1 * | 12/2002 | Ou | B25J 19/0029 403/68 |
| 2009/0314113 A1 * | 12/2009 | Wang | B25J 19/0029 74/148 |
| 2012/0021880 A1 * | 1/2012 | Grupp | B25J 15/04 483/69 |
| 2016/0059424 A1 * | 3/2016 | Zachary | B23B 31/1071 483/1 |
| 2016/0279806 A1 * | 9/2016 | Kikuchi | B25J 15/0425 |
| 2018/0009113 A1 * | 1/2018 | Lauder | B25J 15/0433 |

FOREIGN PATENT DOCUMENTS

| | | | | |
|---|---|---|---|---|
| DE | 102018130167 A1 * | 6/2019 | ......... | G06F 11/1633 |
| EP | 1245348 A1 | 10/2002 | | |
| JP | 01295780 A * | 11/1989 | ............. | B25J 15/04 |
| JP | H05169382 A | 7/1993 | | |
| JP | H06218686 A | 8/1994 | | |
| JP | H06246570 A | 9/1994 | | |
| JP | 2004148470 A | 5/2004 | | |
| WO | 2015074710 A1 | 5/2015 | | |

OTHER PUBLICATIONS

European Patent Office (EPO) Machine Translation of JPH05169382A—Nakamura et al., "Falling Preventative Device of Coupler for Automatic Tool Changer", Jul. 9, 1993.*

* cited by examiner

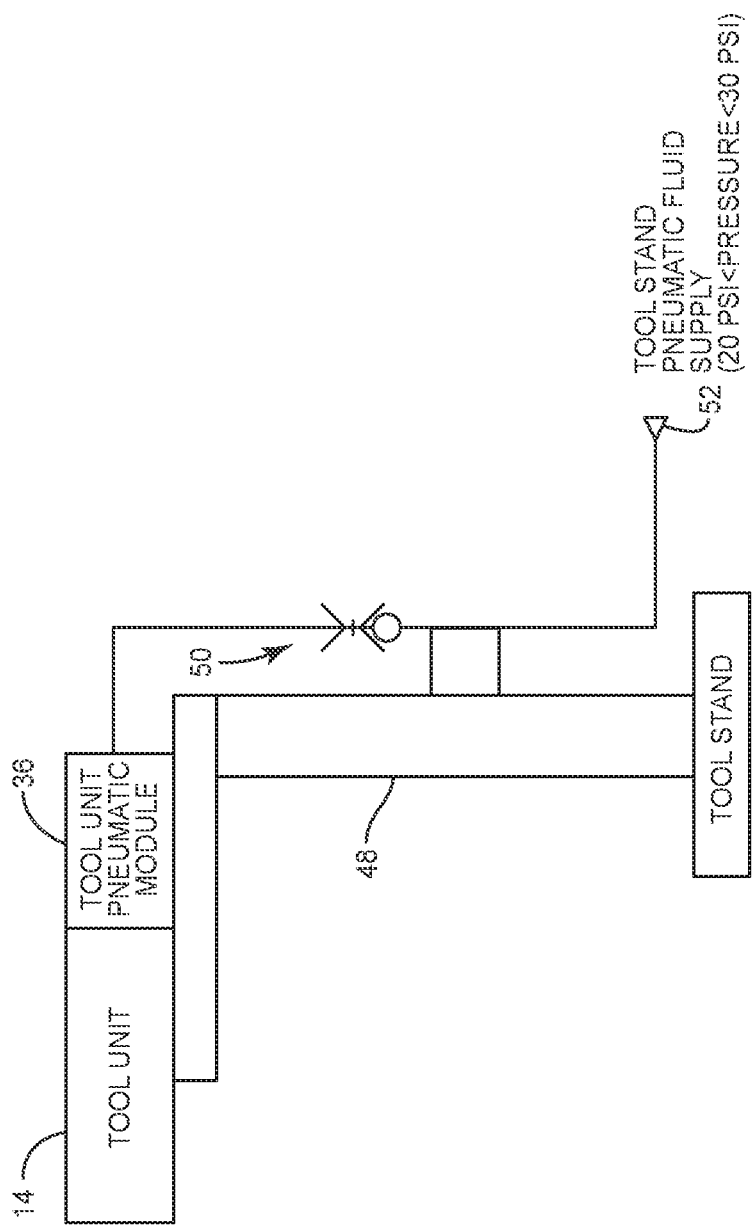

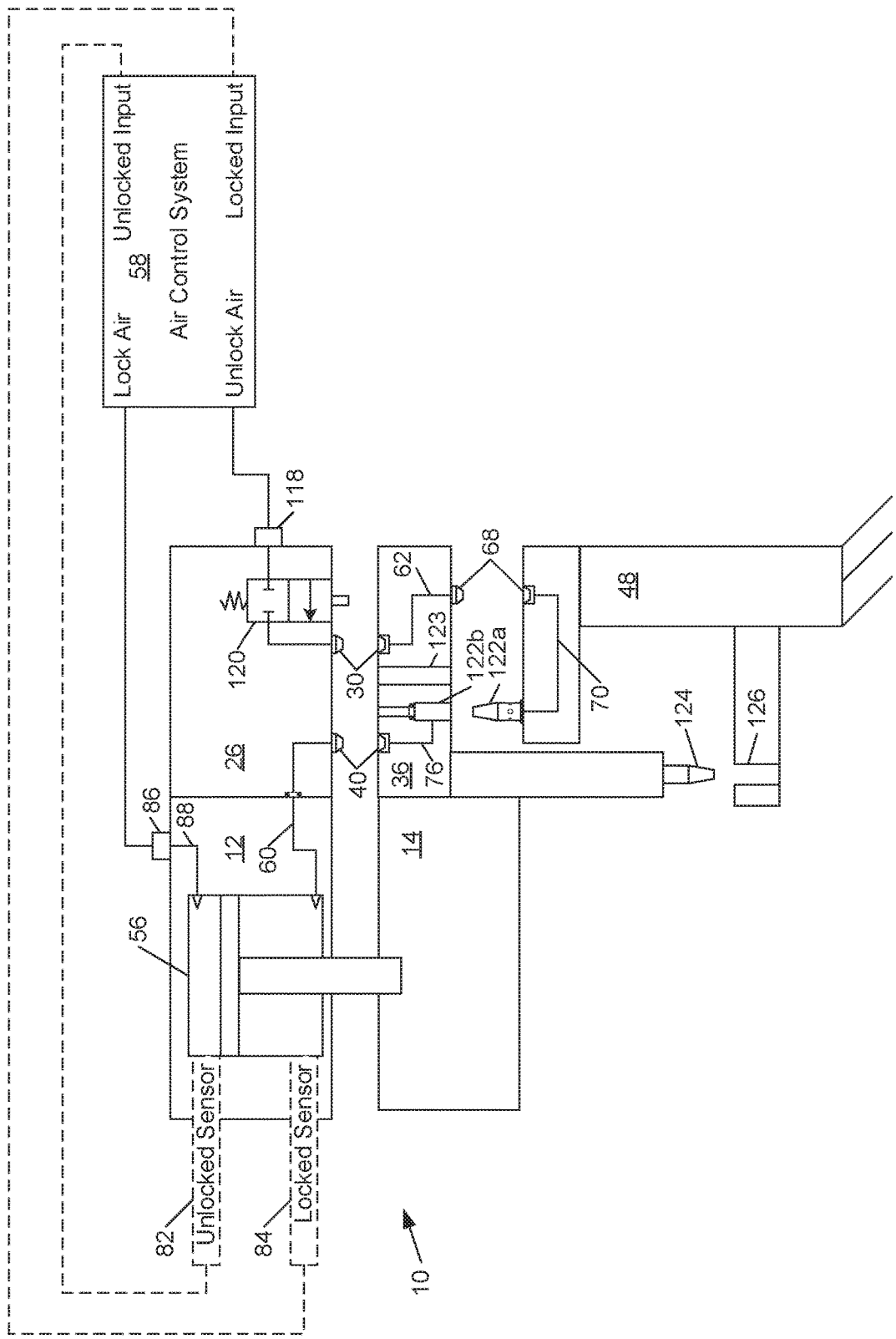

PNEUMATIC SAFETY INTERLOCK

RELATED APPLICATIONS

This application is a Continuation-in-Part of U.S. patent application Ser. No. 14/939,113, filed Nov. 12, 2015, which is Continuation-in-Part of U.S. patent application Ser. No. 14/749,708, filed Jun. 25, 2015, which claims priority to U.S. Provisional Patent Application Ser. Nos. 62/067,200, filed Oct. 22, 2014, and 62/039,848, filed Aug. 20, 2014, the disclosures of which are incorporated by reference herein, in their entireties.

FIELD OF INVENTION

The present invention relates generally to robotics, and in particular to an inherently safe robotic tool changer receiving power to decouple from a tool stand.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, it is cost-effective to utilize a relatively generic robot arm to accomplish a variety of tasks. For example, in an automotive manufacturing application, a robot arm may be utilized to cut, grind, or otherwise shape metal parts during one phase of production, and perform a variety of welding tasks in another. Different welding tool geometries may be advantageously mated to a particular robot arm to perform welding tasks at different locations or in different orientations.

In these applications, a tool changer is used to mate different robotic tools to the robot. One half of the tool changer, called the master unit, is permanently affixed to a robot arm. The other half, called the tool unit, is affixed to each robotic tool that the robot may utilize. The various robotic tools a robot may utilize are typically stored, within the range of motion of the robot arm, in tool stands which are sized and shaped to hold each tool securely when not in use. When the robot arm positions the master unit, on the end of the robot arm, adjacent to a tool unit connected to a desired robotic tool sitting in a tool stand, a coupling mechanism is actuated that mechanically locks the master and tool units together, thus affixing the robotic tool to the end of the robot arm. The tool changer thus provides a consistent mechanical interface between a robot arm and a variety of robotic tools. A tool changer may also pass utilities to a robotic tool.

Robotic tools may require utilities, such as electrical current, air pressure, hydraulic fluid, cooling water, electronic or optical data signals, and the like, for operation. When numerous different tools—requiring different utilities—are utilized by the same robot, the utility connections must be manually established each time a tool is changed. To eliminate this procedure, one important function of a robotic tool changer is to provide utility-passing modules. Such modules may be attached to standardized locations on the master and tool units of the robotic tool changer. The modules include mating terminals, valve connections, electrical connectors, and the like, making the utilities available to the selected tool when it is coupled to the robot arm. Many tool changers include one or more standard-sized "ledges" about their periphery, to which various utility-passing modules may be attached, as required. Tool changers and utility-passing modules are well known in the robotics arts, and are commercially available, such as from the assignee, ATI Industrial Automation of Apex, N.C.

As mentioned above, when not in use, each robotic tool is stored in a special rack, or tool stand, within the operative range of the robotic arm. Robot arm controller software "remembers" where each robotic tool is, and each robotic tool is returned to precisely the same position in its tool holder prior to the tool changer decoupling. Similarly, the robot arm controller software "knows" precisely where the next desired robotic tool is stored, and it positions the master unit of the tool changer (on the robot arm) adjacent the tool unit (on the desired robotic tool), and then actuates the tool changer to couple the next robotic tool to the robot arm.

Safety is a paramount concern in manufacturing environments. A variety of workplace regulations govern the use of large industrial robots, with heavy robotic tools attached thereto. For example, ISO 13849, "Safety of machinery—Safety related parts of control systems," defines five Performance Levels (PL), denoted A through E. Performance Level D (PLD), mandated for many industrial robotics applications, requires a probability of less than $10^6$ dangerous failures per hour—that is, at least a million hours of operation between dangerous failures.

The most likely dangerous failure, from the perspective of a robotic tool changer and its functionality, is an inadvertent decoupling of the master and tool units, allowing a robotic tool to fall free from the robot arm. This danger has long been recognized, and state-of-the-art robotic tool changer design minimizes the risk. For example, in the event positive coupling power, such as pneumatic pressure, is lost during operation, "failsafe" designs ensure that a tool will not separate from the robot arm. See, e.g., U.S. Pat. Nos. 7,252,453 and 8,005,570, assigned to ATI Industrial Automation, the assignee of the present application.

Besides preventing accidental robotic tool drops resulting from loss of pressure, ATI Industrial Automation has also addressed the safety hazard of software bugs or inadvertent commands presenting a valid "decouple" command to a robotic tool changer at the wrong time, such as when a tool is in use. U.S. Pat. No. 6,840,895 describes an interlock circuit that precludes even a valid "uncouple" command from reaching a coupling mechanism of a robotic tool changer if a tool side safety interlock is not engaged. The tool side safety interlock is automatically engaged whenever the robotic tool is placed in its tool stand, and is disengaged whenever the robotic tool is removed from the tool stand.

Interlock circuits can effectively prevent inadvertent decoupling of a robotic tool changer. However, to meet very stringent safety standards, such as ISO 13849 PLD, critical elements (circuit components, pneumatic valves, and the like) must be redundant. Furthermore, to ensure that the designed redundancy is not illusory, such as if one of the redundant circuits were to fail, monitoring means must be added that constantly ensure all critical elements are not only present, but are fully operational and functional. Such redundancy and monitoring systems add cost, complexity, and weight to a robotic tool changer.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a robotic tool changer ensures inherently safe operation by separating power sources for the "couple" and "decouple" operations of its coupling mechanism. The power for the decouple operation is available only when the attached robotic tool is safely disposed in its tool stand. Once the robotic tool leaves the tool stand, there is no power supplied to the coupling mechanism of the robotic tool changer to decouple the robotic tool from the robot arm. Accordingly, it is impossible for the robotic tool to inadvertently become disengaged from the robot arm—even if software were to erroneously assert a DECOUPLE signal, or otherwise initiate a decouple operation. Furthermore, since the design is inherently safe, neither interlock circuits, the redundancy of such circuits, nor the extensive and complex monitoring circuits necessary to ensure their proper operation, are necessary.

One embodiment relates to a robotic tool changer. The robotic tool changer includes a master unit assembly operative to connect to a robot, and a tool unit assembly operative to connect to a robotic tool. A coupling mechanism is disposed in one of the master and tool unit assemblies, and it is operative to selectively couple the master and tool unit assemblies together. The coupling mechanism requires a first source of power to couple and a separate, second source of power to decouple. The robotic tool changer receives the second power only from a tool stand operative to safely hold the robotic tool. Hence, the decouple power is only available when an attached robotic tool is safely disposed in its tool stand.

Another embodiment relates to an inherently safe method of selectively attaching a robotic tool disposed in a tool stand to a robot. A master unit assembly of a tool changer is attached to the robot and a tool unit assembly of the tool changer attached to the robotic tool. One of the master and tool unit assemblies includes a coupling mechanism operative to selectively couple and decouple the master and tool unit assemblies to and from each other. The robot is positioned adjacent the robotic tool such that the master and tool unit assemblies abut. Power from a first source is utilized to drive the coupling mechanism to couple the master and tool unit assemblies together. The robotic tool is removed from the tool stand by operation of the robot. The robotic tool is returned to the tool stand by operation of the robot. Power from a second source associated with the tool stand is utilized to drive the coupling mechanism to decouple the master and tool unit assemblies. When the robotic tool is not disposed in the tool stand, no power from the second source is available to drive the coupling mechanism to decouple the master and tool unit assemblies.

In some embodiments, the coupling mechanism comprises a pneumatically-actuated piston, for example, operating similarly to those described in U.S. Pat. Nos. 7,252,453 and 8,005,570. The piston has a couple port to receive pneumatic fluid from a first supply operative to move the piston so as to couple the master and tool units together. The term "forward" is used herein to describe motion of the piston in a direction to couple the master and tool units. The space behind the piston, into which the couple port directs pneumatic fluid, is referred to herein as a couple chamber.

The piston has a separate decouple port to receive pneumatic fluid from a separate supply, different from the first supply (or at least flowing to the piston along a different path). Pneumatic fluid at the decouple port is operative to move the piston so as to decouple the master and tool units from each other. The term "backward" is used herein to describe motion of the piston in a direction to decouple the master and tool units. The space in front of the piston, into which the decouple port directs pneumatic fluid, is referred to herein as a decouple chamber. The pneumatic fluid for the decouple port flows to the robotic tool changer only from the tool stand, through a pneumatic coupling on or attached to the tool unit that mates with a corresponding pneumatic coupling on the tool stand when an attached robotic tool is safely disposed in the tool stand.

When the robotic tool is attached to the robot arm and is removed from its tool stand, there is no pneumatic pressure available at the decouple port to move the piston backward, to decouple the tool unit from the master unit. Hence, the robotic tool changer of embodiments of the present invention is inherently safe from inadvertent decoupling of a robotic tool from the robot arm unless the robotic tool is disposed in its tool stand. In various embodiments, the control of flow of pneumatic fluid—e.g., via valves and pneumatic flow-through conduits—is distributed in various ways, each of which has particular advantages regarding cost, complexity, ease of maintenance, and the like. However, all embodiments share the design feature that an attached robotic tool must be disposed in its tool stand to enable the robotic tool changer to decouple the tool unit from the master unit (and hence remove the robotic tool from the robot arm).

A number of different embodiments described and claimed herein all share the feature of inherent safety by having pneumatic fluid required to decouple the tool changer supplied by or routed through a tool stand, such that it is only available when the robotic tool is disposed in the tool stand.

In a first embodiment, the tool stand supplies pneumatic fluid, a decouple control valve is associated with the tool unit, and a couple control valve is associated with the master unit.

In a second embodiment, the tool stand supplies pneumatic fluid, and a decouple control valve is associated with the tool stand, receiving control signals from the robot.

In a third embodiment, a single robot pneumatic fluid supply provides pneumatic fluid for both coupling and decoupling. The decoupling pneumatic fluid is routed through the tool unit to a bridge on the tool stand, and back through the tool unit to the master unit (and is hence unavailable unless the robotic tool is disposed in the tool stand).

In a fourth embodiment, the tool stand supplies pneumatic fluid, and a decouple control valve is associated with the tool stand, receiving control signals from the robot. The robot also supplies pneumatic fluid, and a couple control valve is associated with the robot. Both the matter and tool units provide pneumatic fluid pass-through.

In a fifth embodiment, the tool stand supplies pneumatic fluid at a first pressure. There is no decouple control valve. The robot supplies pneumatic fluid at a second pressure higher than the first pressure, and a couple control valve is associated with the master unit.

The couple control valve in the first through fifth embodiments, and the decouple control valve in the first through fourth embodiments, are preferably 3-way solenoid valves. In a sixth embodiment, a single, 4-way solenoid control valve controls pneumatic fluid flow for both couple and decouple operations. As in the third embodiment, pneumatic fluid is routed through the tool stand, and is hence unavailable for decouple operation when an attached robotic tool is removed from the tool stand.

In a seventh embodiment, a single, spring-loaded, push-button actuated control valve is interposed in the pneumatic path from an air source to the tool stand. A safety coupling is interposed in the pneumatic path from the tool stand to a decouple port of the pneumatic coupling mechanism. The safety coupling ensures the tool changer is seated on, and properly aligned with, the tool stand to effect the transfer of pneumatic fluid (else, it is vented to the atmosphere).

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 8A is a pneumatic schematic diagram of the tool side of a tool changer in a tool stand, according to a fifth embodiment.

FIG. 11 is a pneumatic schematic diagram of a tool changer and tool stand, according to a seventh embodiment.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure embodiments of the present invention.

Figure 1:
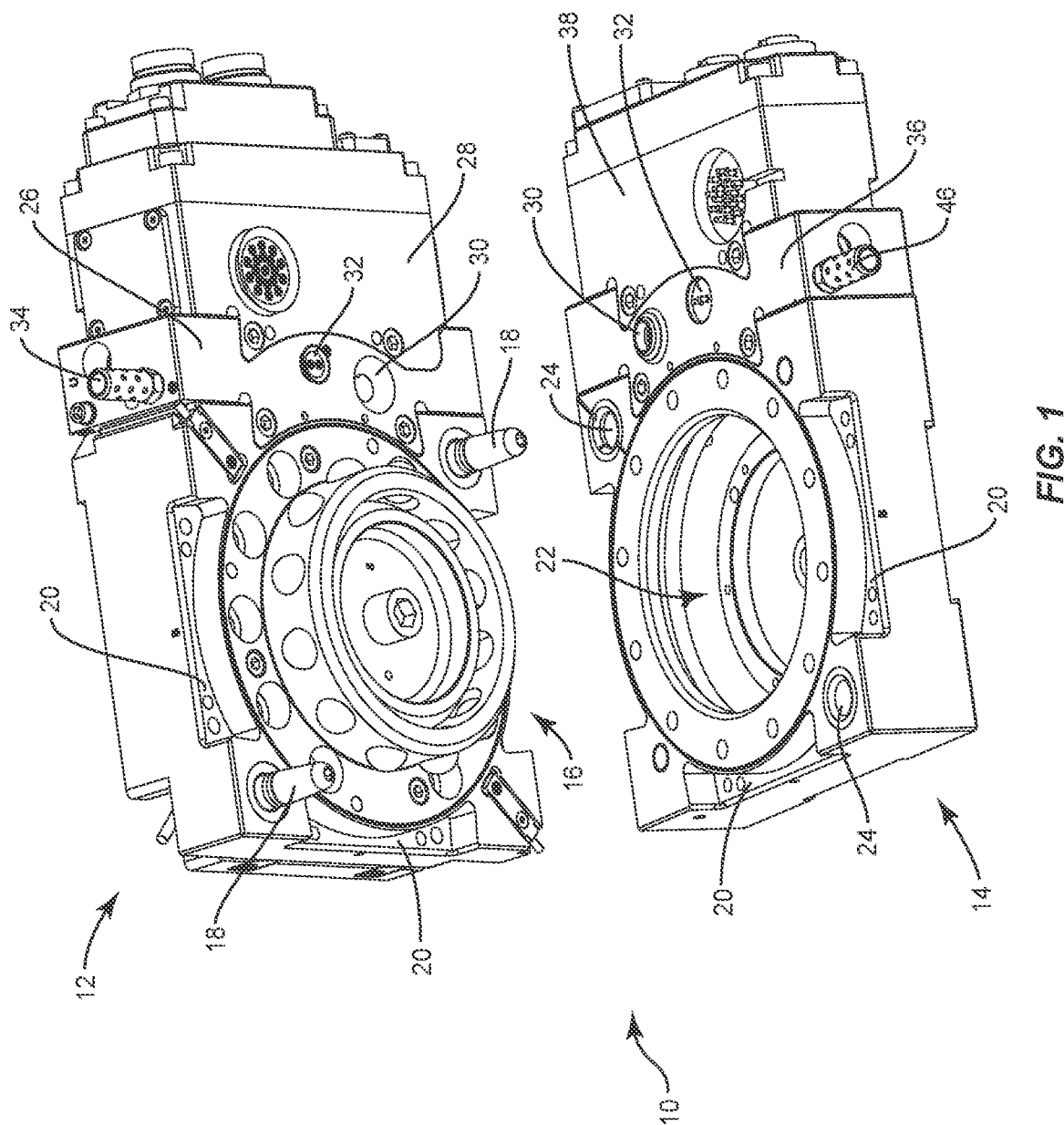
FIG. 1 is a perspective view of a tool changer.

FIG. 1 depicts one embodiment of a robotic tool changer 10. The tool changer 10 comprises a master unit 12 operative to be affixed to a robot arm (not shown), and a tool unit 14 operative to be affixed to a robotic tool (not shown). The master unit 12 includes a coupling mechanism 16 which projects from a front surface thereof, conical alignment pins 18, and a ledge 20 formed on each of four sides for the attachment of utility-passing modules. The tool unit 14 includes a recess 22 to accept the coupling mechanism 16, and tapered alignment holes 24 to accept alignment pins 18. The tool unit 14 also includes a ledge 20 formed on each of four sides for the attachment of utility-passing modules.

The coupling mechanism 16, disposed in the master unit 12 in the embodiment pictured, operates by projecting balls radially outward through concentrically spaced holes. When the master unit 12 is in contact with the tool unit 14 such that the coupling mechanism 16 is disposed within the recess 22, the balls contact and are pressed against an annular surface within the recess 22 in the tool unit 14, thus coupling the master unit 12 and tool unit 14 together. The balls are urged outwardly by angled cam surfaces of a pneumatically-actuated piston. As the piston moves along a longitudinal axis in a forward direction toward the tool unit, the balls are pushed outwardly and into contact with the annular surface in the tool unit 14. To decouple the master 12 and tool 14 units, the piston is retracted along the longitudinal axis in a backward direction (away from the tool unit). The angled cam surfaces then disengage the balls, allowing them to retract into holes and allow the master 12 and tool 14 units to disengage and be separated. Greater detail of robotic tool changer pneumatically-actuated coupling mechanisms may be found in U.S. Pat. Nos. 7,252,453 and 8,005,570.

The movement of the piston is of primary concern from a safety perspective. Accordingly, the piston is designed and implemented to require separate power sources (in this case, pressurized pneumatic fluid supplies) to drive the piston along each direction—that is, to couple and to decouple the master unit 12 and tool unit 14. Furthermore, in some embodiments, the actuation of pneumatic valves controlling pneumatic fluid flow on each side of the piston drive mechanism must be coordinated. For example, in the coupled state, pressurized air is maintained in the couple chamber (behind the piston), forcing the piston to its maximum extent along the longitudinal axis in the forward direction. During this time, the decouple chamber of the piston is open to ambient air pressure. To then decouple the tool changer 10, not only must pneumatic fluid be applied through the decouple port to the decouple chamber (front side of the piston), to drive the piston along the longitudinal axis in a backward direction, but also the couple chamber formed at the back of the piston must be vented to ambient air pressure, to allow the piston to retract.

Similarly, to again couple the master unit 12 to the same or a different tool 14, pneumatic fluid is applied to the couple port, applying pressurized air to the couple chamber to drive the piston forward, and also pressure in the decouple chamber must be relieved, to allow the piston to move forward. Thus, a three-way pneumatic valve is required to supply pneumatic fluid to each port of the piston, in addition to the ports being supplied by separate pneumatic fluid supplies (or pneumatic fluid flow routes).

Figure 2:
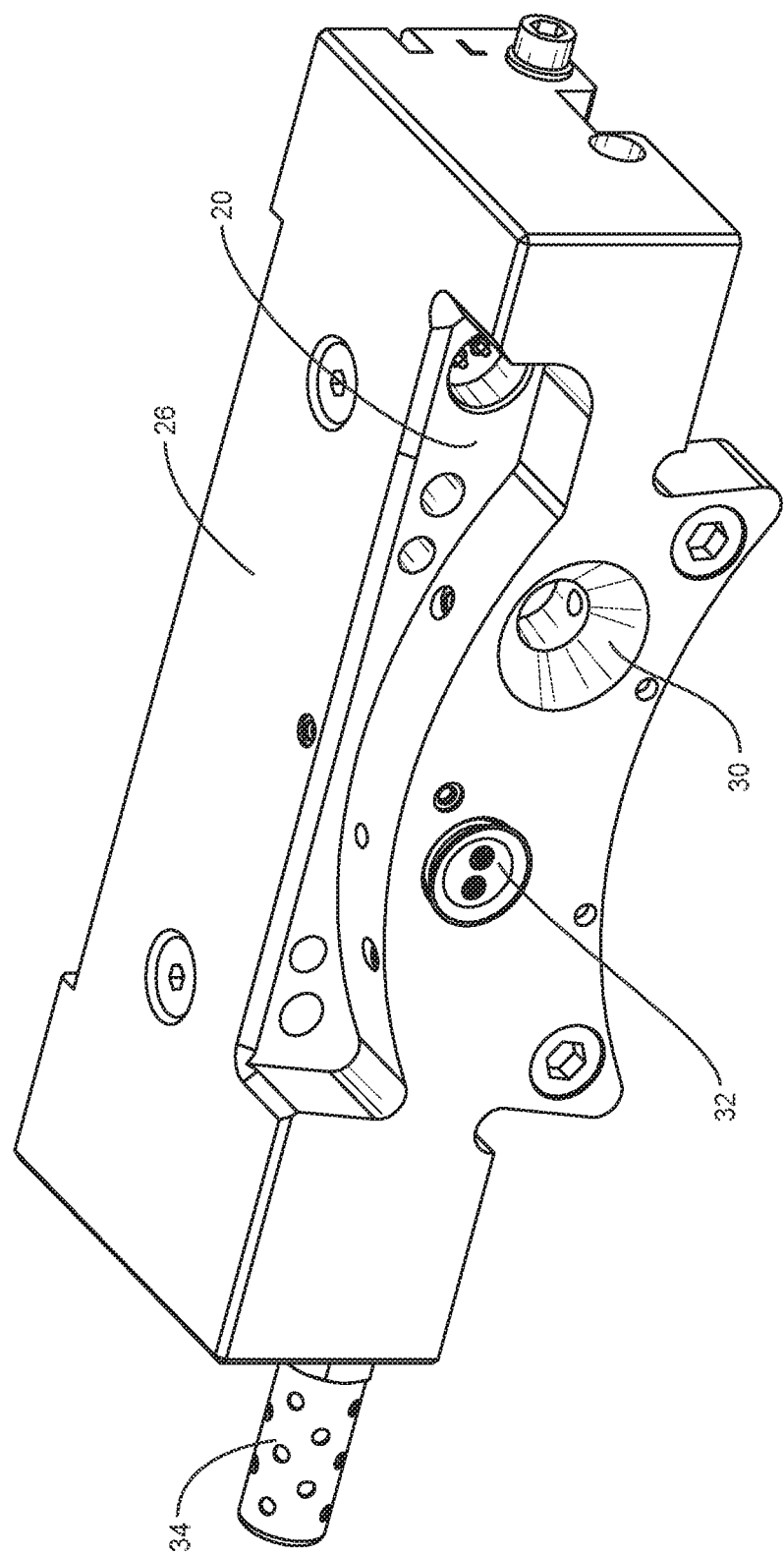
FIG. 2 is a perspective view of a master unit pneumatic module.

In some embodiments described herein, affixed to one ledge 20 of the master unit 12 is a master unit pneumatic module 26. The master unit pneumatic module 26 itself includes a mounting ledge 20 opposite the master unit 12, allowing a utility-passing module 28 to be attached thereto. The master unit pneumatic module 26 thus provides the inherently safe coupling mechanism 16 actuation according to embodiments of the present invention, without diminishing the utility-passing module capacity of the tool changer 10. In other embodiments (not shown), the functionality of the master unit pneumatic module 26 may be built into the master unit 12, without requiring an external module 26. FIG. 2 depicts a stand-alone view of the master unit pneumatic module 26.

The master unit pneumatic module 26 includes a pneumatic coupling port 30. This coupling port 30 is positioned so as to mate with a corresponding pneumatic coupling port on a tool unit pneumatic module 36 when the modules 26, 36 abut. The pneumatic coupling 30 passes pneumatic fluid supplied by or through a tool stand to the tool unit pneumatic module 36 when an attached tool is disposed in the tool stand. Internal to the master unit pneumatic module 26, a pneumatic flow-through conduit (not shown) connects the pneumatic coupling port 30 in pneumatic fluid flow relationship to a decouple port of a pneumatically-actuated piston 56 of the coupling mechanism 16. In some embodiments, the master unit pneumatic module 26 includes an electrical connector 32, positioned so as to mate with a corresponding electrical connector on some embodiments of the tool unit pneumatic module 36. In these embodiment, the electrical connector 32 transfers at least a DECOUPLE command to the tool unit pneumatic module 36. The master unit pneumatic module 26 may further include a pneumatic fluid connector 34, operative to be connected to a pneumatic fluid supply on a robot arm.

In most embodiments disclosed herein, the master unit pneumatic module 26 includes a 3-way solenoid valve (not shown in FIG. 2), referred to herein as the couple control valve. The couple control valve is operative to control the supply of pneumatic fluid from the robot (via the pneumatic fluid connector 34) to the couple port of the pneumatically-actuated piston 56 of the coupling mechanism 16 during coupling operation, and also to vent air from the couple chamber of the piston 56 during decouple operation. The master unit pneumatic module 26 also includes the above-described pneumatic flow-through conduit (not shown) connecting the pneumatic coupling port 30 (which receives pneumatic fluid via the tool unit pneumatic module 36 from the tool stand 48) to the decouple port of the pneumatically-actuated piston of the coupling mechanism 16.

Figure 3:
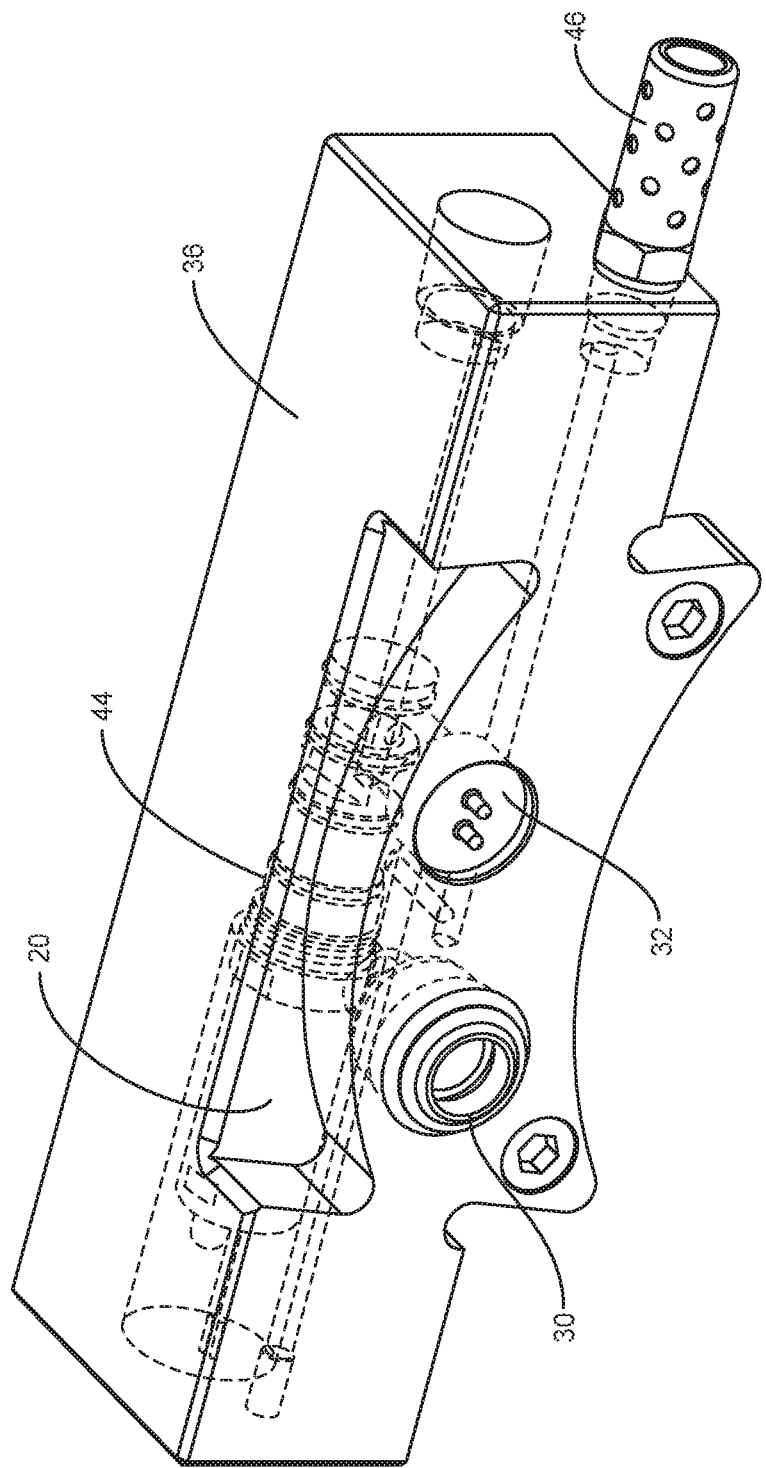
FIG. 3 is a perspective view of a tool unit pneumatic module, depicting a valve inside.

As depicted in FIG. 1, affixed to one ledge 20 of the tool unit 14 is a tool unit pneumatic module 36. The tool unit pneumatic module 36 itself includes a mounting ledge 20 opposite the tool unit 12, allowing a utility-passing module 38 to be attached thereto. The tool unit pneumatic module 36 thus provides the inherently safe coupling mechanism 16 actuation according to embodiments of the present invention, without diminishing the utility-passing module capacity of the tool changer 10. In another embodiment (not shown), the functionality of the tool unit pneumatic module 36 may be built into the tool unit 12, without requiring an external module 36. FIG. 3 depicts a stand-alone view of the tool unit pneumatic module 36.

The tool unit pneumatic module 36 also includes a pneumatic coupling port 30. This coupling port 30 is positioned so as to mate with the corresponding pneumatic coupling port on the master unit pneumatic module 26 when the modules 26, 36 abut. The pneumatic coupling 30 transfers pneumatic fluid supplied by or through the tool stand to the master unit pneumatic module 26 when an attached tool is disposed in the tool stand. In some embodiments, internal to the tool unit pneumatic module 36, as depicted in FIG. 3 by dashed lines, is a 3-way solenoid valve 44, referred to herein as the decouple control valve. The decouple control valve is operative to control the supply of pneumatic fluid from the tool stand to a decouple port of a pneumatically-actuated piston 56 of the coupling mechanism 16 (via the master unit pneumatic module 26) in decouple operation, as well as to vent air from the decouple chamber of the piston 56 in couple operation. The valve 44 is operated in response to a DECOUPLE command communicated from the master unit 12 to the tool unit pneumatic module 36 via an electrical connector 32 positioned to mate with the corresponding electrical connector 32 on the master unit pneumatic module 26. The tool unit pneumatic module 36 further includes a pneumatic fluid connector 46, operative to be connected to a pneumatic fluid supply on or through the tool stand.

A number of different embodiments of the present invention are disclosed and claimed herein. In all such embodiments, a couple control pneumatic valve controls pneumatic fluid flow driving the coupling actuation of the coupling mechanism 16. In most embodiments, a decouple control pneumatic valve controls pneumatic fluid flow driving the decoupling actuation. In all such embodiments, inherent safe operation of the tool changer 10 is ensured by the fact that pneumatic fluid operative to drive the decoupling actuation is sourced from, or routed through, a tool stand in which a robotic tool may be safely positioned. Only when the robotic tool is in the tool stand is decoupling pneumatic fluid available to drive the coupling mechanism 16 to the decoupled position. Once the robot removes the robotic tool from the tool stand, decoupling of the coupling mechanism 16 is not physically possible, even if control software asserts a DECOUPLE control signal (or otherwise attempts to initiate a decouple operation). The various embodiments discloses and claimed herein vary in the distribution of couple and decouple control pneumatic valves and pneumatic fluid sources, in control signal distribution, and in the relative pneumatic pressure between the different supplies. Different configurations of master and tool unit pneumatic modules 26, 36 are optimized for use in the different embodiments.

Detailed Description of First Embodiment

FIGS. 4A-4D depict a first embodiment, in which the couple control valve is disposed in the master unit pneumatic module, the decouple control valve is disposed in the tool unit pneumatic module, and a decoupling pneumatic fluid source is associated with the tool stand.

Figure 4A:
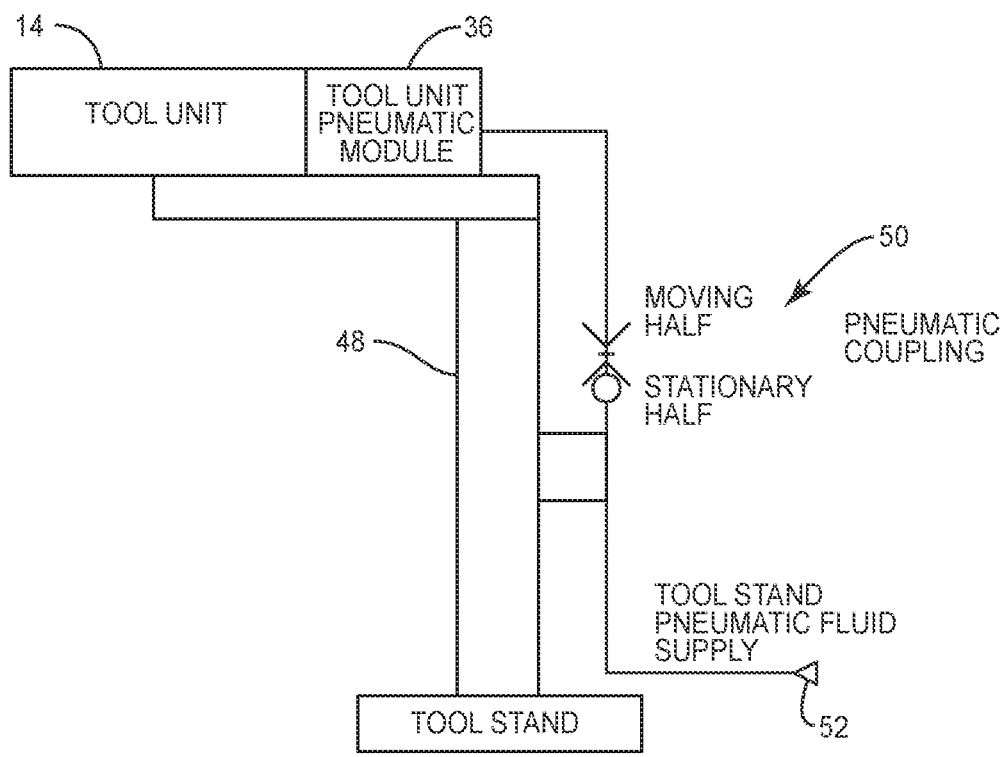
FIG. 4A is a pneumatic schematic diagram of the tool side of a tool changer in a tool stand, according to a first embodiment.

FIG. 4A depicts the tool unit 14 and tool unit pneumatic module 36 disposed (along with an attached robotic tool, not shown) in a tool stand 48. The tool unit pneumatic module 36 is connected, via a tool stand pneumatic coupling 50, to a tool stand pneumatic fluid supply 52. The pneumatic coupling 50 includes a check valve on the tool stand side to arrest the flow of pneumatic fluid when the robotic tool is removed from the tool stand 48. The pneumatic coupling 50 supplies pneumatic fluid from the tool stand pneumatic fluid supply 52 to the tool unit pneumatic module 36 when an attached robotic tool is safely disposed within the tool stand 48.

Figure 4B:
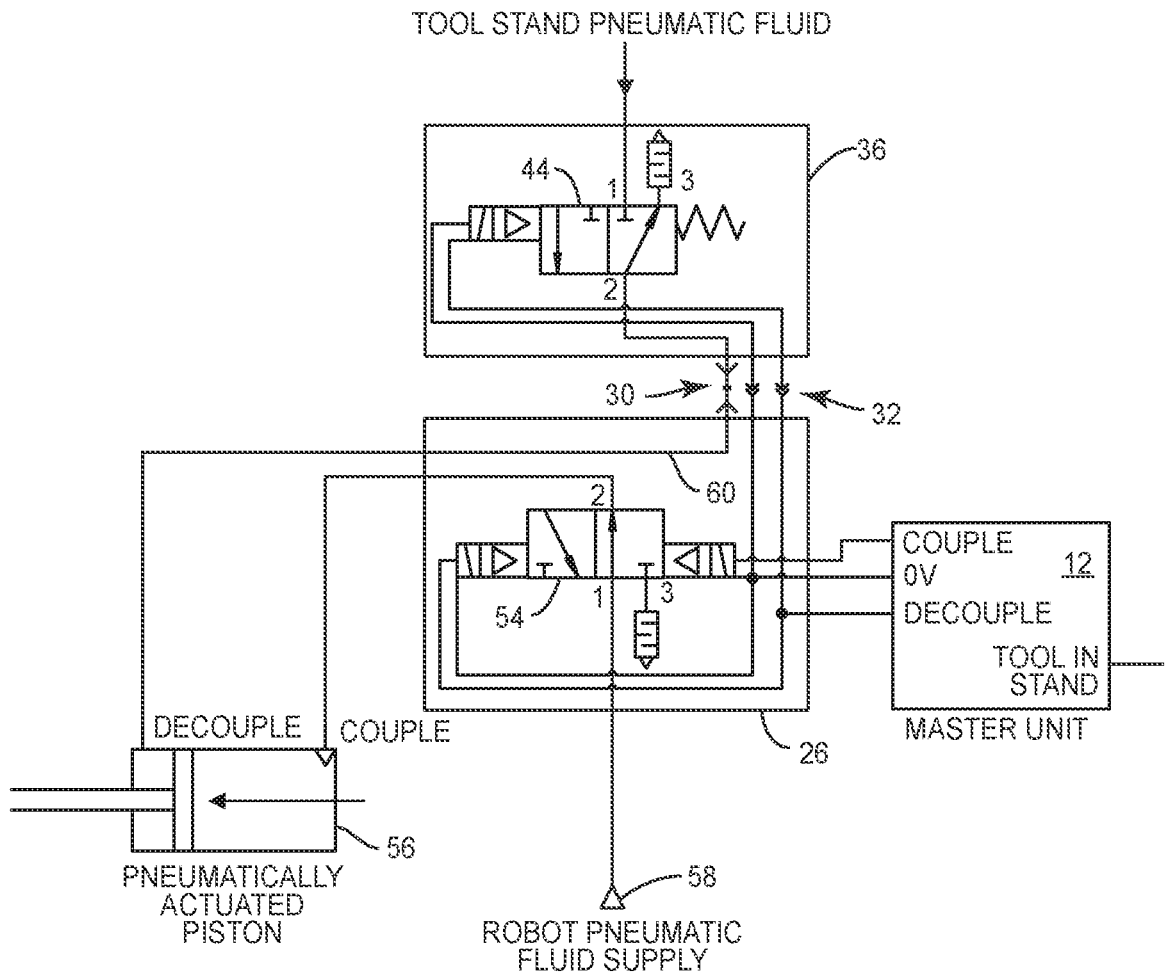
FIG. 4B is a pneumatic schematic diagram of a tool changer depicting a couple operation, according to a first embodiment.

FIG. 4B is a schematic pneumatic diagram depicting the relevant pneumatic fluid and control signal flow when the tool changer master unit 12 couples to the tool unit 14. The master unit 12 generates COUPLE and DECOUPLE signals, which may for example comprise positive or negative voltages, with respect to a 0V reference voltage. Alternatively, the COUPLE and DECOUPLE signals may comprise digital values, optical signals, wireless signals, or any other manner of transmitting control commands known in the art. In one embodiment, the COUPLE and DECOUPLE signals comprise positive voltages, with respect to the 0V reference signal, operative to energize solenoids on the 3-way solenoid valves 26, 36 when asserted, and 0V when deasserted. The COUPLE and DECOUPLE signals are mutually exclusive—that is, the two signals are never asserted simultaneously.

Upon the COUPLE signal being asserted, the couple control valve 54 is configured to pass pneumatic fluid from a pneumatic fluid supply 58 on the robot to the couple port of the pneumatically-actuated piston 56 of the coupling mechanism 16. The decouple port of the piston 56 is connected via the above-described pneumatic flow-through conduit 60 in the master unit pneumatic module 26 to the pneumatic coupling 30. This allows air from the decouple chamber of the piston 56 to flow to the decouple control valve 44. The DECOUPLE signal, which is passed to the decouple control valve 44 via electrical connector 32, is deasserted. Because the DECOUPLE signal is deasserted, the decouple control valve 44 is in its default state, connecting the pneumatic coupling 30 to an exhaust vent. In this configuration, the piston 56 is driven forward (to the left as depicted in FIG. 4B), to couple the master unit 12 and tool unit 14 together. The piston 56 is allowed to move in the forward direction by air in the decouple chamber being vented via the decouple control valve 44.

Once the master unit 12 is coupled to the tool unit 14 and the robot removes the attached robotic tool from the tool stand 48, the units 12, 14 cannot become decoupled. The pneumatic fluid source 58 on the robot continues to supply positive pressure, through the couple control valve 54, to the couple port of the piston 56, forcing the piston 56 to the forward, or coupled, position. Critically, there is no source of pneumatic fluid connected to the decouple port of the piston 56 to drive the piston backwards, or toward the decoupled position (even if there were, air trapped in the couple chamber of the piston 56 has no path to vent, and would resist movement of the piston 56 in that direction).

Figure 4C:
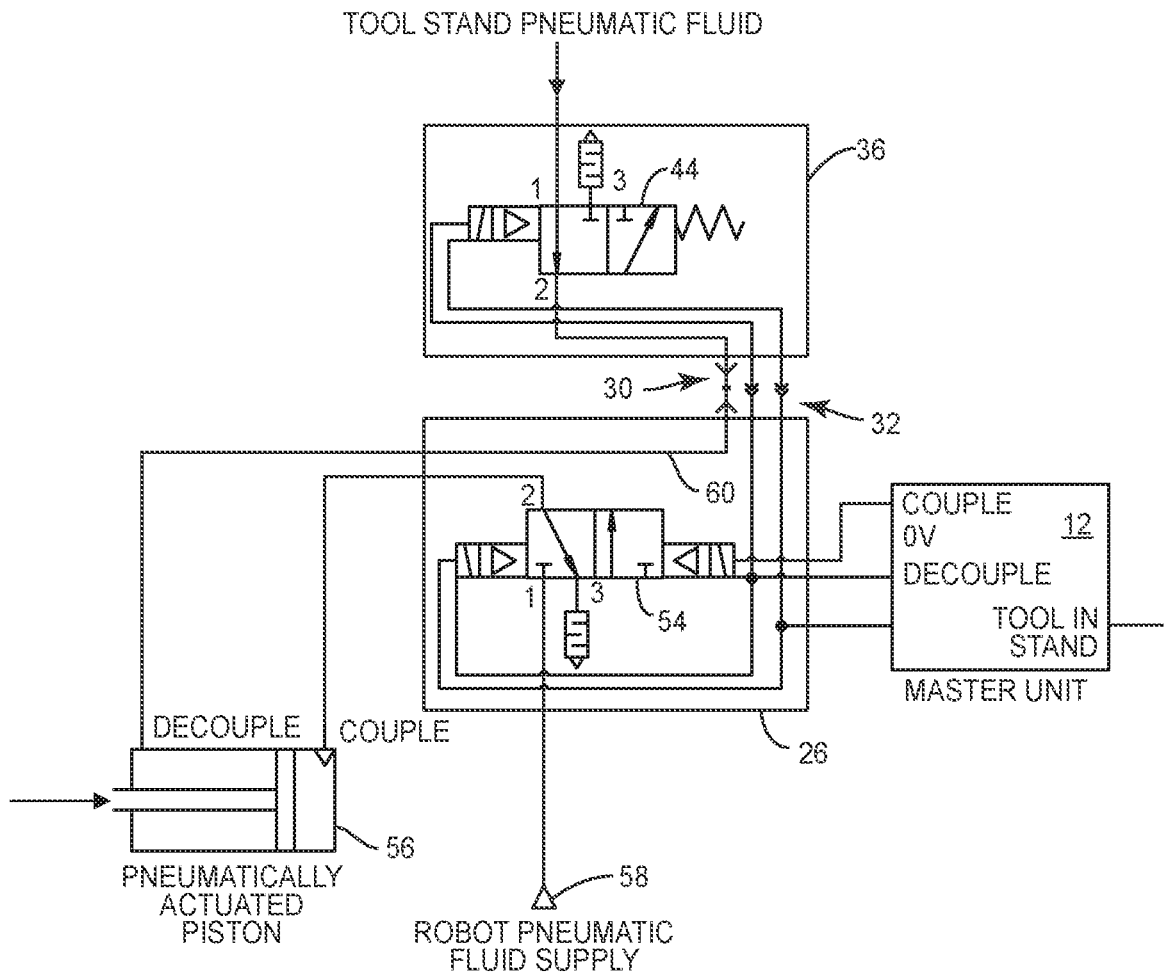
FIG. 4C is a pneumatic schematic diagram of a tool changer depicting a decouple operation, according to a first embodiment.

FIG. 4C depicts the decouple operation. Once the robotic tool is safely disposed in the tool stand 48, and the master unit 12 receives notice of this fact, the master unit 12 and tool unit 14 may decouple. The master unit 12 deasserts the COUPLE command and asserts the DECOUPLE command, which causes the decouple control valve 44 to connect the tool stand pneumatic fluid supply 52 with the pneumatic coupling 30. The pneumatic flow-through conduit 60 in the master unit pneumatic module 26 conveys the pneumatic fluid to the decouple port of the pneumatically-actuated piston 56. Simultaneously, the DECOUPLE command causes the couple control valve 54 to direct air from the couple chamber of the piston 56 to vent. These two valve settings allow pneumatic fluid supplied by the tool stand 48 to drive the piston 56 backwards, or to a decoupled position, allowing the master unit 12 and the tool unit 14 to decouple. The robot may then move, with the master unit 12, to retrieve a different robotic tool, leaving the robotic tool safely disposed in the tool stand 48.

Note that the master unit 12 requires notice that the robotic tool is disposed in the tool stand 48. Many industrial robotic systems already generate such a "tool in stand" signal, as part of one or more safety interlocks. The "tool in stand" signal may be generated by a switch or proximity sensor on the tool stand 48, on the tool unit 14, on the robotic tool, or the like. The signal may be transmitted to the master unit 12 through mating contacts on the tool unit 14, or may alternatively be communicated to the master unit 12 from the robot.

Figure 4D:
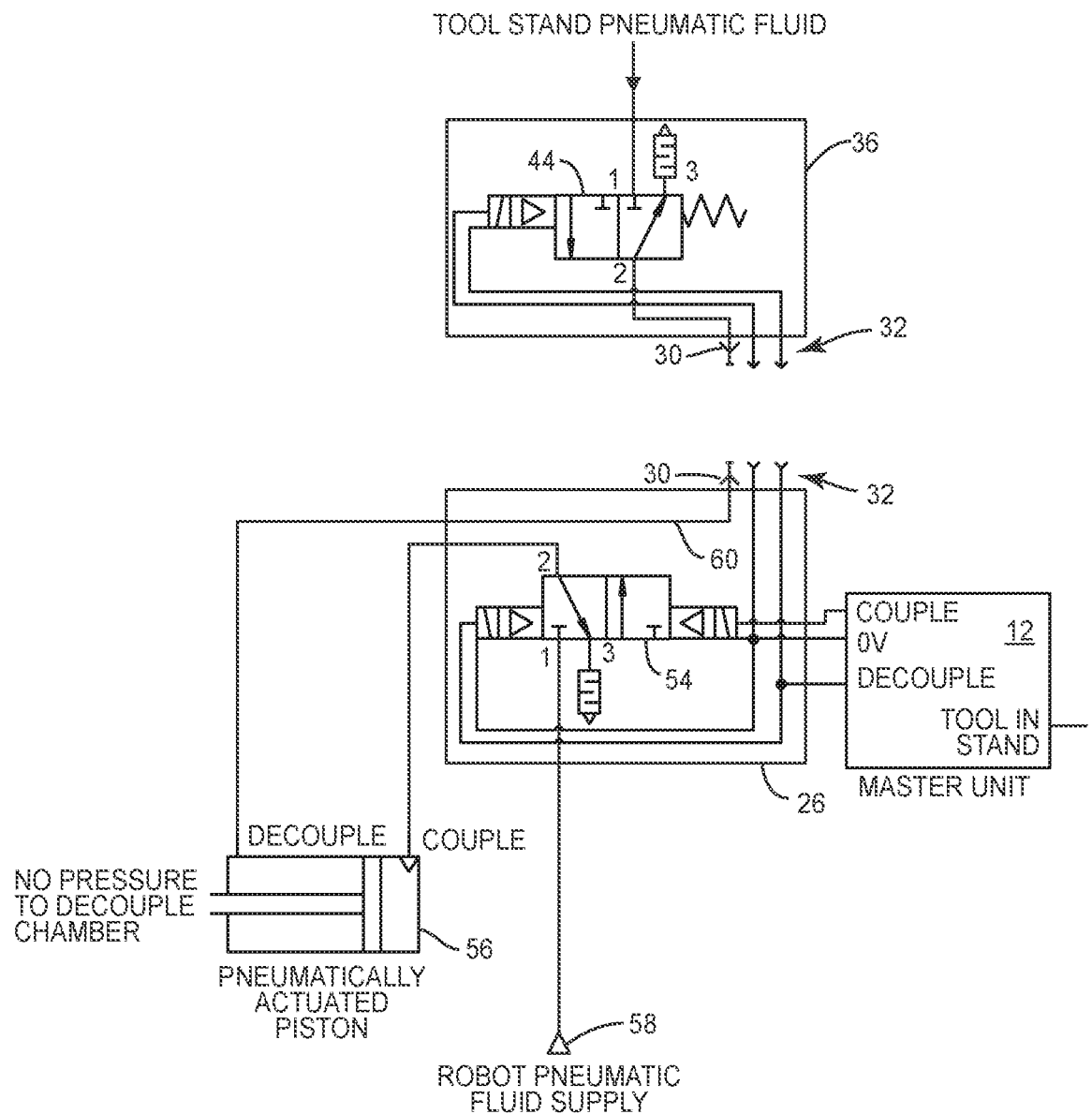
FIG. 4D is a pneumatic schematic diagram of a tool changer when the master and tool units are separated, according to a first embodiment.

FIG. 4D depicts the condition after decoupling, when the robot has stowed the robotic tool in the tool stand 48 and moved the master unit 12 away from the tool unit 14. The decouple control valve 44 is in the default state (no DECOUPLE signal asserted), blocking the tool stand pneumatic fluid and venting the pneumatic coupling 30. The couple control valve 54 blocks the robot pneumatic fluid and vents the air in the coupling chamber of the piston 56. Note that the couple control valve 54 is a dual-solenoid type. This avoids the master unit 12 automatically coupling in the event that power is lost, as would occur if the couple control valve 54 were a "spring return" type valve with only one solenoid. In this case, the master unit 12 would be unable to couple to a tool unit 14, without a manual reconfiguration of the piston 56. By using a dual-solenoid type valve 54, the master unit 12 will only couple upon activation of the COUPLE control signal, which only occurs when the master unit 12 is proximate a tool unit 14 and ready to couple thereto.

The first embodiment is a straightforward implementation of the inventive concept of making a robotic tool changer 10 inherently safe by providing decoupling power only when an attached robotic tool is safely disposed in a tool stand. To the greatest extent possible, this embodiment contains all of the functionality within the tool changer 10. Since the robot pneumatic fluid supply 58 is required for operation of any pneumatically-operated tool changer, the only modification required at the facility where the robot is deployed is the provision of a tool stand pneumatic fluid supply 52, and a tool stand pneumatic coupling 50. Accordingly, the first embodiment may be particularly advantageous where required modifications to a facility should be minimized.

Detailed Description of Second Embodiment

FIGS. 5A-5E depict a second embodiment, in which the couple control valve is disposed in the master unit pneumatic module, the decouple control valve is disposed on or otherwise associated with the tool stand, and a decoupling pneumatic fluid source is associated with the tool stand.

Figure 5A:
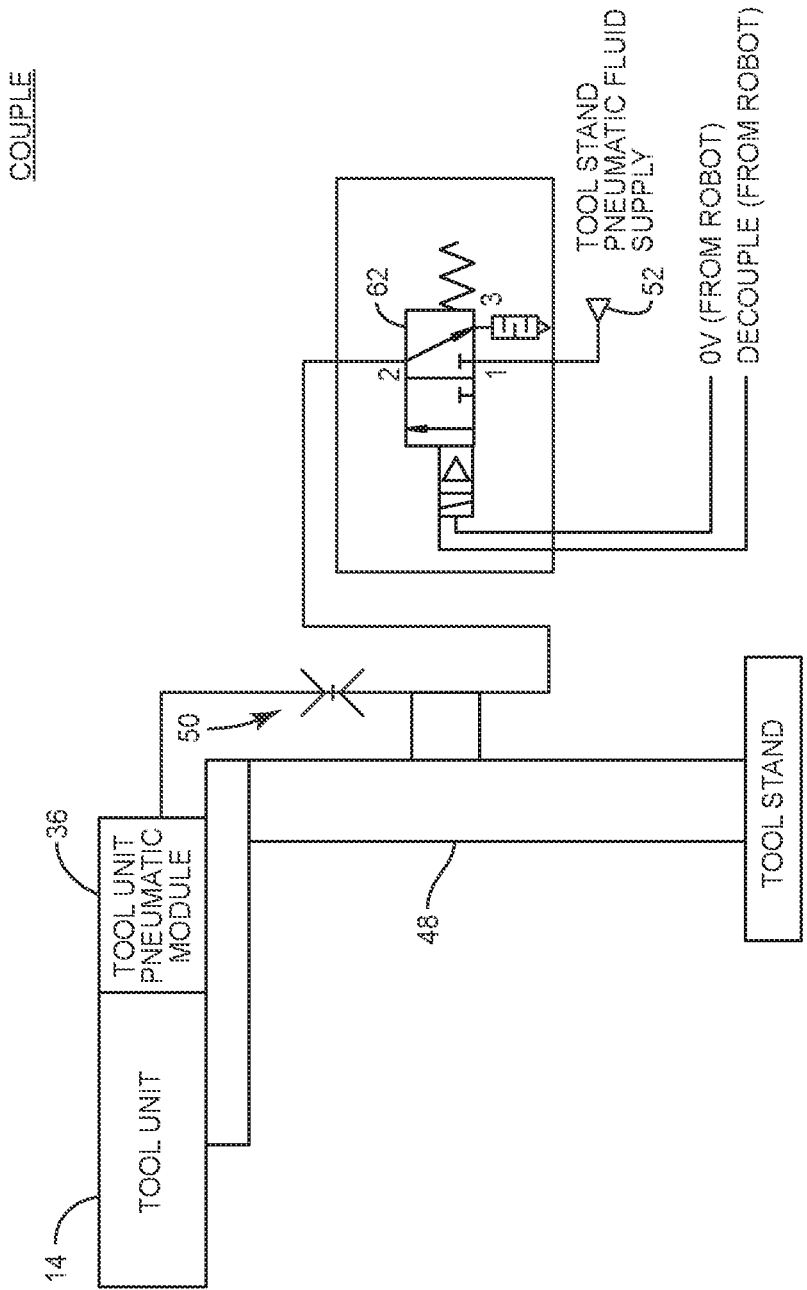
FIG. 5A is a pneumatic schematic diagram of the tool side of a tool changer in a tool stand during a couple operation, according to a second embodiment.
Figure 5B:
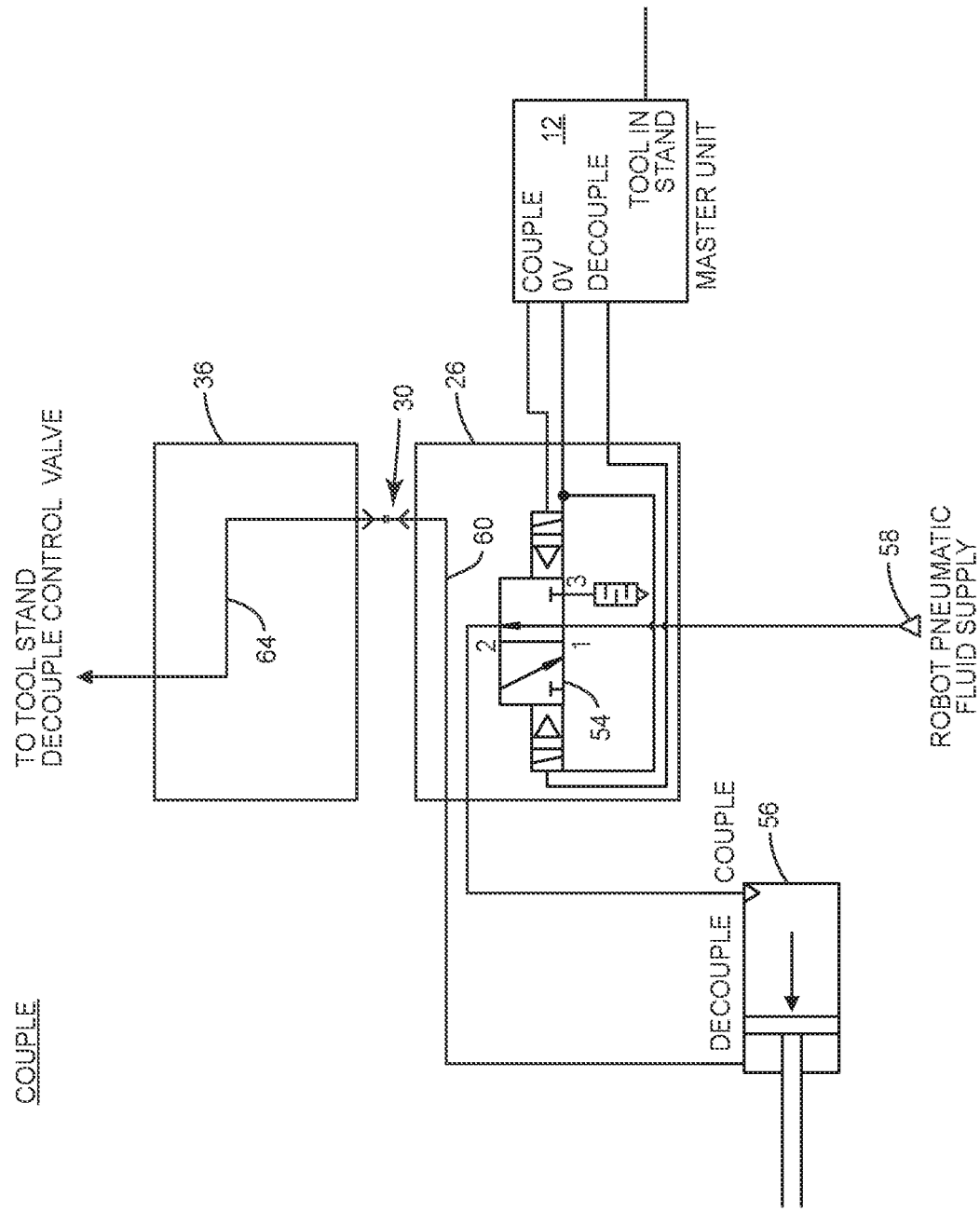
FIG. 5B is a pneumatic schematic diagram of a tool changer depicting a couple operation, according to a second embodiment.

FIGS. 5A and 5B depict the coupling operation, with the tool stand pneumatic fluid supply 52 providing pneumatic fluid to a 3-way solenoid decouple control valve 62, which in this embodiment is associated with the tool stand 48. The decouple control valve 62 in this embodiment receives the DECOUPLE command from the robot. As in the first embodiment, the tool unit pneumatic module 36 connects to the tool stand pneumatic fluid via pneumatic coupling 50 when an attached robotic tool is disposed in the tool stand 48.

Figure 5C:
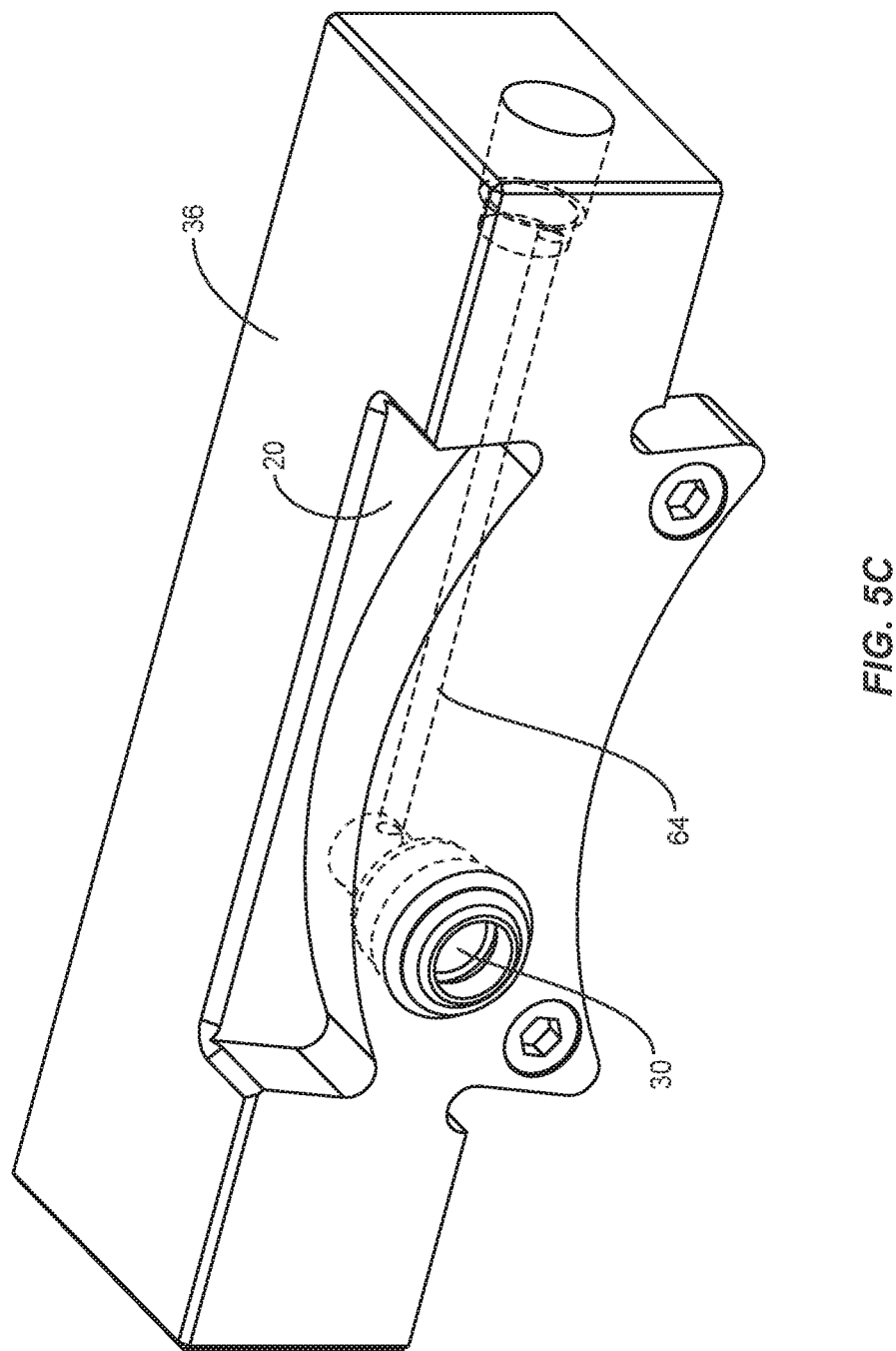
FIG. 5C is a perspective view of a tool unit pneumatic module, depicting a pneumatic pass-through conduit inside.

Referring to FIG. 5B, the master unit 12 and master unit pneumatic module 26 are the same as described above with respect to the first embodiment. In this second embodiment, the tool unit pneumatic module 36 does not include a valve or receive control signals, but rather includes a pneumatic pass-through conduit 64 connecting the pneumatic coupling 30 to the tool stand pneumatic coupling 50. FIG. 5C is a perspective view of this embodiment of the tool unit pneumatic module 36. In this embodiment, the tool unit pneumatic module 36 has the same physical dimensions as that in the first embodiment (see FIG. 3); however the pneumatic pass-through conduit 64 (depicted in dashed lines) replaces the decouple control valve 44. Additionally, this embodiment of the tool unit pneumatic module 36 does not include signal connections to the master unit pneumatic module 26.

In the second embodiment, coupling operates similarly to that described above for the first embodiment. Upon the COUPLE signal being asserted, the couple control valve 54 is configured to pass pneumatic fluid from the robot pneumatic fluid supply 58 to the couple port of the pneumatically-actuated piston 56. The decouple port of the piston 56 is connected via the pneumatic flow-through conduit 60 in the master unit pneumatic module 26 to the pneumatic coupling 30. This allows pneumatic fluid from the decouple chamber of the piston 56 to flow through the pneumatic flow-through conduit 64 in the tool unit pneumatic module 36, and the tool stand pneumatic coupling 50, to the decouple control valve 62. The DECOUPLE signal, which is passed to the decouple control valve 62 by the robot, is deasserted. Because the DECOUPLE signal is deasserted, the decouple control valve 62 is in its default state, connecting the tool stand pneumatic coupling 50 to an exhaust vent. In this configuration, the piston 56 is driven forward, to couple the master unit 12 and tool unit 14 together. The piston 56 is allowed to move in the first direction by air in the decouple chamber being vented via the decouple control valve 62.

Once the master unit 12 is coupled to the tool unit 14 and the robot removes the attached robotic tool from the tool stand 48, the units 12, 14 cannot become decoupled. The robot pneumatic fluid source 58 continues to supply positive pressure, through the couple control valve 54, to the couple port of the piston 56, forcing the piston 56 to the forward, or coupled, position. Critically, there is no source of pneumatic fluid connected to the decouple port of the piston 56 to drive the piston backward, toward the decoupled position (even if there were, air trapped in the couple chamber of the piston 56 has no path to vent, and would resist movement of the piston 56 in that direction).

Figure 5D:
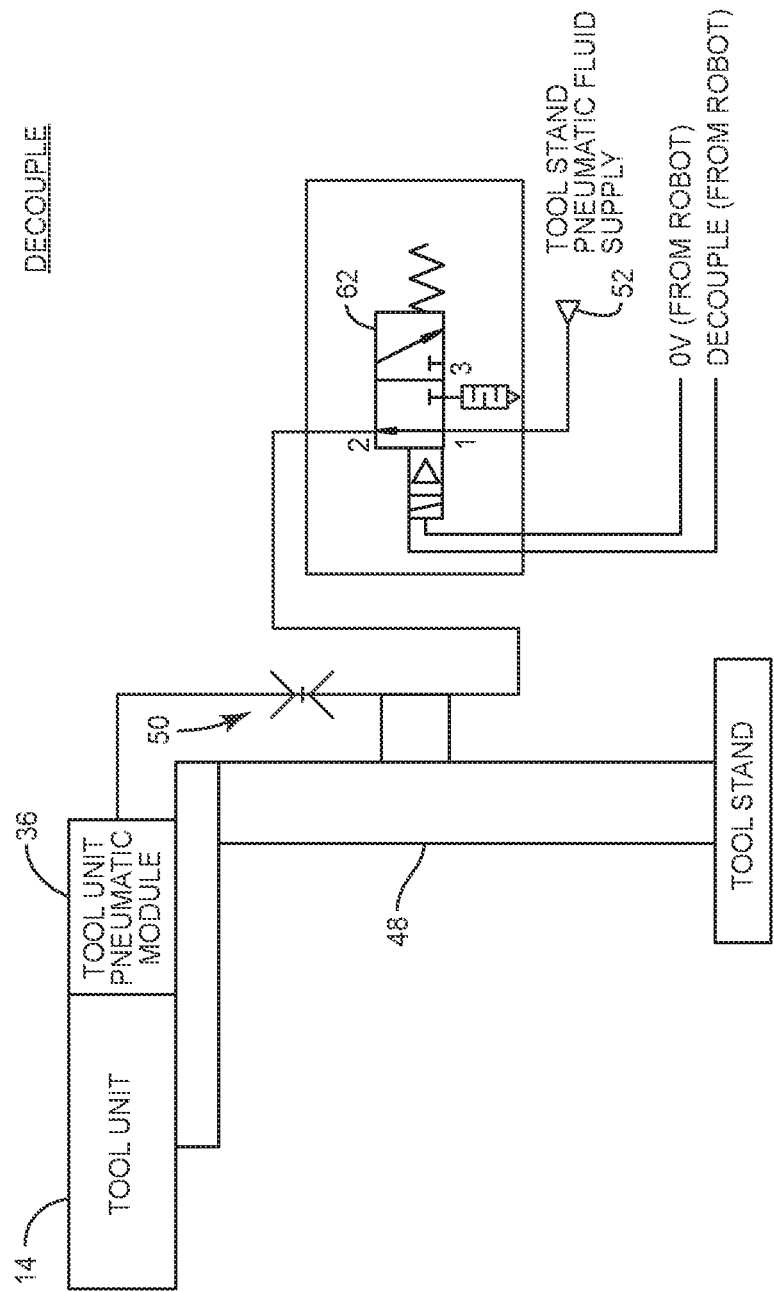
FIG. 5D is a pneumatic schematic diagram of the tool side of a tool changer in a tool stand during a decouple operation, according to a second embodiment.
Figure 5E:
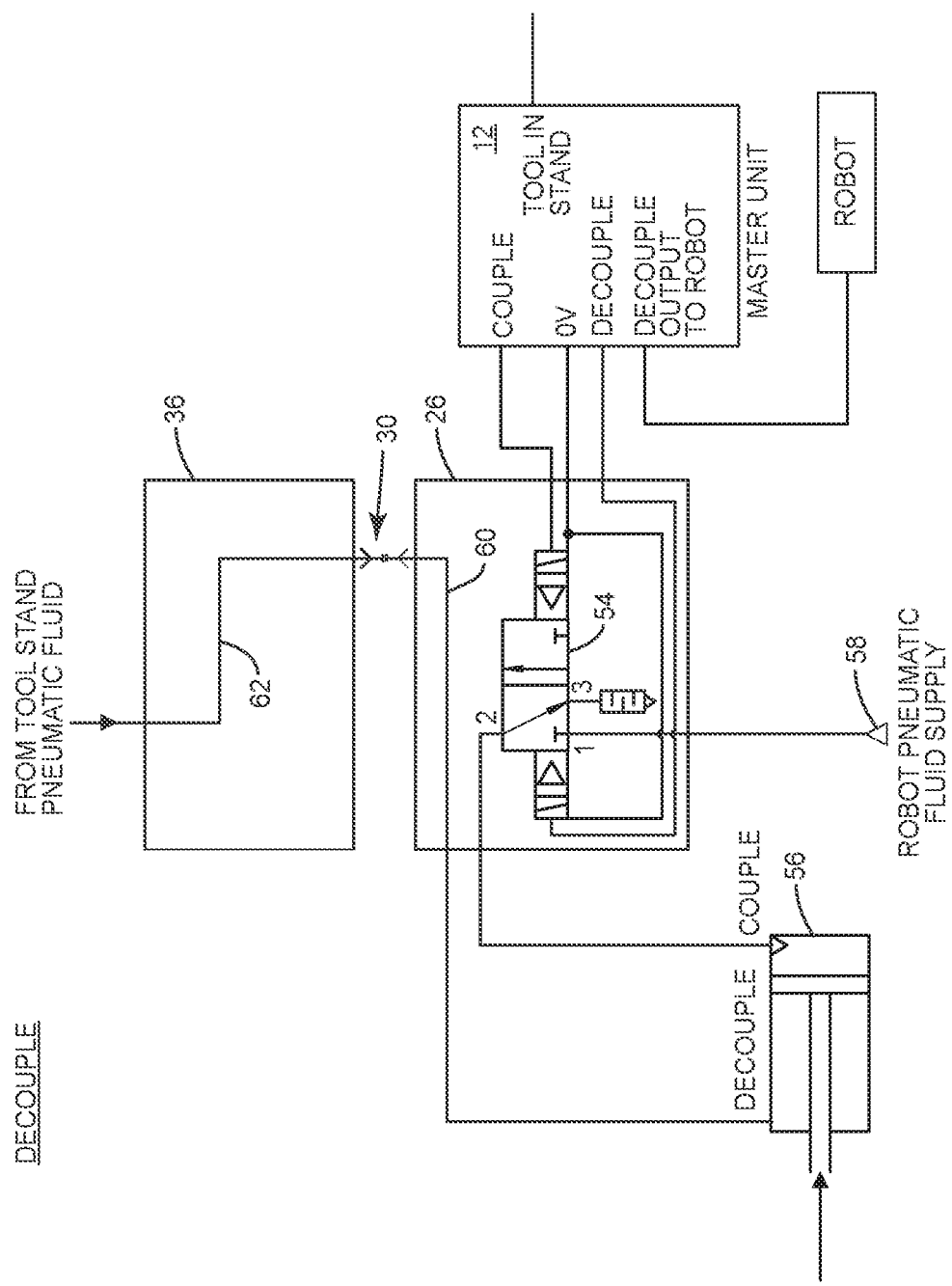
FIG. 5E is a pneumatic schematic diagram of a tool changer depicting a decouple operation, according to a second embodiment.

FIGS. 5D and 5E depict the decouple operation. Once the robotic tool is safely disposed in the tool stand 48, and the master unit 12 receives notice of this fact, the master unit 12 and tool unit 14 may decouple. The master unit 12 deasserts the COUPLE signal and asserts the DECOUPLE signal, and distributes it to both the couple control valve 54 and to the robot. The robot relays the DECOUPLE signal (either directly, or as a digital command, via a network, or in any other manner) to the decouple control valve 62. The DECOUPLE signal provided by the robot to the decouple control valve 62 causes the decouple control valve 62 to connect the tool stand pneumatic fluid supply 52 to the pneumatic coupling 50. Pneumatic fluid then flows to the tool side pneumatic module 36.

The pneumatic fluid flows through the pneumatic flow-through conduit 62 in the tool unit pneumatic module 36, through the pneumatic coupling 30 into the master unit pneumatic module 26, and through the pneumatic flow-through conduit 60 to the decouple port of the pneumatically-actuated piston 56. Simultaneously, the DECOUPLE command causes the couple control valve 54 to direct air from the couple port of the piston 56 to vent. These two valve settings allow pneumatic fluid supplied by the tool stand 48 to drive the piston 56 backwards, or to a decoupled position, allowing the master unit 12 and the tool unit 14 to decouple. The robot may then move, with the master unit 12, to retrieve a different robotic tool, leaving the robotic tool safely disposed in the tool stand 48.

The second embodiment removes the decouple control valve from the tool changer 10 to the tool stand. A tool unit 14 (and tool unit pneumatic module 36, if separate) is typically permanently installed on every tool that a robot may utilize. In a facility where only a subset of the available robotic tools may be utilized by a given robot, and the tools can operate using the same tool stand, the second embodiment reduces cost, maintenance, and risk by minimizing the required replication of the decouple control valve. Placing the decouple control valve on the tool stand may also allow for easier inspection, maintenance, or replacement, as opposed to disassembling each tool unit pneumatic module 36. Additionally, the cost and complexity of the tool unit pneumatic module 36 is dramatically reduced, as it has no pneumatic valve or electrical connections.

Detailed Description of Third Embodiment

FIGS. 6A-6E depict a third embodiment, in which the couple control valve is disposed in the master unit pneumatic module, the decouple control valve is disposed in the tool unit pneumatic module, and the decoupling pneumatic fluid is routed through a bridge conduit on the tool stand prior to being directed to the coupling mechanism.

Figure 6A:
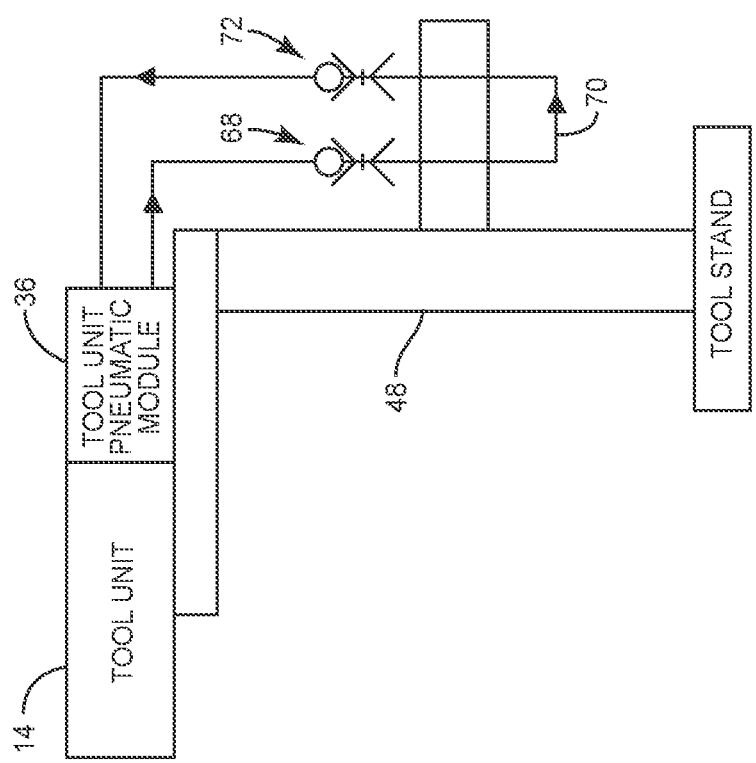
FIG. 6A is a pneumatic schematic diagram of the tool side of a tool changer in a tool stand, according to a third embodiment.

FIG. 6A depicts a pneumatic bridge conduit 70 on the tool stand 48. The bridge conduit 70 receives pneumatic fluid from the tool unit pneumatic module 36 via a supply pneumatic coupling 68, and routes the pneumatic fluid back to the tool unit pneumatic module 36 via a return pneumatic coupling 72. Both pneumatic couplings 68, 72 are engaged when the robot positions an attached robotic tool in the tool stand 48. Check valves on the tool changer side of the pneumatic couplings 68, 72 prevent the leakage of pneumatic fluid when the robotic tool is removed from the tool stand 48.

Figure 6B:
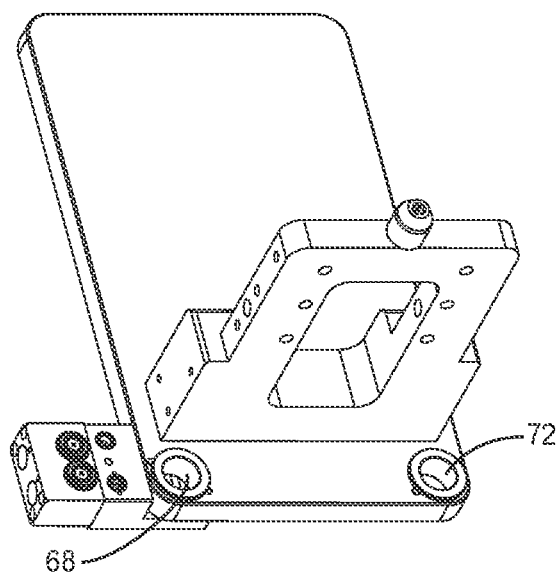
FIG. 6B is a perspective view of a tool unit attachment, according to a third embodiment.
Figure 6C:
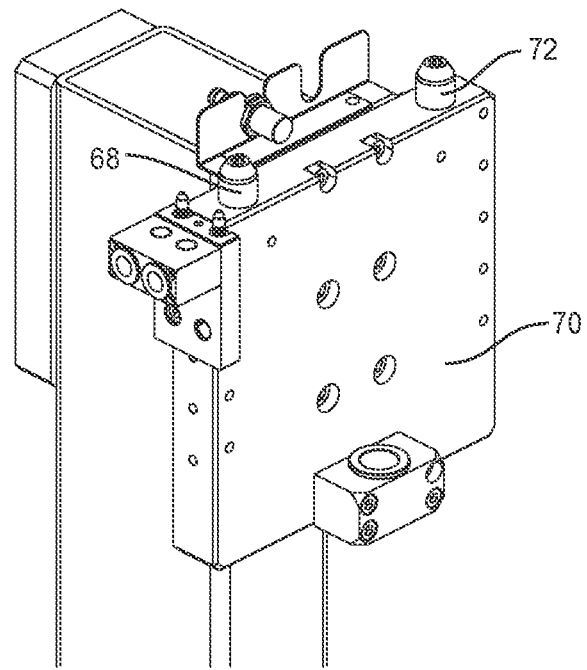
FIG. 6C is a perspective view of a tool stand attachment including a bridge conduit, according to a third embodiment.
Figure 6D:
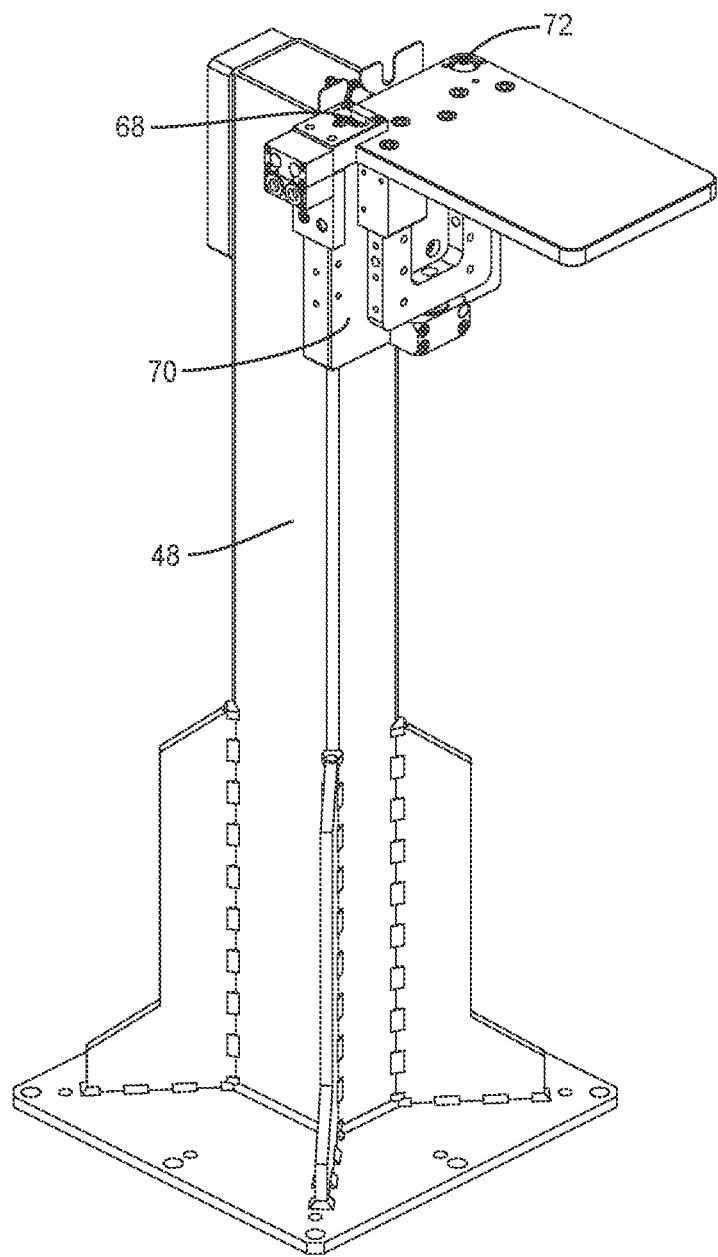
FIG. 6D is a perspective view of the attachments of FIGS. 6B and 6C mounted on a tool stand, according to a third embodiment.

FIG. 6B depicts an attachment to the tool unit pneumatic module 36 that presents supply and return pneumatic couplings 68, 72, respectively, to the tool stand 48. FIG. 6C depicts an attachment to the tool stand 48 with mating supply and return pneumatic couplings 68, 72, respectively, connected to a pneumatic bridge conduit 70 internal to the attachment. FIG. 6D depicts the two attachments as they are configured when a robotic tool is disposed in the tool stand 48 (the tool unit 14, tool unit pneumatic module 36, and robotic tool are omitted from FIG. 6D for clarity).

Figure 6E:
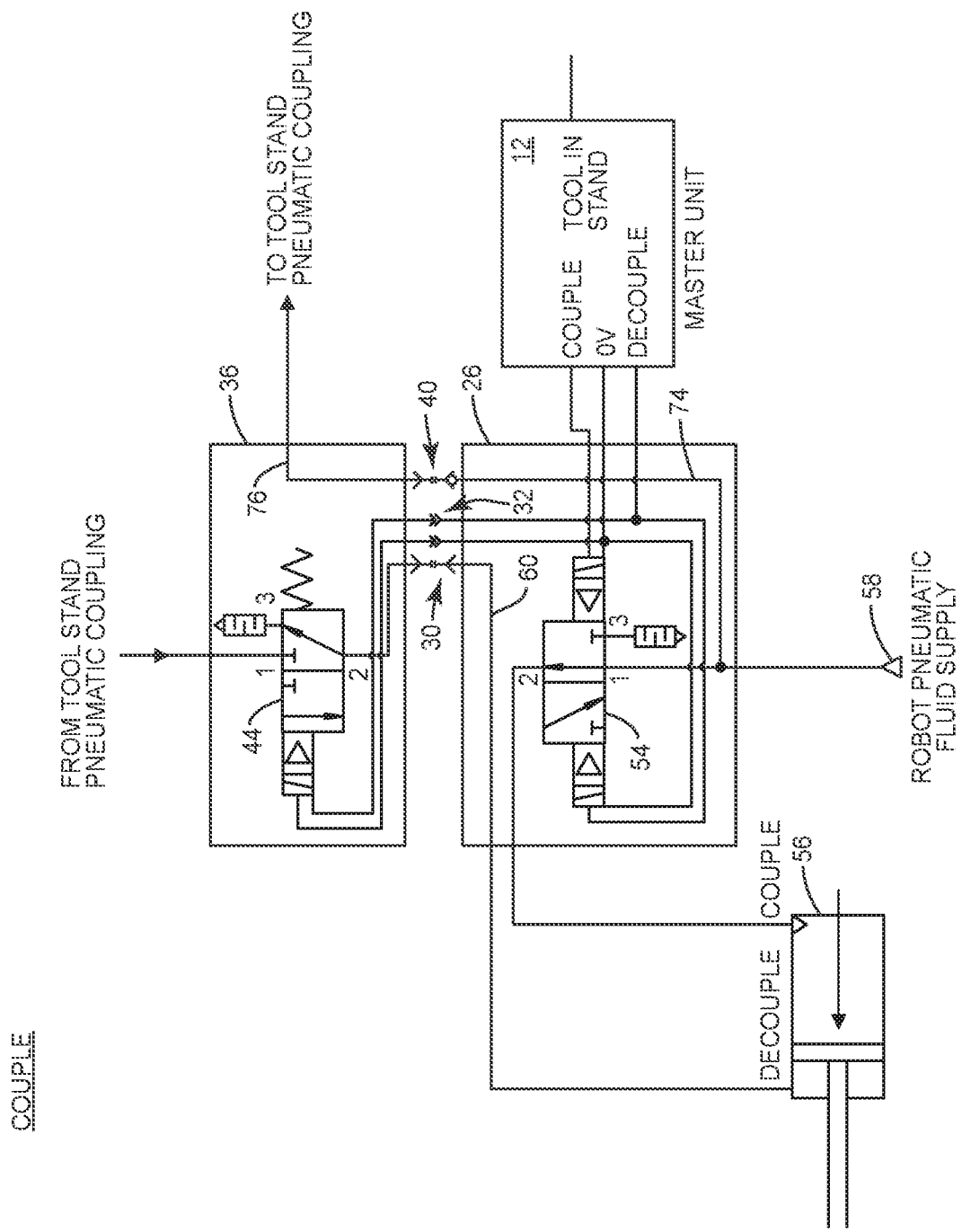
FIG. 6E is a pneumatic schematic diagram of a tool changer depicting a couple operation, according to a third embodiment.

FIG. 6E depicts the pneumatic and control signal flow between the master and tool unit pneumatic modules 26, 36. The master unit 12 and master unit pneumatic module 26 are similar to those described above with respect to the first embodiment, with the addition of a pneumatic pass-through conduit 74 connecting the robot pneumatic fluid supply 58 to a second pneumatic coupling port 40. The coupling port 40 is positioned and operative to mate with a corresponding pneumatic coupling port on the tool unit pneumatic module 36. In this third embodiment, the tool unit 14 and tool unit pneumatic module 36 are also similar to those described above with respect to the first embodiment, with the addition of the second pneumatic coupling port 40 and a pneumatic pass-through conduit 76 connecting the pneumatic coupling 40 to the tool stand supply pneumatic coupling 68.

In this embodiment, when an attached robotic tool is disposed in the tool stand 48, pneumatic fluid flows from the robot pneumatic fluid supply 58, through the master and tool unit pneumatic modules 26, 36, through the supply pneumatic coupling 68, bridge conduit 70, and return pneumatic coupling 72 on the tool stand 48, and back to the tool unit pneumatic module 36. From there, it is selectively routed to the decouple port of the pneumatically-actuated piston 56, as in previously described embodiments. Removal of the robotic tool from the tool stand 48 breaks this pneumatic fluid flow path, disallowing decoupling of the coupling mechanism 16.

In the third embodiment, coupling operates similarly to that described above for the first embodiment. Upon the COUPLE signal being asserted, the couple control valve 54 is configured to pass pneumatic fluid from the robot pneumatic fluid supply 58 to the couple port of the pneumatically-actuated piston 56. The decouple port of the piston 56 is connected via the pneumatic flow-through conduit 60 in the master unit pneumatic module 26 to the pneumatic coupling 30. This allows pneumatic fluid from the decouple chamber of the piston 56 to flow through the pneumatic coupling 30 to the tool unit valve 44. The DECOUPLE signal, which is passed to the tool unit valve 44 via the electrical coupling 32, is deasserted. Because the DECOUPLE signal is deasserted, the decouple control valve 44 is in its default state, connecting the pneumatic coupling 30 to an exhaust vent. In this configuration, the piston 56 is driven forward, in the first direction, to couple the master unit 12 and tool unit 14 together. The piston 56 is allowed to move in the first direction by air in the decouple chamber being vented via the decouple control valve 44.

Once the master unit 12 is coupled to the tool unit 14 and the robot removes the attached robotic tool from the tool stand 48, the units 12, 14 cannot become decoupled. The robot pneumatic fluid source 58 continues to supply positive pressure, through the couple control valve 54, to the couple port of the piston 56, forcing the piston 56 to the forward, or coupled, position. Critically, because pneumatic fluid to drive the decouple port of the piston 56 is routed through a bridge 70 on the tool stand 48, once the robotic tool is removed from the tool stand 48, there is no source of pneumatic fluid connected to the decouple port of the piston 56 to drive the piston backward, toward the decoupled position (even if there were, air trapped in the couple chamber of the piston 56 has no path to vent, and would resist movement of the piston 56 in that direction).

Figure 6F:
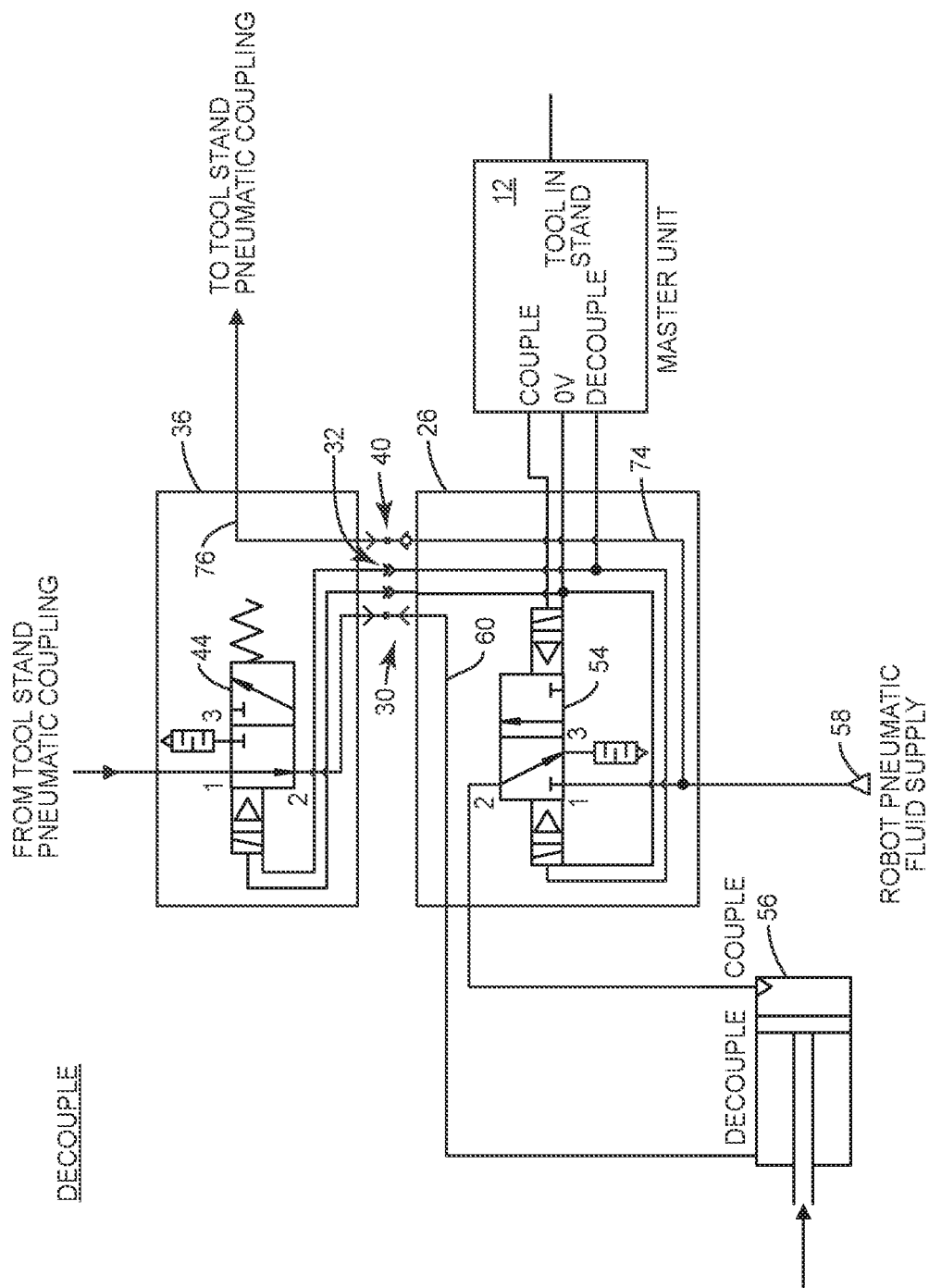
FIG. 6F is a pneumatic schematic diagram of a tool changer depicting a decouple operation, according to a third embodiment.

FIG. 6F depicts the decouple operation. Once the robotic tool is safely disposed in the tool stand 48, and the master unit 12 receives notice of this fact, the master unit 12 and tool unit 14 may decouple. The master unit 12 deasserts the COUPLE signal and asserts the DECOUPLE signal, which causes the decouple control valve 44 to pass pneumatic fluid from the return coupling 72 of the bridge 70 to the pneumatic coupling 30. The pneumatic flow-through conduit 60 in the master unit pneumatic module 26 conveys the pneumatic fluid to the decouple port of the piston 56. Simultaneously, the DECOUPLE command causes the couple control valve 54 to direct air from the couple port of the piston 56 to vent. These two valve settings allow pneumatic fluid supplied by the robot pneumatic source 58, but routed through the tool stand 48, to drive the piston 56 backwards, or to a decoupled position, allowing the master unit 12 and the tool unit 14 to decouple. The robot may then move, with the master unit 12, to retrieve a different robotic tool, leaving the robotic tool safely disposed in the tool stand 48.

The third embodiment employs only a single pneumatic fluid source for both couple and decouple operations, yet implements the inherently safe feature by routing decouple pneumatic fluid through the tool stand. Since, as noted above, many robots already provide a pneumatic fluid supply, the third embodiment may require minimal changes to a facility—only the addition of supply and return pneumatic couplings and a pneumatic bridge conduit to the tool stand. On the other hand, the cost and complexity of the master and tool unit pneumatic modules is increased, as they required additional pneumatic pass-through conduits and an additional pneumatic coupling.

Detailed Description of Fourth Embodiment

FIGS. 7A-7D depict a fourth embodiment, in which the couple control valve is associated with the robot, the decouple control valve is associate with the tool stand, a decoupling pneumatic fluid source is associated with the tool stand, and both the master and tool unit pneumatic modules include only pneumatic pass-through circuits.

Figure 7A:
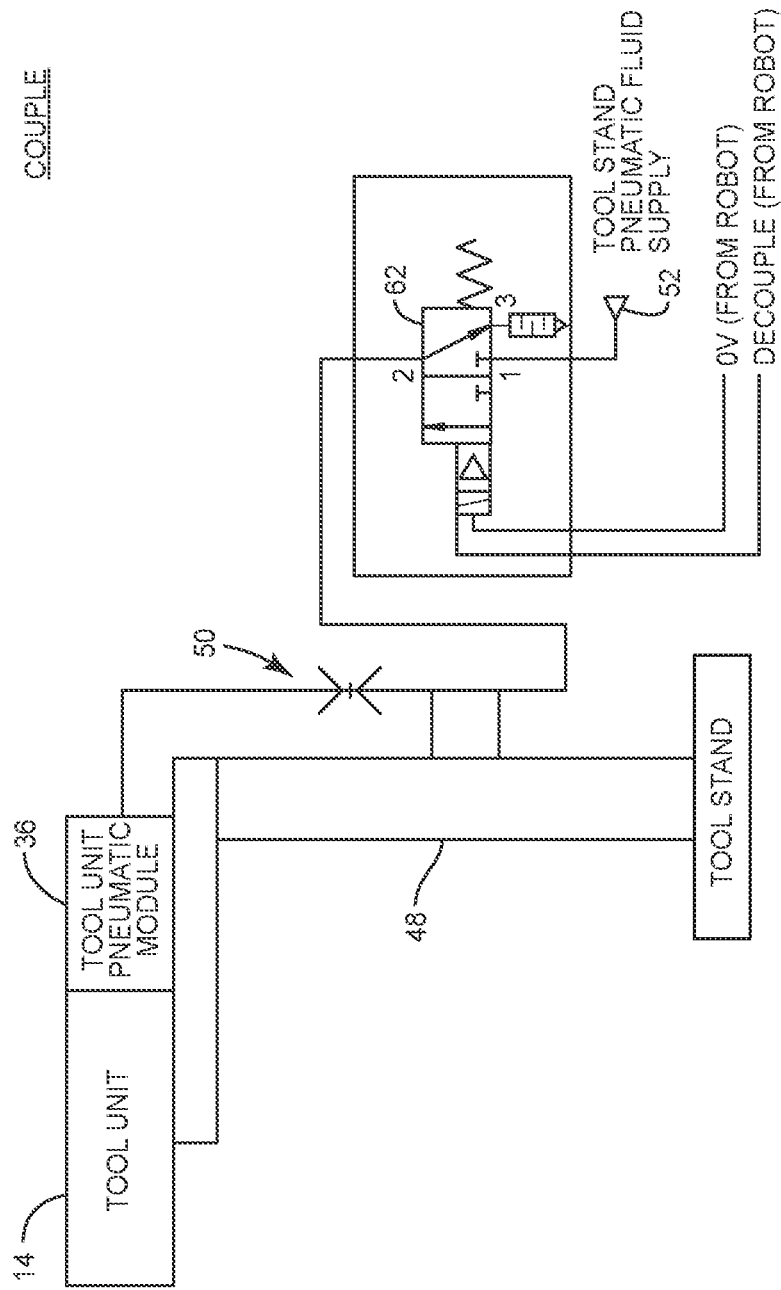
FIG. 7A is a pneumatic schematic diagram of the tool side of a tool changer in a tool stand during a couple operation, according to a fourth embodiment.
Figure 7B:
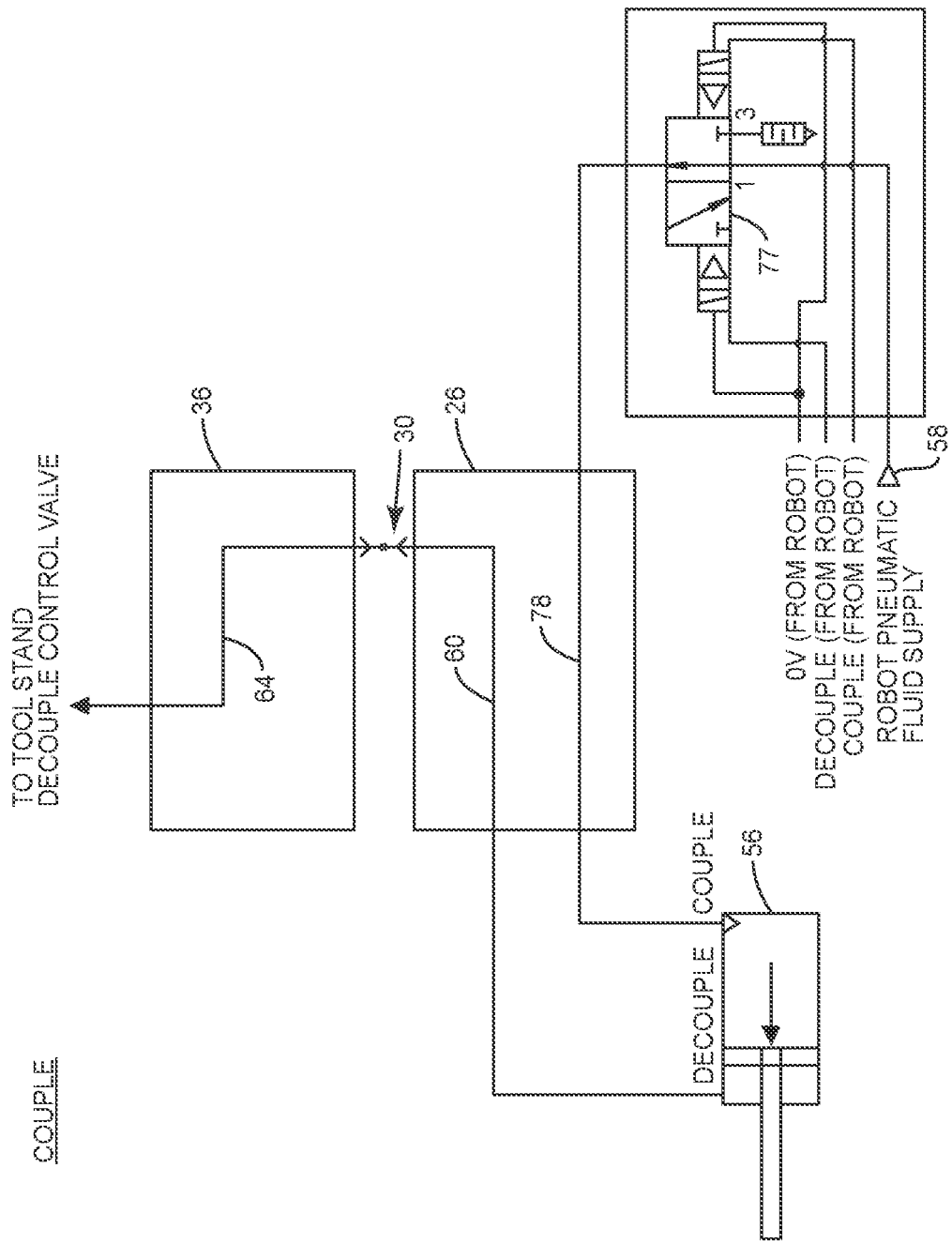
FIG. 7B is a pneumatic schematic diagram of a tool changer depicting a couple operation, according to a fourth embodiment.

FIGS. 7A and 7B depict the coupling operation. The tool stand pneumatic fluid supply 52 provides pneumatic fluid to a 3-way solenoid decouple control valve 62, which is associated with the tool stand 48, as in the second embodiment describe above. The decouple control valve 62 receives the DECOUPLE command from the robot. As in the second embodiment, the tool unit pneumatic module 36 connects to the tool stand pneumatic fluid via pneumatic coupling 50 when an attached robotic tool is disposed in the tool stand 48.

FIG. 7B depicts that a couple control valve 76 is associated with the robot. In this embodiment, the tool unit pneumatic module 36 is the same as described above with respect to the second embodiment—including a pneumatic pass-through conduit 64 but no valve or control signals. The master unit pneumatic module 26 also includes no valve or control signals, and comprises two pneumatic pass-through conduits 60 and 78. The pneumatic pass-through conduit 60 is as described above in all embodiments; the pneumatic pass-through conduit 78 connects the couple port of the pneumatically-actuated piston 56 with the couple control valve 77 associated with the robot.

In the fourth embodiment, coupling operates similarly to that described above, but with the coupling control valve 77 being associated with, and receiving commands from, the robot. Upon the COUPLE signal being asserted, the couple control valve 77 is configured to pass pneumatic fluid from the robot pneumatic fluid supply 58, through the pneumatic pass-through conduit 78 in the master unit pneumatic module 26, to the couple port of the pneumatically-actuated piston 56. The decouple port of the piston 56 is connected via the pneumatic flow-through conduit 60 in the master unit pneumatic module 26 to the pneumatic coupling 30. This allows pneumatic fluid from the decouple chamber of the piston 56 to flow through the pneumatic flow-through conduit 64 in the tool unit pneumatic module 36, and the tool stand pneumatic coupling 50, to the decouple control valve 62. The DECOUPLE signal, which is passed to the decouple control valve 62 by the robot, is deasserted. Because the DECOUPLE signal is deasserted, the decouple control valve 62 is in its default state, connecting the tool stand pneumatic coupling 50 to an exhaust vent. In this configuration, the piston 56 is driven forward, in the first direction, to couple the master unit 12 and tool unit 14 together. The piston 56 is allowed to move in the first direction by air in the decouple chamber being vented via the decouple control valve 62.

Once the master unit 12 is coupled to the tool unit 14 and the robot removes the attached robotic tool from the tool stand 48, the units 12, 14 cannot become decoupled. The robot pneumatic fluid source 58 continues to supply positive pressure, through the couple control valve 77, to the couple port of the piston 56, forcing the piston 56 to the forward, or coupled, position. Critically, there is no source of pneumatic fluid connected to the decouple port of the piston 56 to drive the piston backward, toward the decoupled position (even if there were, air trapped in the couple chamber of the piston 56 has no path to vent, and would resist movement of the piston 56 in that direction).

Figure 7C:
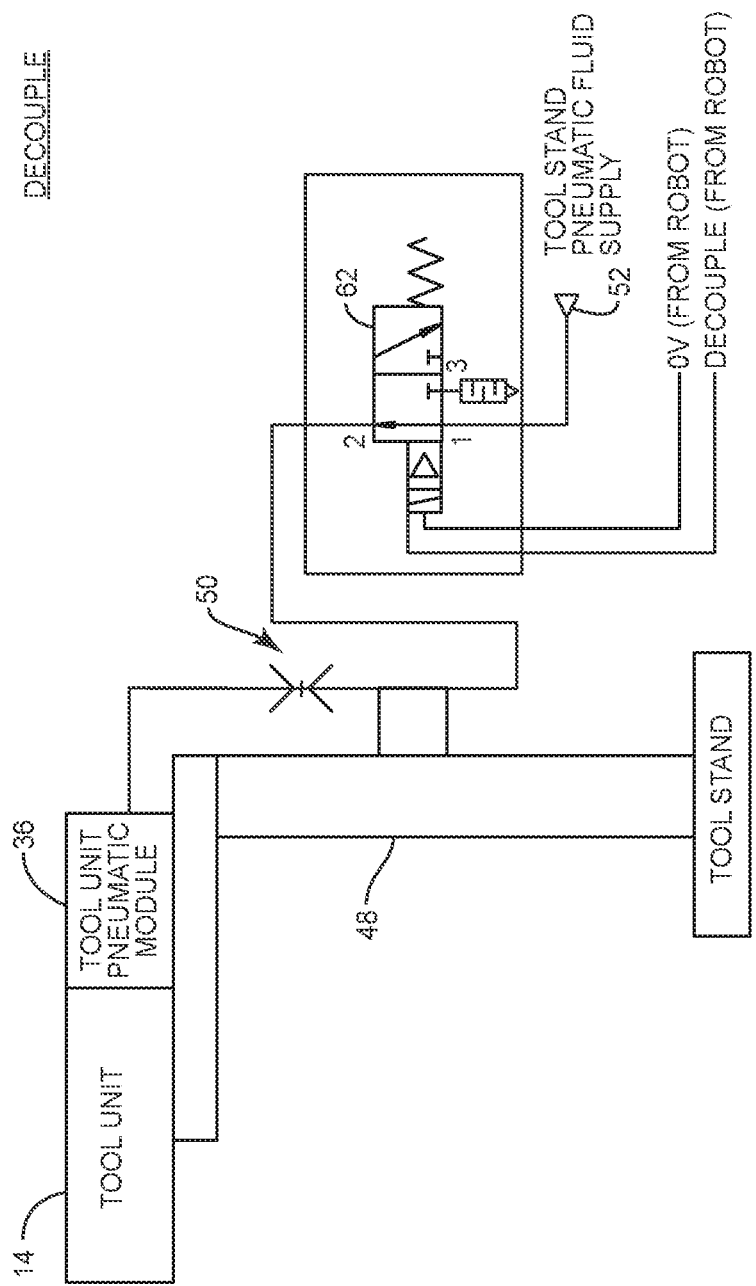
FIG. 7C is a pneumatic schematic diagram of the tool side of a tool changer in a tool stand during a decouple operation, according to a fourth embodiment.
Figure 7D:
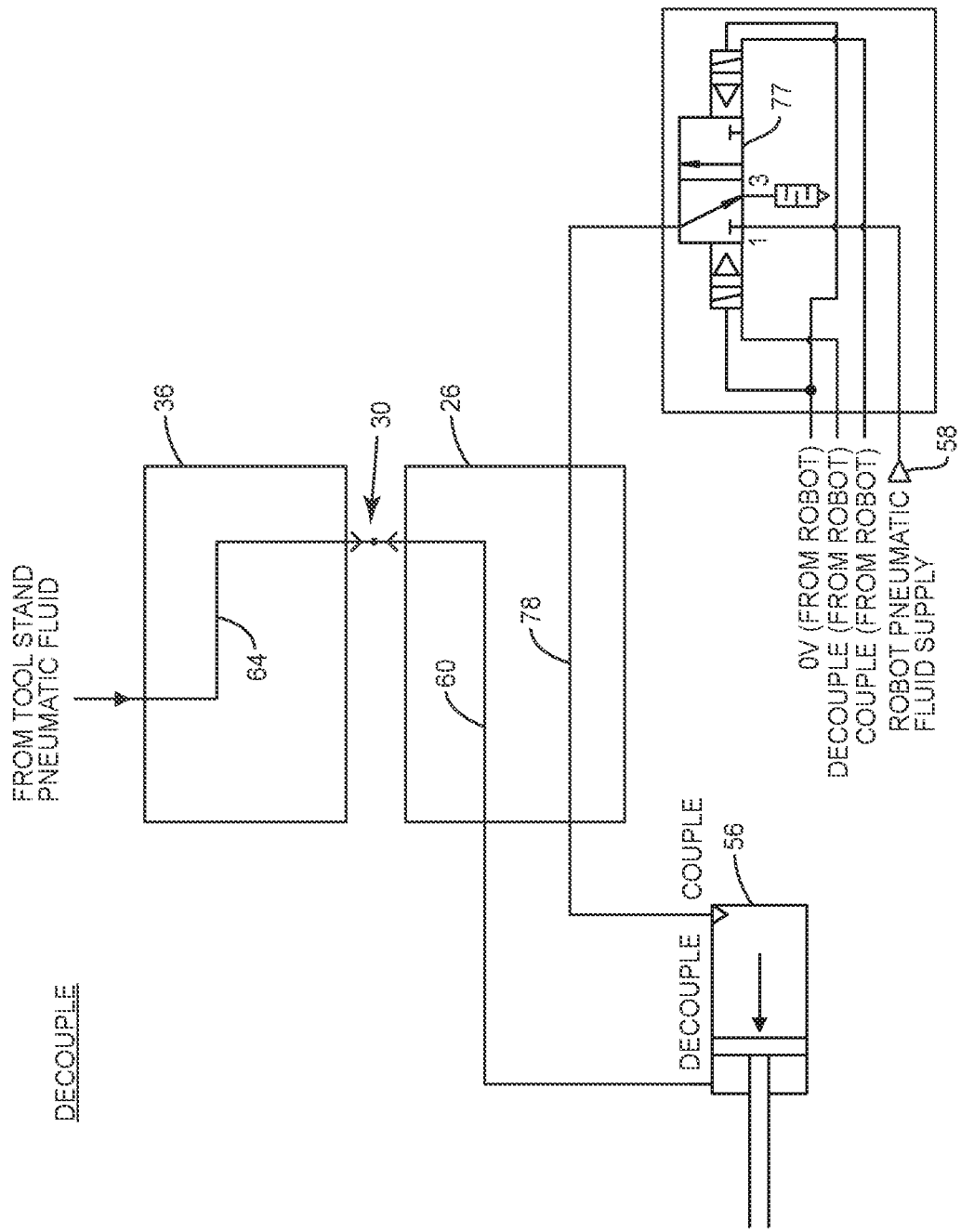
FIG. 7D is a pneumatic schematic diagram of a tool changer depicting a decouple operation, according to a fourth embodiment.

FIGS. 7C and 7D depict the decouple operation. Once the robotic tool is safely disposed in the tool stand 48 (the robot is aware of this fact), the master unit 12 and tool unit 14 may decouple. The robot deasserts the COUPLE signal and asserts the DECOUPLE signal, and distributes it to the couple control valve 77. The robot relays the DECOUPLE signal (either directly, as a digital command, via a network, or in any other manner) to the decouple control valve 62. The DECOUPLE signal provided by the robot to the decouple control valve 62 causes the decouple control valve 62 to connect the tool stand pneumatic fluid supply 52 with the pneumatic coupling 50. Pneumatic fluid then flows to the tool side pneumatic module 36.

The decoupling pneumatic fluid then flows through the pneumatic flow-through conduit 62 in the tool unit pneumatic module 36, through the pneumatic coupling 30 into the master unit pneumatic module 26, and through the pneumatic flow-through conduit 60 to the decouple port of the pneumatically-actuated piston 56. Simultaneously, the DECOUPLE command causes the couple control valve 77 to direct air from the couple port of the piston 56 to vent. These two valve settings allow pneumatic fluid supplied by the tool stand 48 to drive the piston 56 backwards, or to a decoupled position, allowing the master unit 12 and the tool unit 14 to decouple. The robot may then move, with the master unit 12, to retrieve a different robotic tool, leaving the robotic tool safely disposed in the tool stand 48.

The fourth embodiment removes both couple and decouple control valves from the tool changer 10 to the facility equipment (i.e., robot and tool stand). This embodiment minimizes the cost and complexity of the master and tool unit pneumatic modules, as neither includes any valve or electrical contacts. Accordingly, the fourth embodiment may be preferred where the cost of the tool changer 10 is to be minimized.

Detailed Description of Fifth Embodiment

FIGS. 8A-8D depict a fifth embodiment, in which the couple control valve is disposed in the master unit pneumatic module, a decoupling pneumatic fluid supply is associated with the tool stand, and there is no decouple control valve.

FIG. 8A depicts the tool unit 14 and tool unit pneumatic module 36 disposed (along with an attached robotic tool, not shown) in the tool stand 48. As in the first embodiment, the tool unit pneumatic module 36 is connected, via a pneumatic coupling 50, to a tool stand pneumatic fluid supply 52. The tool stand pneumatic fluid supply 52 supplies pneumatic fluid at a first pressure, such as between 20 and 30 psi. The pneumatic coupling 50, which includes a check valve on the tool stand side to arrest the flow of pneumatic fluid when the robotic tool is removed from the tool stand 48, supplies pneumatic fluid at the first pressure from the tool stand pneumatic fluid supply 52 to the tool unit pneumatic module 36 when an attached robotic tool is safely disposed within the tool stand 48.

Figure 8B:
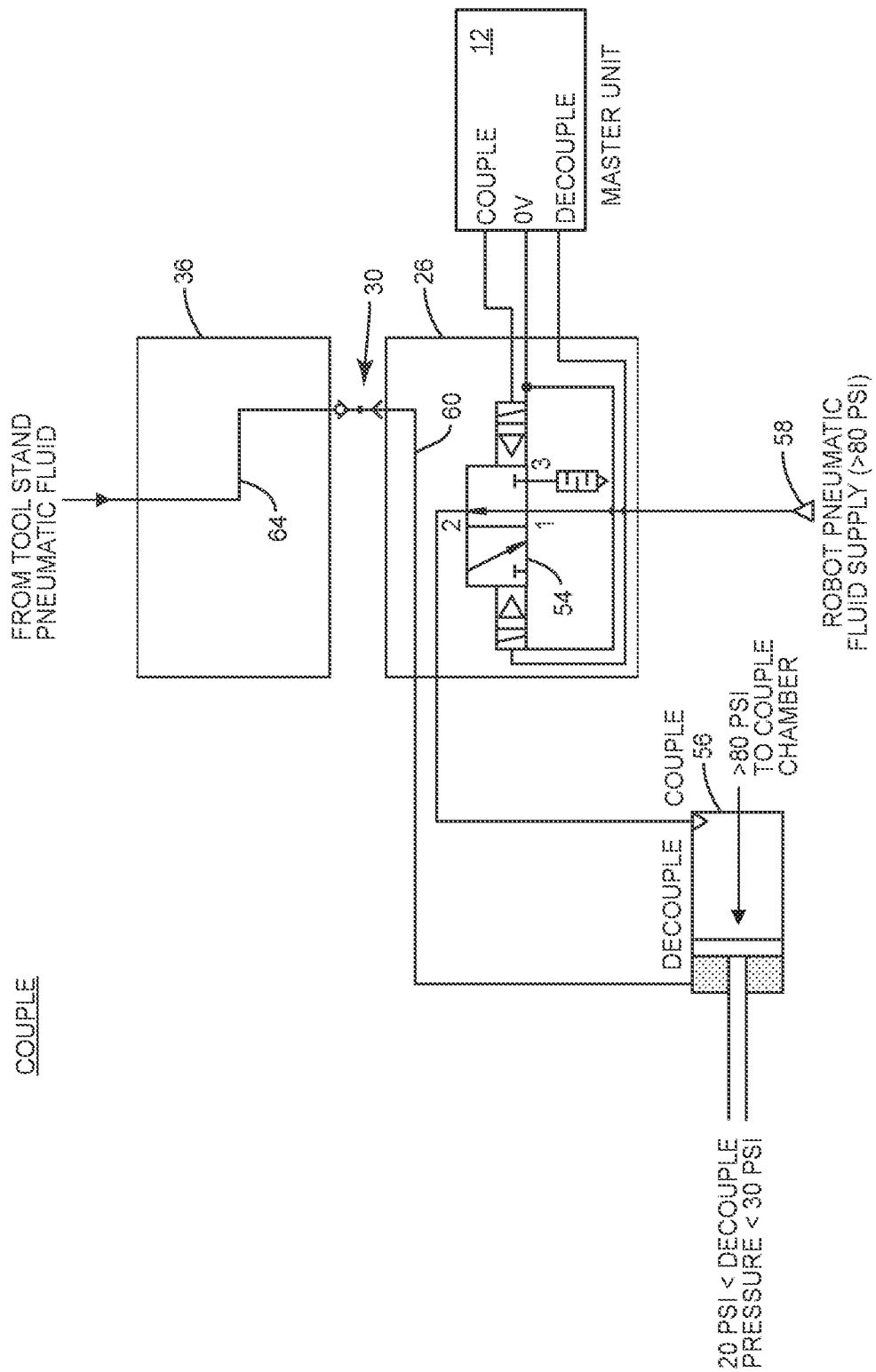
FIG. 8B is a pneumatic schematic diagram of a tool changer depicting a couple operation, according to a fifth embodiment.

FIG. 8B depicts the pneumatic and control signal flow between the master and tool unit pneumatic modules 26, 36 during a coupling operation. The master unit 12 and master unit pneumatic module 26 are the same as described above with respect to the first and second embodiments. That is, the master unit pneumatic module 26 includes the couple control valve 54 receiving pneumatic fluid from the robot pneumatic fluid supply 58 at a second pressure, greater than the first pressure of the tool stand pneumatic fluid supply 52. For example, the robot pneumatic fluid supply 58 may supply pneumatic fluid at a pressure greater than 80 psi. The master unit pneumatic module 26 also includes a pneumatic pass-through conduit 60 connecting the decouple port of the piston 56 to the pneumatic coupling 30. The tool unit 14 and tool unit pneumatic module 36 are the similar to those described above with respect to the second and fourth embodiments. That is, the tool unit pneumatic module 36 includes only a pneumatic pass-through conduit 64, and does not receive any electrical signals. However, in this embodiment, the pneumatic coupling port 30 is a checked port operative to arrest the flow of pneumatic fluid when the master unit pneumatic module 26 and tool unit pneumatic module 36 are separated.

Unlike all previously described embodiments, in the fifth embodiment, the tool changer 10 does not employ a decouple control valve (whether disposed in the tool unit pneumatic module 36 or on the tool stand 48) to selectively direct decoupling pneumatic fluid to the decouple port of the piston 56, or alternatively vent the decouple chamber of the piston 56. Rather, the design relies on a substantial pressure differential between the coupling pneumatic fluid at the higher second pressure (e.g., >80 psi) and the decoupling pneumatic fluid at the lower first pressure (e.g., 20-30 psi).

The coupling operation proceeds substantially similar to those describe previously, with the exception of venting the decouple chamber of the piston 56. Upon the COUPLE signal being asserted, the couple control valve 54 is configured to pass pneumatic fluid from the robot pneumatic fluid supply 58 at the higher second pressure to the couple port of the pneumatically-actuated piston 56. The decouple port of the piston 56 is maintained at the lower first pressure by connection to the tool stand pneumatic fluid supply 52 via the pneumatic pass-through conduits 60, 64 and the tool stand pneumatic coupling 50. Because of the pressure differential, the piston 56 will actuate towards the forward, or first direction, by compressing the pneumatic fluid in the decouple chamber and the pneumatic pass-through conduits 60, 64. The piston 56 will actuate sufficiently far to safely couple the master unit 12 to the tool unit 14. However, only upon the robot removing the robotic tool from the tool stand 48 will the full locking force of the coupling mechanism 16 be achieved, as the decouple chamber of the piston 56 vents to the atmosphere through the tool changer side of the tool stand pneumatic coupling 50.

Once the master unit 12 is coupled to the tool unit 14 and the robot removes the attached robotic tool from the tool stand 48, the units 12, 14 cannot become decoupled. The robot pneumatic fluid source 58 continues to supply the higher second pressure, through the couple control valve 54, to the couple port of the piston 56, forcing the piston 56 to the forward, or coupled, position. Critically, there is no source of pneumatic fluid connected to the decouple port of the piston 56 to drive the piston backward, toward the decoupled position (even if there were, air trapped in the couple chamber of the piston 56 has no path to vent, and would resist movement of the piston 56 in that direction).

Figure 8C:
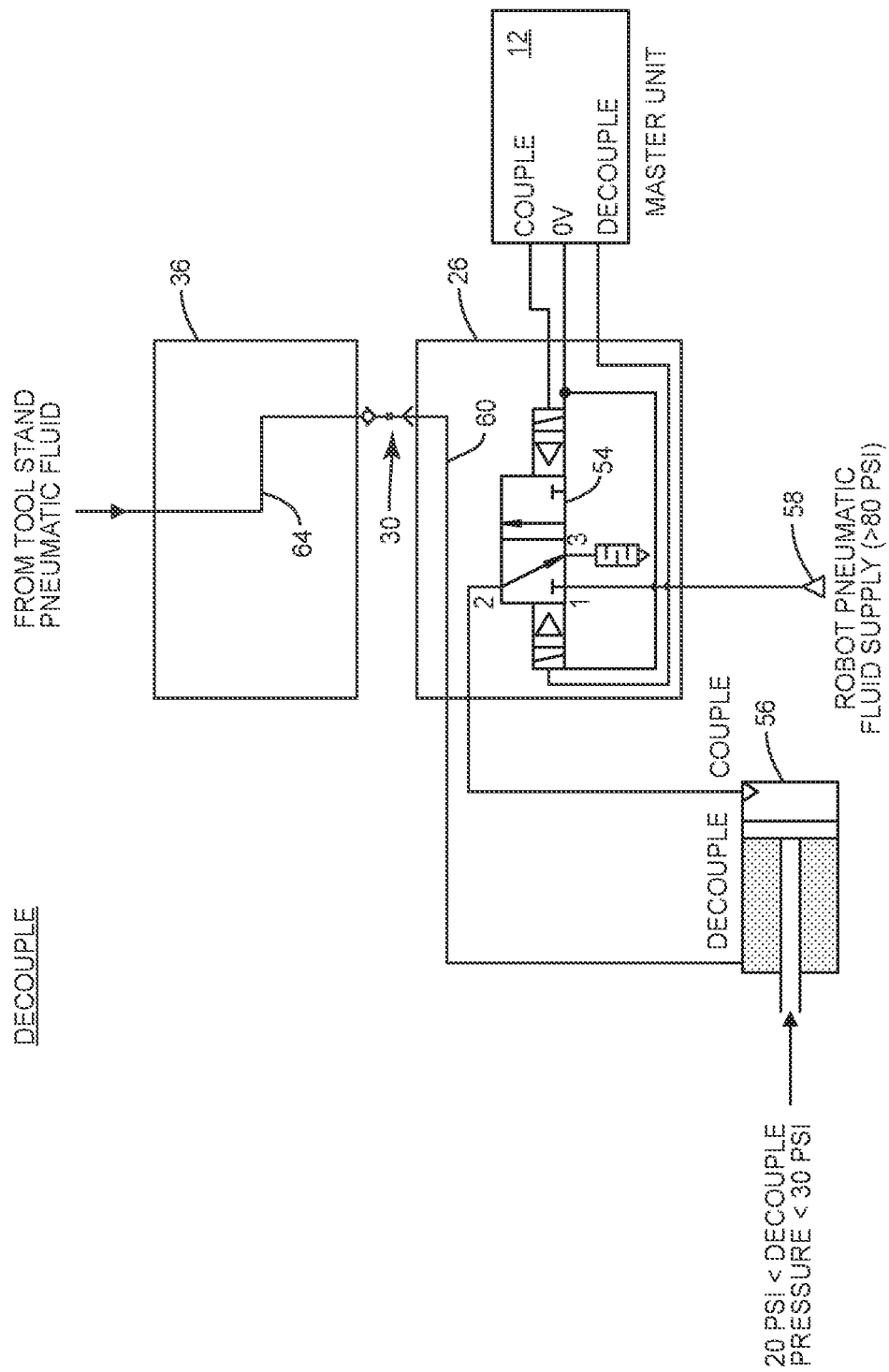
FIG. 8C is a pneumatic schematic diagram of a tool changer depicting a decouple operation, according to a fifth embodiment.

FIG. 8C depicts the decouple operation for the fifth embodiment. Once the robotic tool is safely disposed in the tool stand 48, the master unit 12 and tool unit 14 may decouple. The master unit 12 deasserts the COUPLE signal and asserts the DECOUPLE signal. This causes the couple control valve 54 to vent pressure from the couple chamber of the piston 56. The tool stand pneumatic fluid supply 52, providing pneumatic fluid at the lower first pressure, is connected via the tool stand pneumatic coupling 50, pneumatic pass-through conduit 64, coupling 30, and pneumatic pass-through circuit 60, to the decouple port of the piston 56. While the lower first pressure of the tool stand pneumatic fluid supply 52 is insufficient to overcome the higher second pressure of the robot pneumatic fluid supply 58, the DECOUPLE signal at the couple control valve 54 configures the valve 54 to present atmospheric pressure to the couple chamber of the piston 56, allowing the lower first pressure to fully decouple the coupling mechanism 16.

Figure 8D:
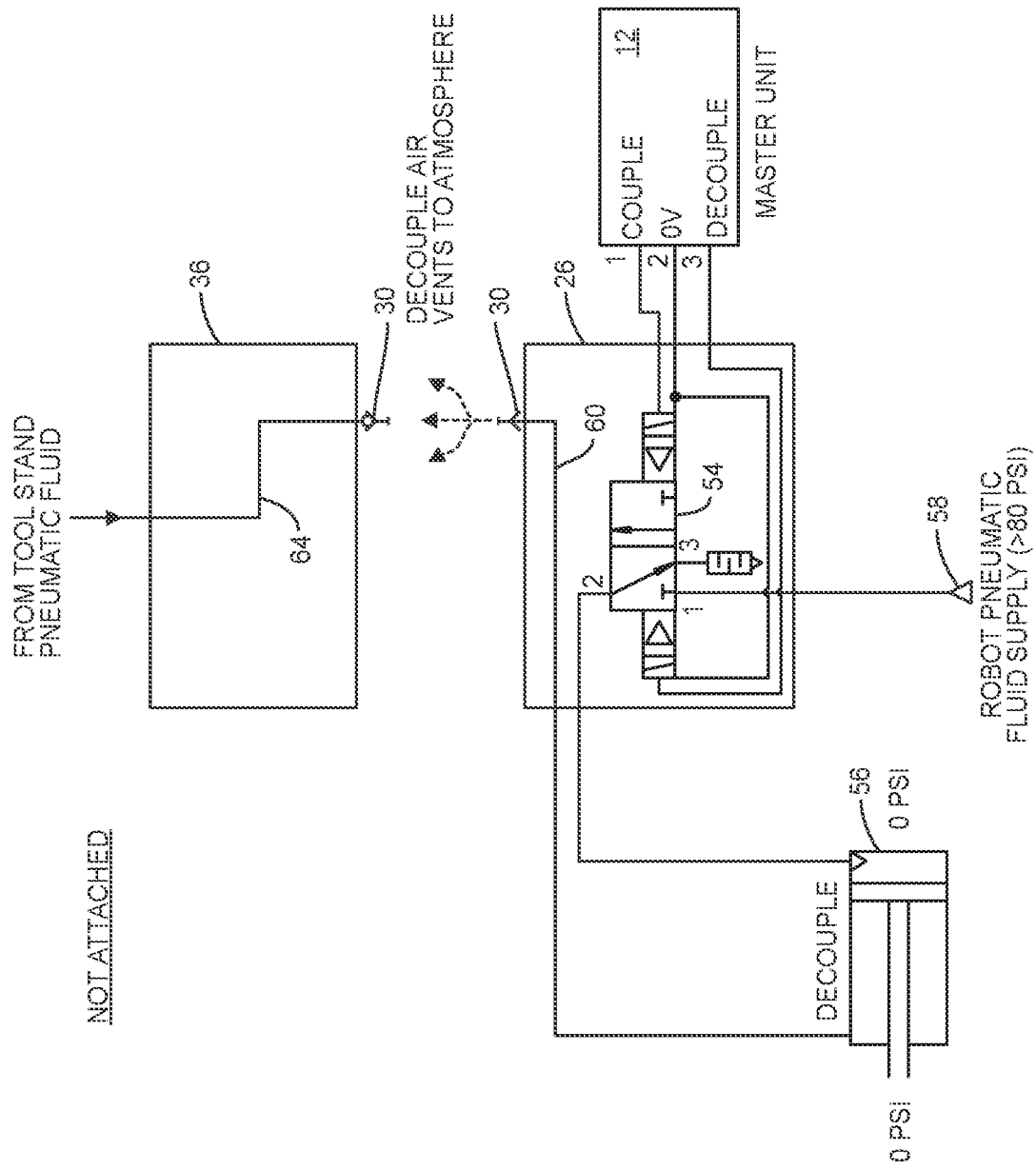
FIG. 8D is a pneumatic schematic diagram of a tool changer when the master and tool units are separated, according to a fifth embodiment.

FIG. 8D depicts the condition after decoupling, when the robot has stowed the robotic tool in the tool stand 48 and moved the master unit 12 away from the tool unit 14. The piston 56 remains in the decoupled position, with no pressure applied to either the couple or decouple port. The couple control valve 54 vents pressure from the couple chamber of the piston 56, and pressure from the decouple chamber of the piston 56 is vented to the atmosphere via the pass-through circuit 60. With the piston 56 in the decouple position, the master unit 12 is ready to couple to the same or a different tool unit 14.

An important parameter for the fifth embodiment is the pressure differential between coupling pneumatic fluid and decoupling pneumatic fluid. The specific values describe above—that is, pneumatic fluid at the tool stand pneumatic fluid supply 52 at a first pressure in the range of 20-30 psi, and pneumatic fluid at the robot pneumatic fluid supply 58 at a second pressure greater than 80 psi—are representative only. These pneumatic pressures provide satisfactory results in tool changers 10 which have been tested. However, these pressure values are not limiting. Those of skill in the art will readily recognize that the optimal pressure differential (and absolute couple and decouple pneumatic fluid pressure values) will vary according to the design of the pneumatically-actuated piston 56, and other system components. Functional requirements for selecting the proper pressure differential in any particular implementation are that, first, enough force is generated by the piston 56 for the master unit 12 to lock onto a tool unit 14 connected to the heaviest robotic tool the robot will encounter in a particular environment or production run. Second, the decouple pneumatic fluid pressure must be sufficient to guarantee that the piston 56 will move to the decoupled position within an acceptable amount of time. Given the teachings of the present disclosure and these functional requirements, those of skill in the robotic arts may readily ascertain acceptable couple and decouple pneumatic fluid pressures for optimal operation in any given implementation.

The fifth embodiment obviates the need for a decouple control valve, thus reducing cost, parts count, complexity, and potential points of failure. Also, in the fifth embodiment the tool unit pneumatic module is of minimal cost and complexity, with no valve or electrical connections, and only one pneumatic pass-through conduit.

Detailed Description of Sixth Embodiment

FIGS. 9A-9D depict a sixth embodiment, in which a single control valve, which is a 4-way dual solenoid valve, controls the flow of couple and decouple pneumatic fluid; the tool unit pneumatic module comprises only pneumatic pass-through conduits; and decouple pneumatic fluid is routed through a bridge conduit in the tool stand.

Figure 9A:
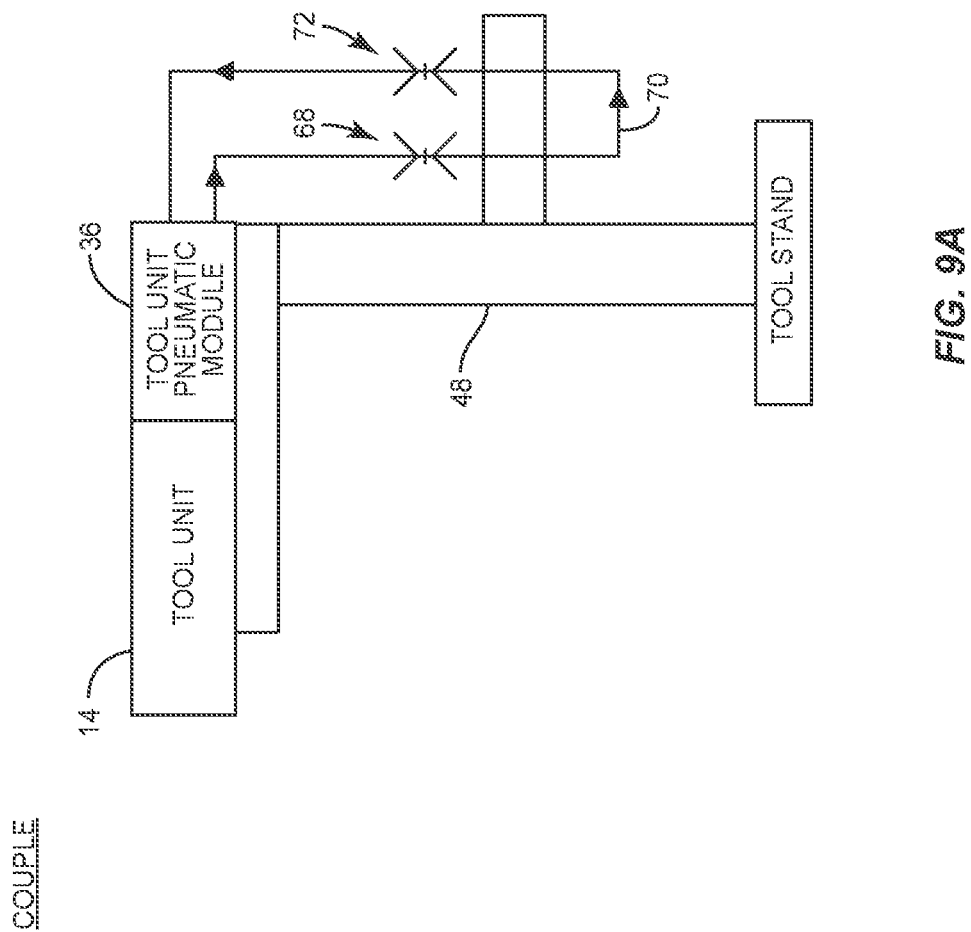
FIG. 9A is a pneumatic schematic diagram of the tool side of a tool changer in a tool stand, according to a sixth embodiment.

FIG. 9A depicts the tool unit 14 and tool unit pneumatic module 36 disposed (along with an attached robotic tool, not shown) in the tool stand 48. As in the third embodiment, the tool stand 48 includes a supply pneumatic coupling 68, pneumatic bridge conduit 70, and return pneumatic coupling 72. However, unlike the third embodiment, the supply and return pneumatic couplings 68, 72 do not include any check valves.

Figure 9B:
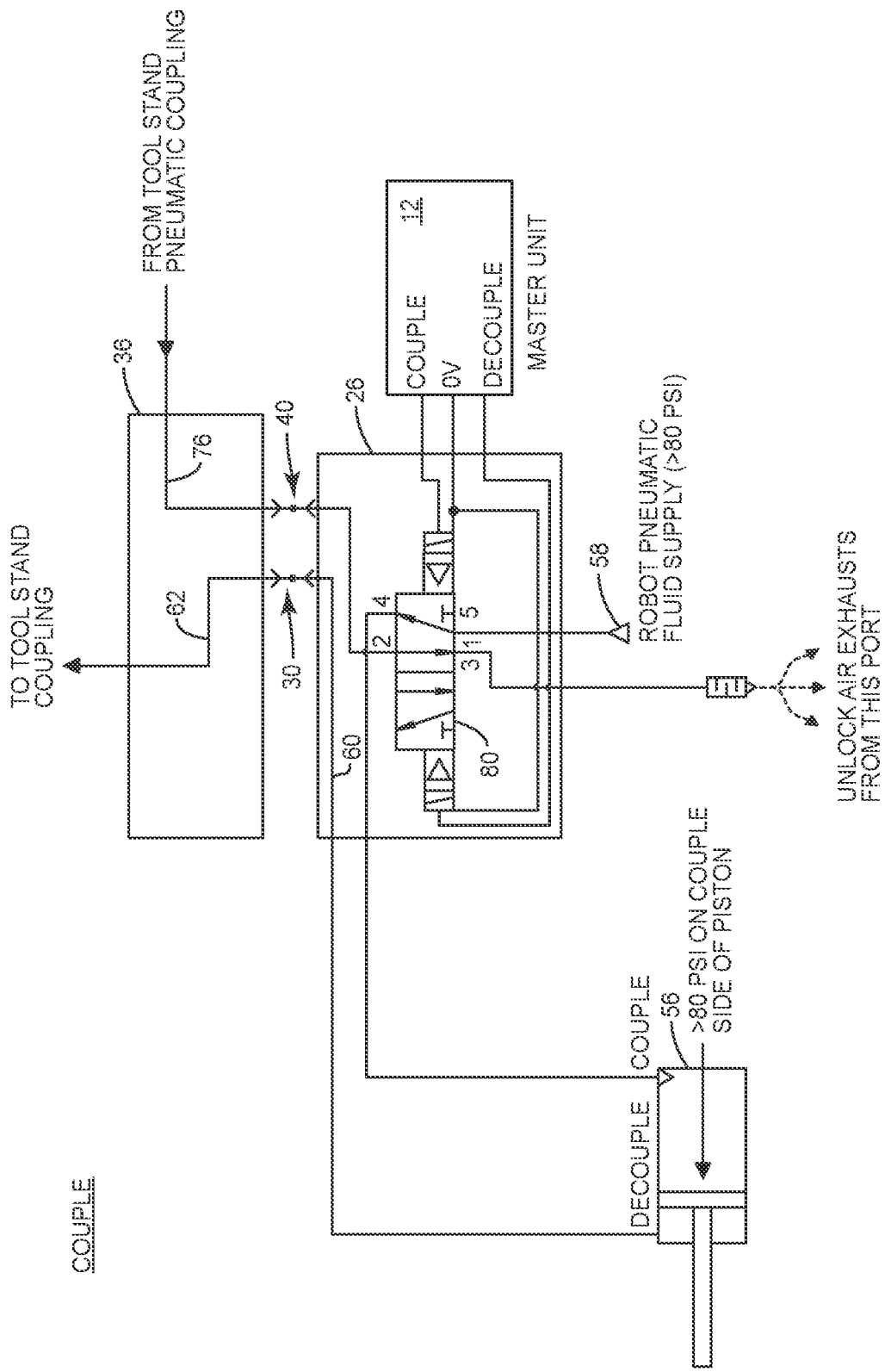
FIG. 9B is a pneumatic schematic diagram of a tool changer depicting a couple operation, according to a sixth embodiment.
Figure 9C:
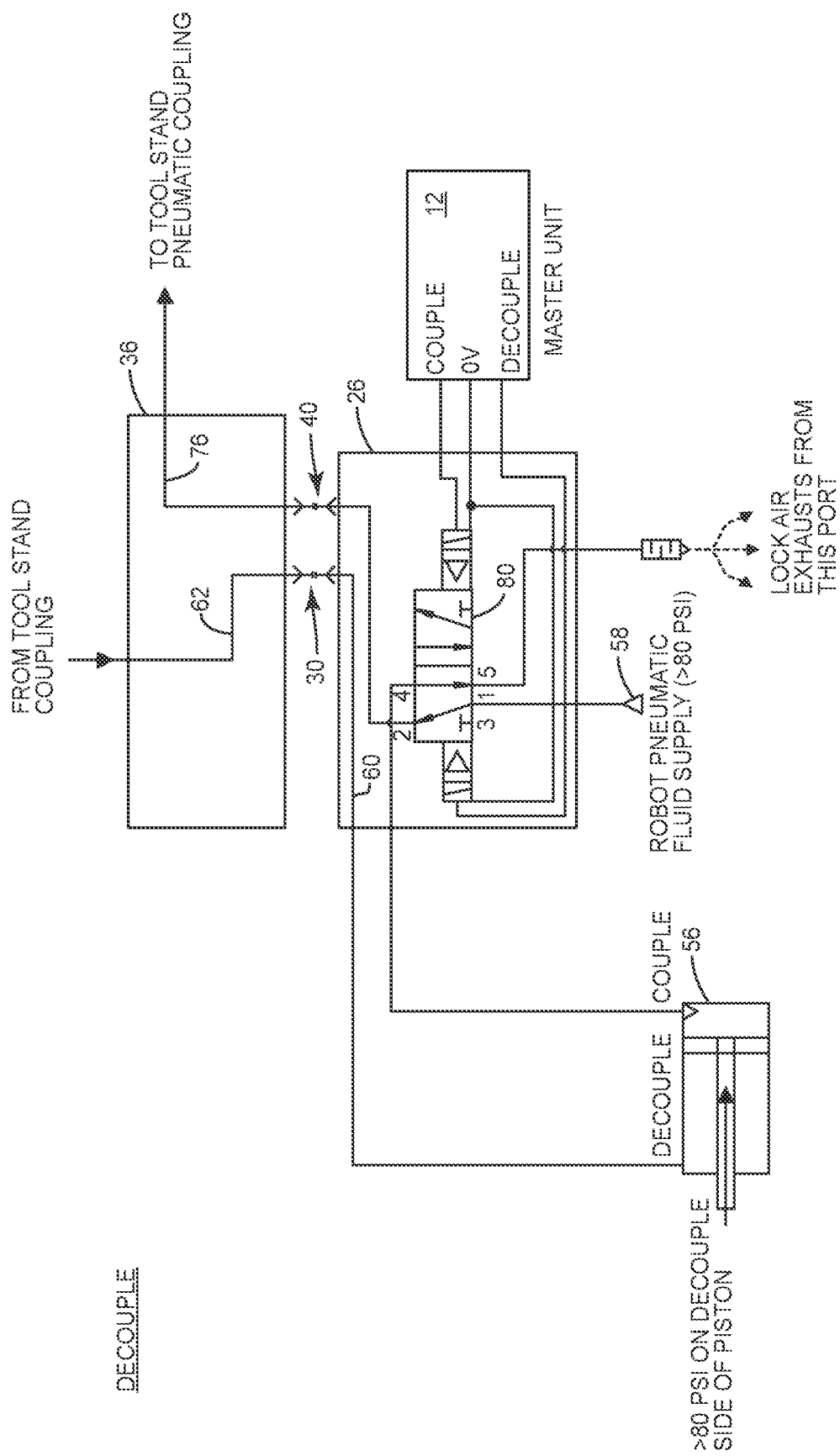
FIG. 9C is a pneumatic schematic diagram of a tool changer depicting a decouple operation, according to a sixth embodiment.

FIG. 9B depicts the pneumatic and control signal flow between the master and tool unit pneumatic modules 26, 36 during a coupling operation. The master unit pneumatic module 26 includes a 4-way, dual solenoid control valve 80 receiving pneumatic fluid (at a high pressure, such as >80 psi) from the robot pneumatic fluid supply 58. To couple, the control valve 80 routes pneumatic fluid from the robot supply 58 to the couple port of the pneumatically-actuated piston 56. Air in the decouple chamber of the piston 56 is vented to the atmosphere. The path for venting decouple chamber air is: from the decouple port of the piston 56 through the pneumatic pass-through conduits 60, 62, through the pneumatic bridge conduit 70 on the tool stand 48, through pneumatic pass-through conduit 76, and through the control valve 80 to the vent port. The combination of supplying high pressure pneumatic fluid to the couple port of the piston 56, and venting the decouple chamber of the piston 56 to the atmosphere, is effective to drive the piston 56 forward and couple the master unit 12 to the tool unit 14.

FIG. 9B depicts the decouple operation. Once the robotic tool is safely disposed in the tool stand 48, the master unit 12 and tool unit 14 may decouple. The master unit 12 deasserts the COUPLE signal and asserts the DECOUPLE signal, providing both to the control valve 80. This configures the control valve 80 to direct pneumatic fluid from the robot pneumatic fluid supply 58 to the pneumatic coupling 40. Decouple pneumatic fluid then flows through the pneumatic pass-through conduit 76 to the tool stand 48. The decouple pneumatic fluid then flows through the tool stand supply pneumatic coupling 68, bridge conduit 70, and return coupling 72, and back to the tool unit pneumatic module 36. The decouple pneumatic fluid then flows through the pneumatic fluid pass-through conduit 62, pneumatic coupling 30, and through the pneumatic fluid pass-through conduit 60 to the decouple port of the piston 56. As this pneumatic fluid is sourced by the robot pneumatic fluid supply 58, it is at the same high pressure (e.g., >80 psi) as the pneumatic fluid used in the couple operation. Simultaneously, the DECOUPLE command configures the control valve 80 to vent air from the couple chamber of the piston 56 to the atmosphere. The combination of supplying high pressure pneumatic fluid to the decouple port of the piston 56 via the tool stand 48, and venting the couple chamber of the piston 56 to the atmosphere, is effective to drive the piston 56 backwards and decouple the master unit 12 from the tool unit 14. The robot may then move, with the master unit 12, to retrieve a different robotic tool, leaving the robotic tool safely disposed in the tool stand 48.

Once the master unit 12 is coupled to the tool unit 14 and the robot removes the attached robotic tool from the tool stand 48, the units 12, 14 cannot become decoupled. The robot pneumatic fluid source 58 continues to supply high pressure pneumatic fluid, through the control valve 80, to the couple port of the piston 56, forcing the piston 56 to the forward, or coupled, position. Critically, there is no source of pneumatic fluid connected to the decouple port of the piston 56 to drive the piston toward the back, or decoupled, position.

Figure 9D:
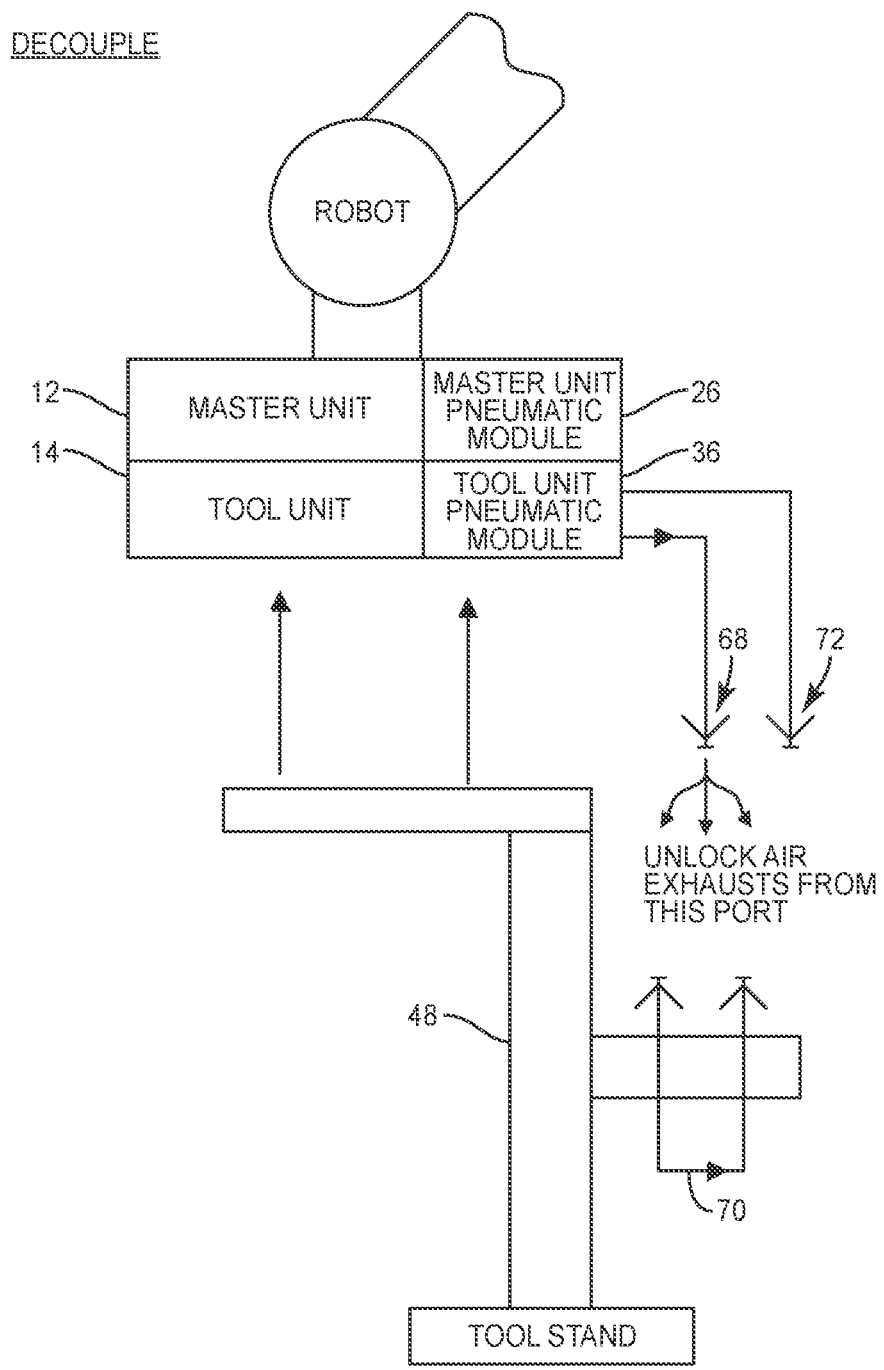
FIG. 9D is a pneumatic schematic diagram of a tool changer when a robotic tool is removed from the tool stand, according to a sixth embodiment.

Even in the event that the master unit 12 were to erroneously assert the DECOUPLE signal, decouple pneumatic fluid would be vented to the atmosphere by the tool unit pneumatic module 36, and would not be routed back to the decouple port of the piston 56. FIG. 9D depicts this condition. The DECOUPLE signal places the control valve 80 in the condition depicted in FIG. 9C, with the robot pneumatic fluid supply 58 providing decouple pneumatic fluid through the coupling 30 and pneumatic fluid pass-through conduit 76. Since the attached robotic tool is not in the tool stand 80, this pneumatic fluid is vented to the atmosphere, at the tool changer side of the supply pneumatic fluid coupling 68. As there is nothing but atmospheric pressure present at the return pneumatic fluid coupling 68, this is the pressure conveyed through the pneumatic pass-through conduits 62 and 60, and delivered to the decouple port of the piston 56. Note that the couple port of the piston 56 is also vented to atmospheric pressure, through the control valve 80. Accordingly, the piston 56 is not actively driven to the couple or decouple positions. In this case, a fail-safe mechanism, such as one or more of the mechanisms disclosed in U.S. Pat. No. 7,252,453 or 8,005,570, operates to prevent the master unit 12 and tool unit 14 from decoupling.

The sixth embodiment obviates the need for a decouple control valve, thus reducing cost, parts count, complexity, and potential points of failure. Full pressure is provided for both couple and decouple operations, so there will be no difference in the speed of these complimentary operations. Also, in the sixth embodiment the tool unit pneumatic module is of low cost and complexity, with no valve or electrical connections, and only two pneumatic pass-through conduits.

Method of Inherently Safe Robotic Tool Attachment

Figure 10:
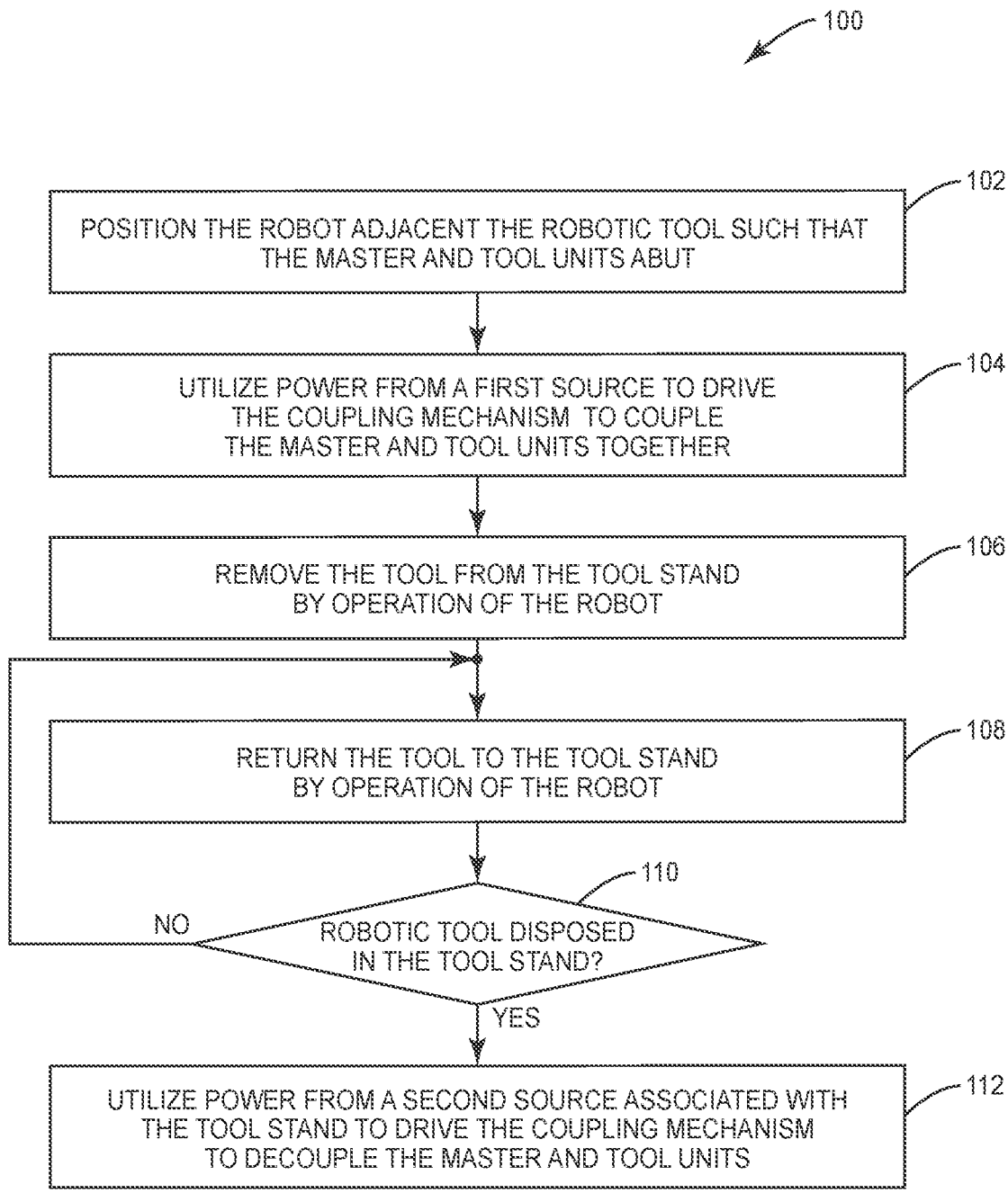
FIG. 10 is a flow diagram of an inherently safe method of attaching a robotic tool to a robot.

FIG. 10 depicts an inherently safe method 100 of attaching a robotic tool disposed in a tool stand 48 to a robot. A master unit 12 of a tool changer 10 is attached to the robot and a tool unit 14 of the tool changer 10 attached to the robotic tool. One of the master and tool units 12, 14 includes a coupling mechanism 16 operative to selectively couple and decouple the master and tool units 12, 14 to and from each other. The robot is positioned adjacent the robotic tool such that the master and tool units 12, 14 mechanically mate (block 102). Power from a first source 58 is used to drive the coupling mechanism 16 to couple the master and tool units 12, 14 together (block 104). The robotic tool is removed from the tool stand 48 by operation of the robot (block 106). After performing some task with the robotic tool, it is returned to the tool stand 48 by operation of the robot (block 108). If the robotic tool is safely disposed in the tool stand 48 (block 110), then power from a second source associated with the tool stand 48 is utilized to drive the coupling mechanism 16 to decouple the master and tool units 12, 14 (block 112). If the robotic tool is not safely disposed in the tool stand 48 (block 110), no power from the second source is available, and the master and tool units 12, 14 cannot be decoupled. In this case, the robotic tool must be returned to the tool stand 48 (block 108) before the tool changer 10 can decouple.

Detailed Description of Seventh Embodiment

FIG. 11 depicts a seventh embodiment, which is similar in some respects to the third embodiment described herein (with respect to FIGS. 6A-6F), in that pneumatic fluid to drive the decouple port of the piston 56 is routed in a loop-back configuration 70 in the tool stand 48. Hence, the motive force to drive the piston 56 to decouple the tool changer 10 is only available when an attached tool (and hence the tool pneumatic module 36) is safely disposed in a tool stand 48. This seventh embodiment includes additional features that further enhance safety and ensure that the piston 56 cannot inadvertently decouple under a number of possible usage scenarios.

FIG. 11 depicts the master unit 12, with the master pneumatic module 26 attached, decoupled from the tool unit 14, with the tool pneumatic module 36 attached. Similarly, the tool unit 14 and tool pneumatic module 36 are shown adjacent to, but not operatively disposed in, the tool stand 48. The seventh embodiment is depicted in this configuration so that all couplings are shown, and to aid in description. FIGS. 12A-12F then depict the operation of the robotic tool changer 10 in detail, as the robot steps through the typical real-world operations of attaching, using, parking, and detaching a robotic tool. The piston 56 in the master unit 12 may be operatively connected to any number of coupling mechanisms to selectively couple the master unit 12 to the tool unit 14. For example, ball-displacing piston coupling mechanisms are described in U.S. Pat. Nos. 7,252,453 and 8,005,570. However, any other coupling mechanism could be employed in the tool unit 14—the safety features of the seventh embodiment are applicable to any coupling mechanism that uses fluid pressure to actuate (e.g. pneumatic, hydraulic, etc.).

FIG. 11 depicts a single air control system 58, preferably mounted on a robot arm, providing pneumatic fluid to both lock and unlock the master unit 12 to/from the tool unit 14, in response to optional sensors 82, 84. The pressure or position sensors 82, 84, and their output lines to the air control system 58, are depicted in dashed lines, indicating that these elements may not be present in all embodiments. The air control system 58 operates under the control of (i.e., it receives input from, and may provide outputs to) a robotic control system (not shown), which coordinates the provision of pneumatic fluids with the physical operation of the robot.

In general, the air control system 58 may include such valves, controller, and the like, and may implement such functionality, as required or desired for a given application. In particular, it is assumed that the air control system 58 includes a 2-position pneumatic valve, which will output pressurized air on either the "Lock Air" output or the "Unlock Air" output (and vent air coming in through the other output), but never both simultaneously, and always outputting pneumatic fluid on one output or the other. This functionality is indicated schematically in FIGS. 12A-12F. As those of skill in the art will readily appreciate, the functionality of the air control system 58 could also be implemented via two or more separate controllers, wherein the mutual exclusivity of operation of the two pneumatic outputs can be achieved by control logic, interlock signals, and the like.

Pneumatic fluid to drive the piston 56 to couple the master and tool units 12, 14 together is provided by the Lock Air output of the air control system 58, which is coupled to the lock air input port 86. A passage 88 connects the lock air input port 86 directly to the couple port of the piston 56. Upon positioning a robot arm with the master unit assembly (comprising the master unit 12 and master pneumatic module 26) adjacent a desired tool unit assembly (comprising the tool unit 14 and tool pneumatic module 36), which is connected to a robotic tool (not shown) disposed in a tool stand 48, the air control system 58 outputs pneumatic fluid on the Lock Air output. This causes the piston 56 in the master unit 12 to actuate, coupling the master unit 12 to the tool unit 14. Furthermore, throughout normal robotic tool operation—that is, as the robot utilizes an attached tool to perform tasks—positive pressure is maintained at the Lock Air output of the air control system 58. This is a safety feature, as the positive pressure applied to the couple chamber of the piston 56 continuously drives the piston 56 to maintain the coupled state.

When the robot control system determines to decouple the attached tool (such as to attach a different tool), it directs the robot to place the tool in a predetermined location in a tool stand 48. According to this seventh embodiment, this also necessarily positions at least the tool pneumatic module 36 in a predetermined position on the tool stand 48. The air control system 58 then outputs pneumatic fluid to the Unlock Air output which, as described herein, is indirectly routed to the decouple port of the piston 56, driving the piston 56 to decouple from the tool unit 14. The air control system 58 simultaneously vents air in the Lock Air line to the atmosphere.

According to this seventh embodiment of the present invention, the routing of unlock pneumatic fluid from the Unlock Air output of the air control system 58 to the decouple port of the piston 56 includes numerous safety features, ensuring that the decouple operation is only possible when an attached tool (and hence, as indicated schematically in FIG. 11, the tool pneumatic module 36) is safely disposed in the tool stand 48. Furthermore, as explained further herein, the tool unit assembly and attached tool are prevented from inadvertent decoupling by spurious air pressure, such as from a "blow-off" cleaning operation.

Pneumatic fluid from the Unlock Air output of the air control system 58 is coupled to the unlock air input port 118, and thence to a valve 120. The valve 120 is spring-biased to the closed position, shutting off the flow of pneumatic fluid whenever the master unit 12 is decoupled from, and moved physically away from, a tool unit 14. As mentioned, the air control system 58 continuously outputs pneumatic fluid on one output or the other. Since switching to the Lock Air output would cause the piston 58 to move to the coupled position, preventing it coupling to another tool unit 14, the air control system 58 continues to provide pneumatic fluid at the Unlock Air output while the master 12 and tool 14 units are decoupled. The valve 120 prevents the discharge of pneumatic fluid during that time. When the master unit 12 abuts a new tool unit 14, a plunger which protrudes from the master pneumatic module 26 is depressed by contact with the tool pneumatic module 36, opening the valve 120 and allowing the free flow of unlock pneumatic fluid, in either direction.

When the master 12 and tool 14 units are coupled together, unlock pneumatic fluid passes through the valve 120, and through a pneumatic coupling 30 between the master pneumatic module 26 and tool pneumatic module 36. When an attached tool is properly disposed in a tool stand 48

(and hence the tool pneumatic module 36 is also properly disposed on the tool stand 48), the unlock pneumatic fluid further passes through a passage 62 in the tool pneumatic module 62, and through another pneumatic coupling 68 between the tool pneumatic module 36 and tool stand 48. A "loop-back" passage 70 in the tool stand 48 routes the unlock pneumatic fluid back into the tool pneumatic module 36.

Unlock pneumatic fluid returning from the tool stand 48 into the tool pneumatic module 36 passes through a safety coupling 122. The safety coupling 122 includes a male coupling member 122a on the tool stand 48, which is received in a female coupling member 122b when the tool pneumatic module 36 is properly oriented on the tool stand 48. The male coupling member 122a is generally cylindrical, with a sealing o-ring at a base end, and a conical taper at a distal end. Air passage holes are formed in the cylindrical section. The female coupling member 122b comprises two, co-axial, cylindrical bores. A lower bore is open to the exterior facing the tool stand 48, and is sized and shaped to receive the cylindrical portion of the male coupling member 122a. The upper bore has a smaller diameter than the lower bore, and is open to the atmosphere. A sealing o-ring is disposed at the intersection of the upper and lower bores.

In operation, when the tool pneumatic module 36 is properly seated on, and aligned with, the tool stand 48, the cylindrical portion of the male coupling member 122a is disposed within the lower bore of the female coupling member 122b. The lower bore is sealed at the lower end by contact with the o-ring at the base of the male coupling member 122a. The lower bore is also sealed at the upper end by the conical taper of the male coupling member 122a pressing against the o-ring at the intersection of the lower and upper bores of the female coupling member 122b. Pneumatic fluid escapes through the air passage holes formed in the cylindrical portion of the male coupling member 122a, and is routed through the passage 76, which communicates with the lower bore of the female coupling member 122b.

The safety coupling 122 ensures that the tool pneumatic module 36 must be properly seated on, and aligned with, the tool stand 48. If either the lower or the upper o-ring fails to seal, pneumatic pressure will be lost to the atmosphere, and will not drive the piston 56 to decouple. In one embodiment, proper alignment between the tool pneumatic module 36 and the tool stand 48 is assisted by one or more alignment pins 124 on the tool unit 14 or tool pneumatic module 36, and corresponding alignment bores 126 in the tool stand 48. Of course, similar locator/alignment features may be provided on an attached robotic tool. Although described herein as o-rings, any appropriate sealing elements may be utilized to provide a pneumatic seal at the lower and upper ends of the lower bore the female coupling member 122b.

Unlock pneumatic fluid from the safety coupling 122 passes through passage 76, pneumatic coupling 40 between the tool pneumatic module 36 and master pneumatic module 26, and through passage 60 to the decouple port of the piston 56. In the embodiment depicted, a sealing o-ring is provided at the interface of air passage 60 between the master pneumatic module 26 and the master unit 12.

Figure 12A:
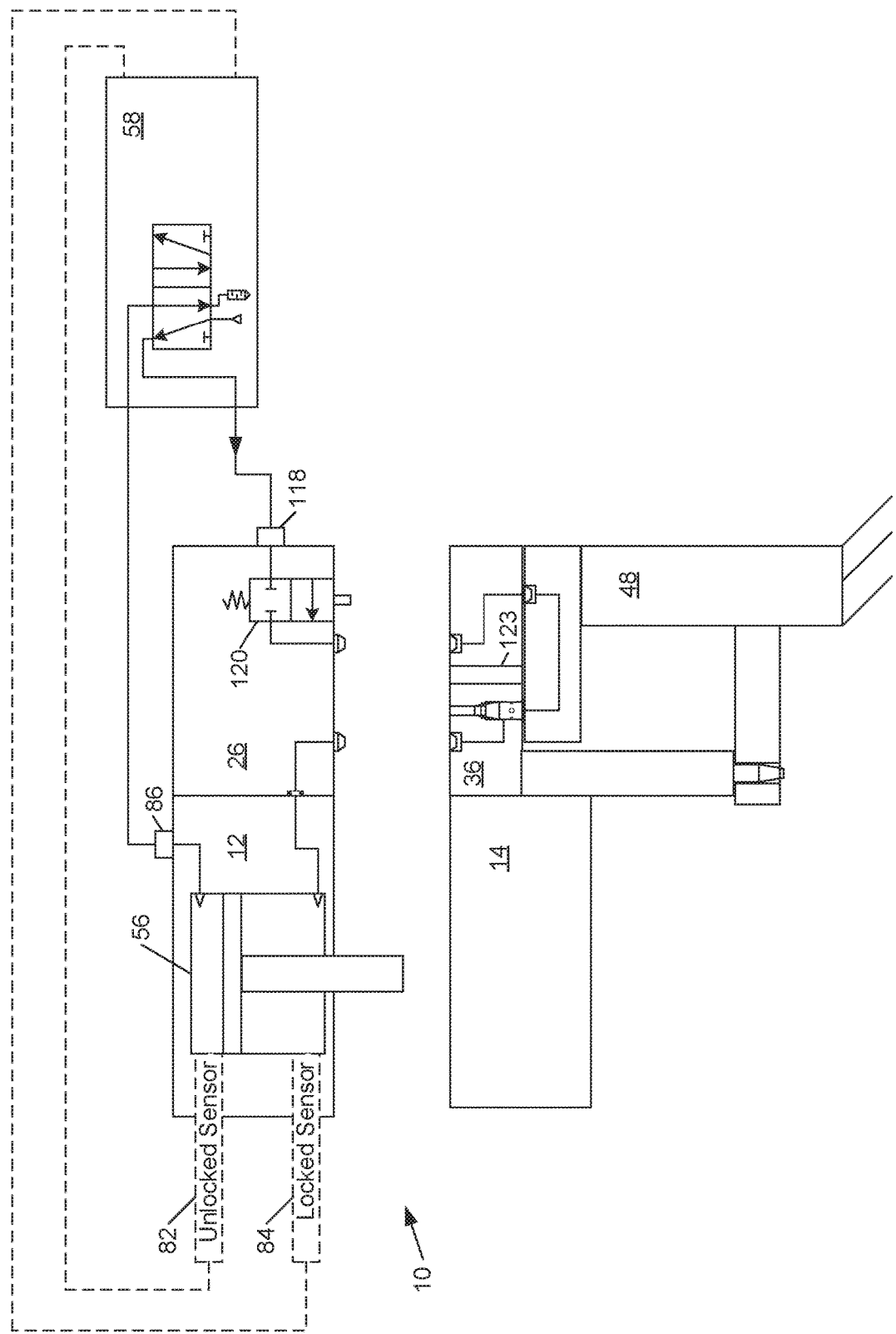
FIG. 12A is a pneumatic schematic of the seventh embodiment with the robot decoupled from a tool disposed in a tool stand.

The operation of the seventh embodiment of the present invention is described with reference to FIGS. 12A-F, in which identifying numbers of the internal passages, couplings, and the like are omitted for clarity. FIGS. 12A-F also depict a 2-position pneumatic valve in the air control device 58, which operates under the control of a robot control system (not shown). In FIG. 12A, the master unit 12 is attached to a robot arm (not shown), and no tool is attached. The piston 56 is in the unlocked, or decoupled, position and no pressure is applied to either the couple or decouple ports. The Unlocked sensor 82, if present, outputs a signal indicating the piston 56 is in the unlocked position. The valve in the air control system 58 outputs pneumatic fluid on the Unlock Air output, which is blocked by the spring-loaded valve 120.

Figure 12B:
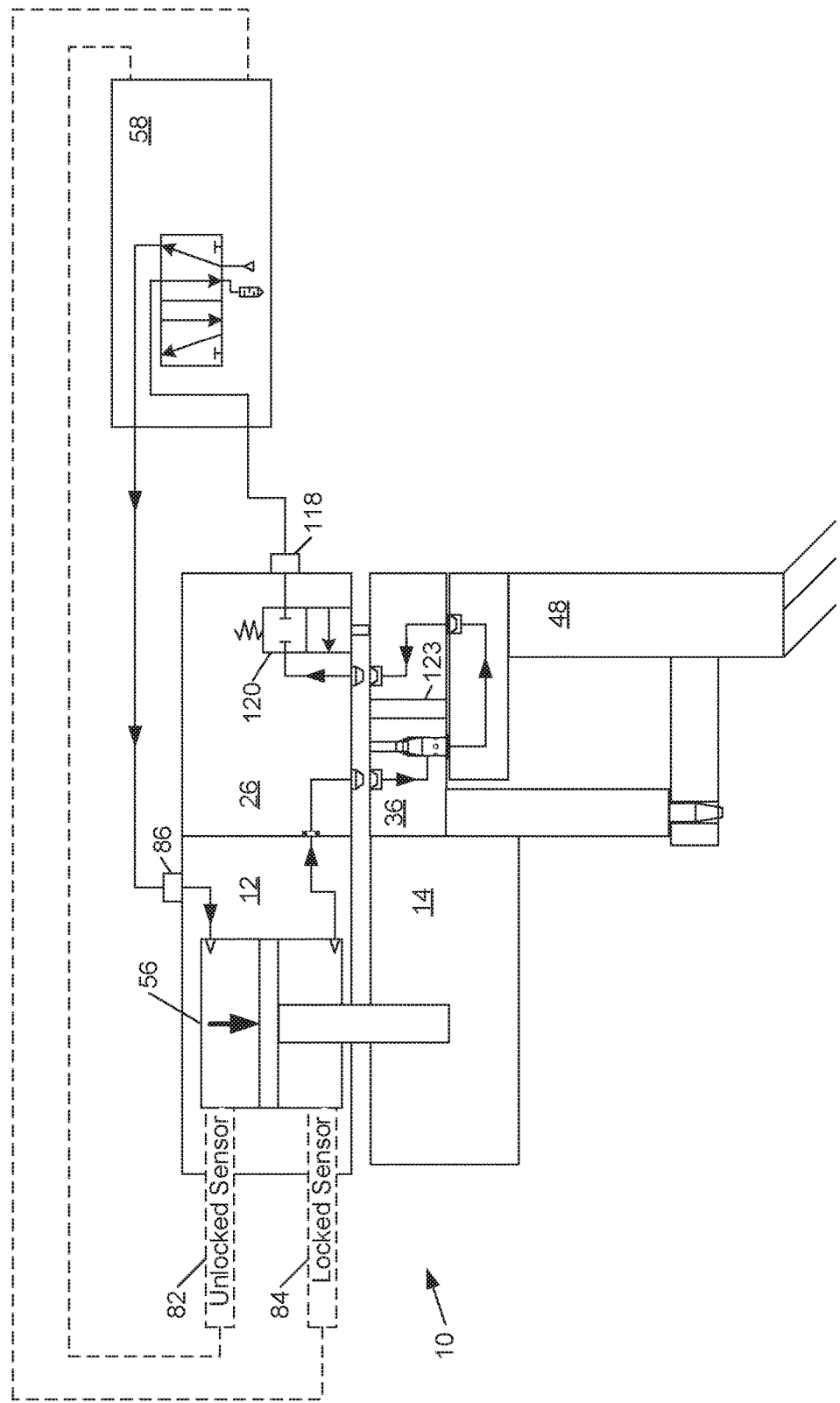
FIG. 12B is a pneumatic schematic of the seventh embodiment with the master unit assembly abutting the tool unit assembly and ready to couple.

FIG. 12B depicts the seventh embodiment as the robot arm moves the master unit 12 into initial contact with the tool unit 14. The valve in the air control system 58 switches, to output pneumatic fluid on the Lock Air output and vent pneumatic fluid in the Unlock Air line. The lock pneumatic fluid begins to drive the piston 56 toward the coupled, or locked, position, as indicated by the pressure arrow in the couple chamber of the piston 56. This attempts to drive pneumatic fluid out of the decouple port, which (to the extent it does not leak out the not-fully-sealed couplings 30, 40) passes the pressure through the tool pneumatic module 36, tool stand 48, tool pneumatic module 36, and master pneumatic module 26, where it is halted by the valve 120, which is still closed as its plunger is not fully depressed.

Figure 12C:
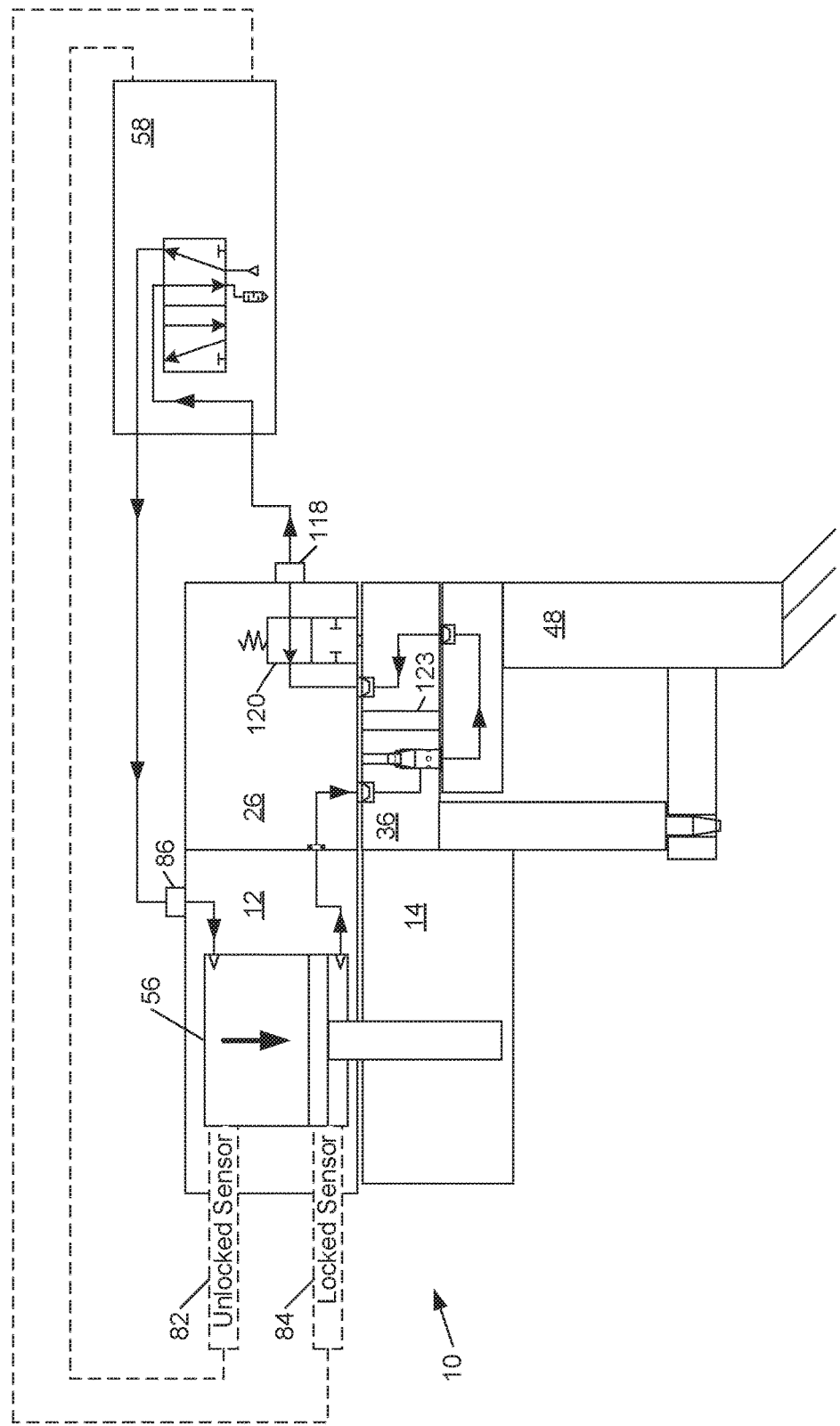
FIG. 12C is a pneumatic schematic of the seventh embodiment with the master unit assembly coupled to the tool unit in the tool stand.

FIG. 12C depicts the seventh embodiment after the master unit 12 has fully mated with, and coupled to, the tool unit 14. The valve 120 is open, by its plunger being depressed by contact with the tool pneumatic module 36, and unlock pneumatic fluid from the decouple chamber of the piston 56 is vented by the valve in the air control system 58. Note that, for the unlock pneumatic fluid to transit the tool pneumatic module 36 and tool stand 48, the tool pneumatic module 36 must be seated on, and properly aligned with, the tool stand 48. This is required so that the lower bore of the female portion 122b of the safety coupling 122 is sealed at both its upper and lower end, containing the unlock pneumatic fluid within the path through the tool pneumatic module 36 and tool stand 48, as indicated. The air control system 58 valve provides a continuous supply of lock pneumatic fluid to the couple chamber of the piston 58, as indicated by the pressure arrow. The Locked sensor 84, if present, indicates that the piston 58 is in the locked, or fully coupled, position.

Figure 12D:
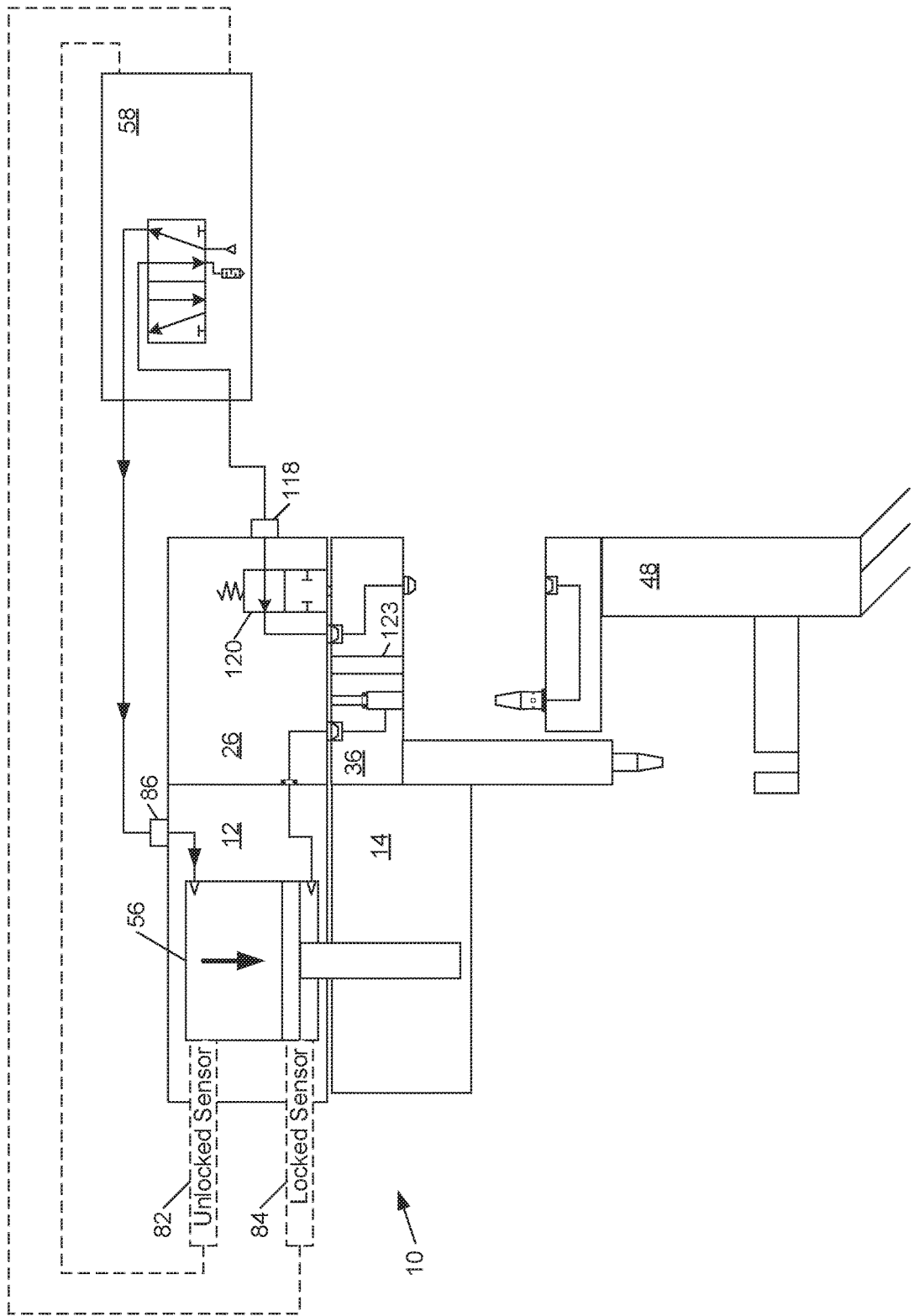
FIG. 12D is a pneumatic schematic of the seventh embodiment with the master and tool unit assemblies (and attached tool) removed from the tool stand.

In FIG. 12D, the robot has removed the master unit assembly and coupled tool unit assembly (with an attached robotic tool, not shown) from the tool stand 48. The air control system 58 continues to provide positive pneumatic pressure on the Lock Air line, continuously driving the piston 56 to the coupled position. The Locked sensor 84, if present, continues to indicate that the piston 58 is in the locked, or fully coupled, position.

Figure 13:
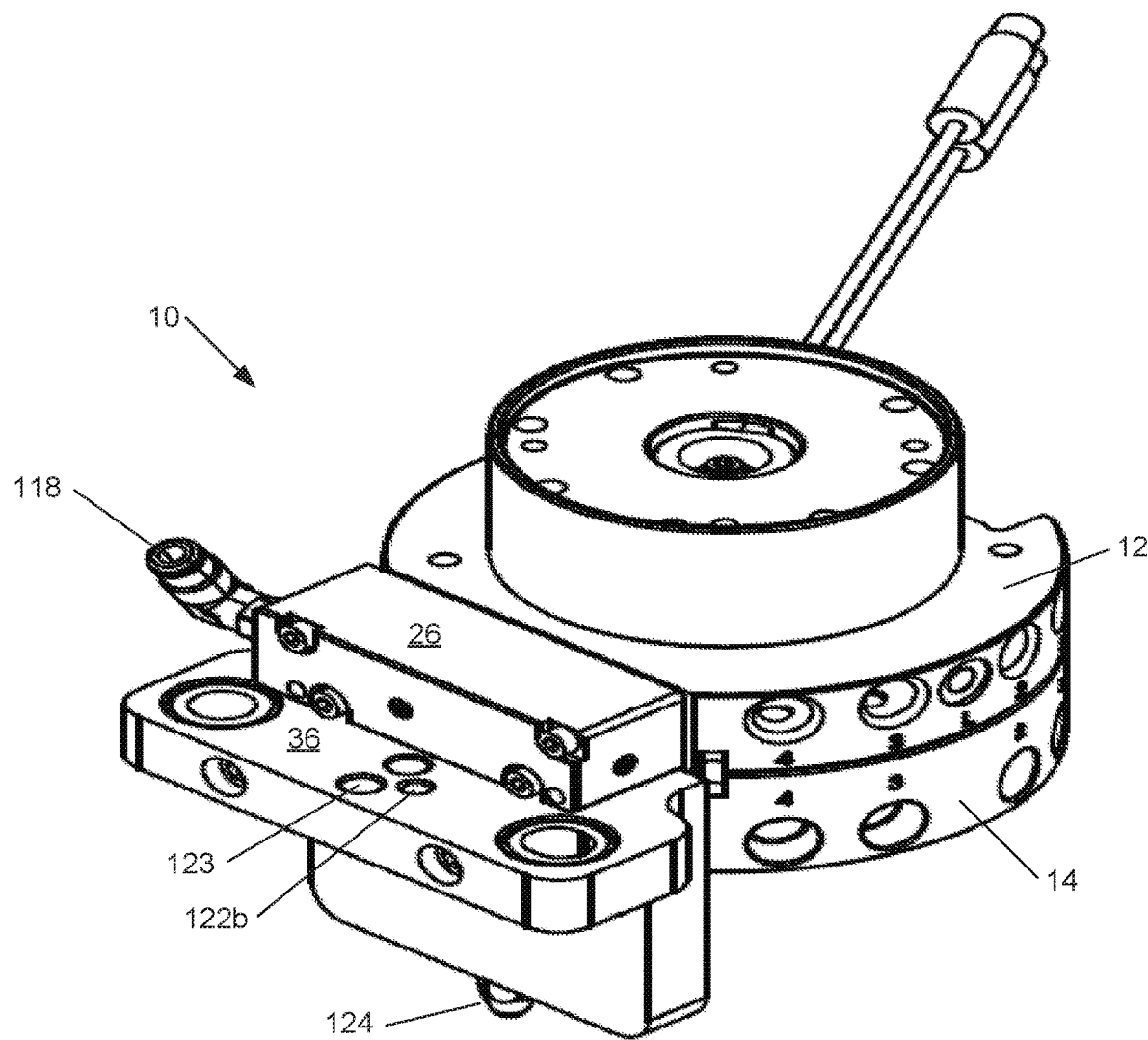
FIG. 13 is a perspective view of part of the tool coupler.
Figure 14:
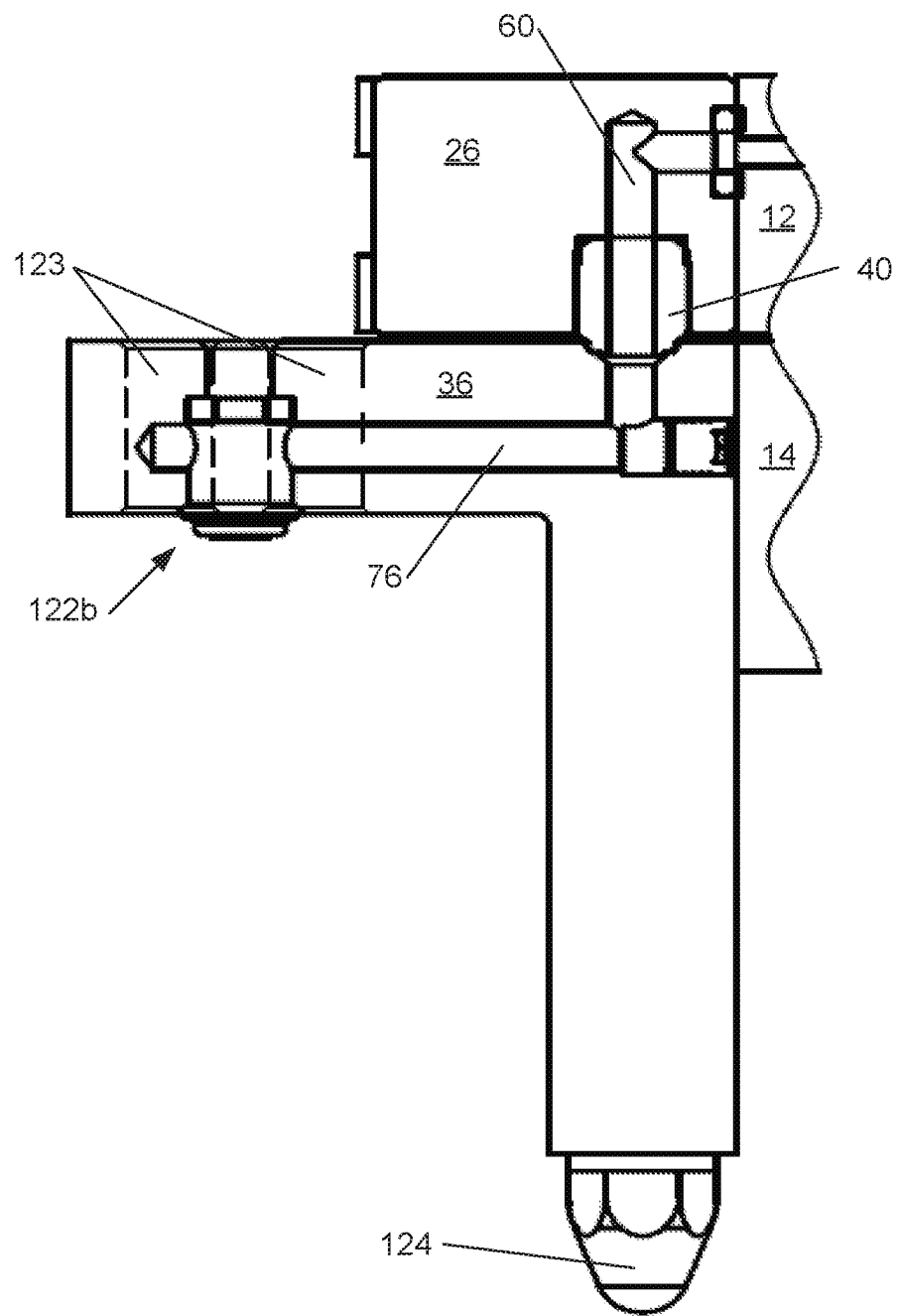
FIG. 14 is a section view of the master and tool pneumatic modules.

The seventh embodiment of the present invention, in one embodiment thereof, includes an additional safety feature that guards against an unlikely, but possible, cause of accidental decoupling of the tool unit 14 from the master unit 12. Before discussing this feature, it should be noted that FIGS. 11 and 12A-F are pneumatic schematic diagrams—they are not, for example, section views. Although not apparent in FIGS. 12A-F, and as best seen in FIGS. 13 and 14, at least a portion of the tool pneumatic module 36 extends outwardly (out of the plane of the drawing) from the master pneumatic module 26, when the master 12 and tool 14 units are coupled together.

One key to the operation of the safety coupling 122 is that the upper bore of the female portion 122b is open to the atmosphere—requiring the upper, conically tapered part of the male portion 122a to press against an o-ring to form a seal, making the lower bore a sealed chamber that supports the transfer of pneumatic fluid (as opposed to bleeding it to the atmosphere). Although in FIG. 12D it would appear that the upper bore is sealed (or at least obstructed) by contact with the master pneumatic module 26, this does not in fact occur. As FIGS. 13 and 14 show, the female portion 122*b* of the safety coupling is formed on a portion of the tool pneumatic module 36 that extends outwardly from the master pneumatic module 26, and hence does not contact it.

Similarly, at least one through-bore 123, located proximate to the female portion 122*b* of the safety coupling 122, extends through a portion of the tool pneumatic module 36 that extends outwardly from the master pneumatic module 26. As shown in FIGS. 13 and 14, two or more through-bores 123 may be provided. FIG. 13 is a perspective view of the robotic tool changer 10, and FIG. 14 is a section view taken through the center of the female portion 122*b* of the safety coupling 122 on the tool pneumatic module 36.

The through-bores 123 are preferably of a greater diameter, along their entire length, than the upper chamber of the female portion 122*b*. Each through-bore 123 provides a low-resistance path for compressed air directed toward the lower bore of the female portion 122*b* of the safety coupling 122, when a tool is attached and working (i.e., not in a tool stand 48). Many robotic operations, such as grinding, sanding, milling, deburring, and the like, generate debris, such as cuttings, dust, or other particulates, the accumulation of which can interfere with the task being performed. Accordingly, it is a common practice, in some robotic operations, to periodically pause the task at hand, and clean the robotic tool and robotic tool changer surfaces by blowing compressed air over them. If a technician were to direct a stream of compressed air over the opening to either the upper or lower bore of the female portion 122*b* of the safety coupling, while his or her hand or other object obstructed the opposite opening, air pressure may be directed through the passages 76 and 60 (see FIG. 11), applying pressure to the decouple port of the piston 56. If this pressure were to exceed that provided by lock pneumatic fluid output by the air control system 58 on the Lock Air output, the piston 56 may move toward the decouple, or unlocked, position, allowing the tool unit 14 (and hence an attached tool) to decouple from the master unit 12, causing an unsafe "tool drop" event.

The provision of one or more through-bore 123, located proximate to the female portion 122*b* of the safety coupling 122, mitigates this remote possibility. The through-bores 123 provide a lower-resistance path for the extraneous flow of compressed air, and divert the airflow that may otherwise travel through pneumatic passages 76, 60. In fact, testing reveals that in many cases, the high flow rate of compressed air through the through-bores 123 generates a Venturi effect, and actually reduces air pressure in the lower bore of the female portion 122*b* of the safety coupling 122 to slightly below atmospheric pressure. Although only one through-bore 123 is depicted in FIGS. 11 and 12A-F, preferably two or more through-bores 123 are provided, as depicted in FIGS. 13 and 14, reducing the likelihood that all of them are simultaneously obstructed during a compressed air blow-off cleaning operation. FIG. 14 is a section view, taken through the female portion 122*b* of the safety coupling 122, showing the lower and upper bores, sealing o-ring, and pneumatic passage 76. The through-bores 123 are indicated by dashed lines.

Figure 12E:
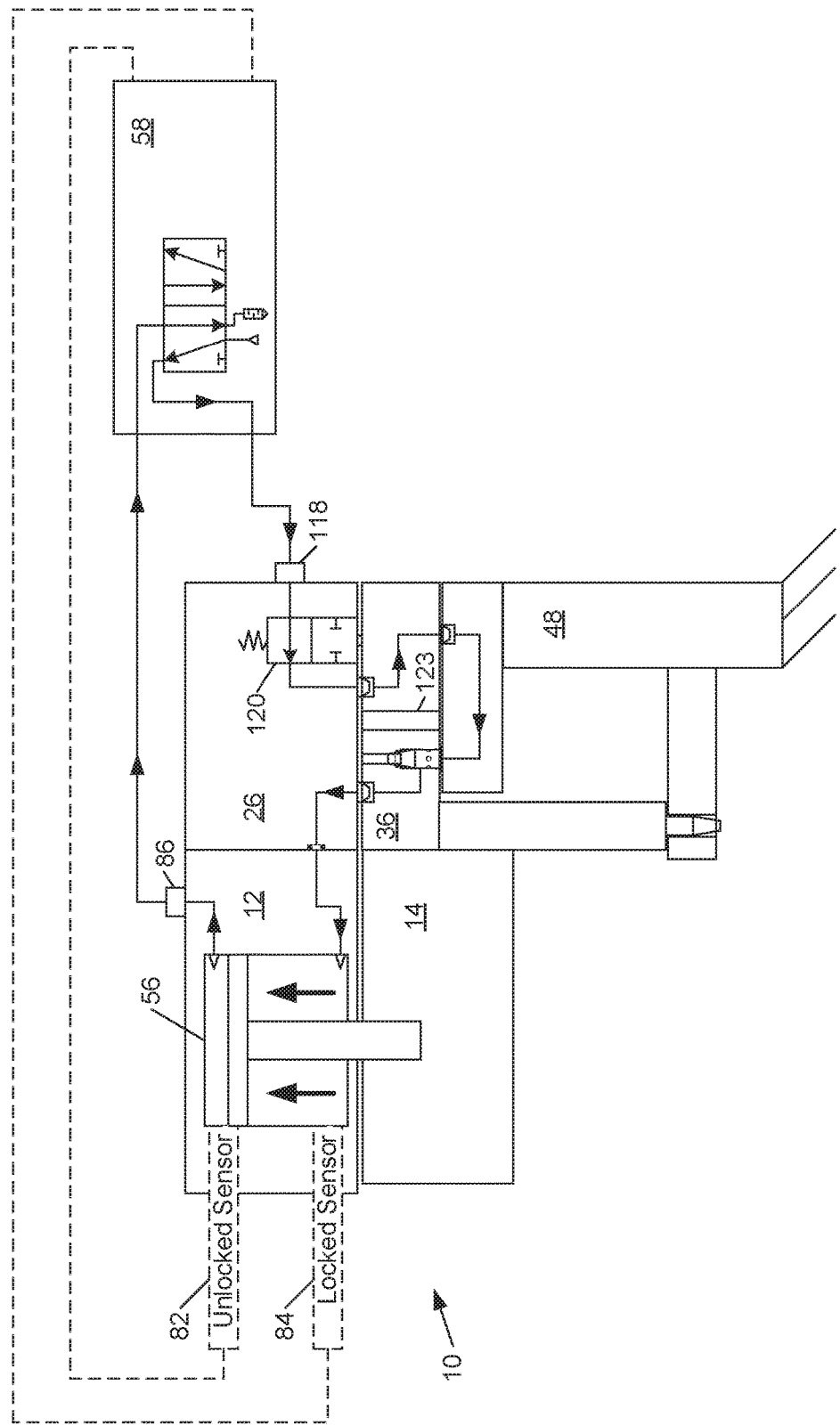
FIG. 12E is a pneumatic schematic of the seventh embodiment with the tool returned to the tool stand and the master unit assembly decoupled from the tool unit assembly.

FIG. 12E depicts the seventh embodiment after the robot has returned the tool to the tool stand 48, and the master unit 12 has decoupled from the tool unit 14. The valve in the air control system 58 outputs pneumatic pressure on the Unlock Air output, and vents pneumatic fluid returning in the Lock Air line. For example, the air control system 58 may receive a signal from a tool stand sensor (not shown) indicating that the tool is disposed in the stand. The unlock pneumatic fluid flows through the valve 120 in the master pneumatic module 26 (held open by its plunger being depressed by contact with the tool pneumatic module 36), and through the tool pneumatic module 36 and the tool stand 48. Because the pneumatic module 36 is seated on, and properly aligned with, the tool stand 48, the lower bore of the female portion 122*b* of the safety coupling seals at both the lower and upper ends, and pneumatic fluid flows from the tool stand through the safety coupling, and to the decouple port of the piston 56, as indicated by the pressure arrows in the decouple chamber. The Unlocked sensor, if present, indicates that the piston 56 is in the unlocked, or decoupled, position.

Figure 12F:
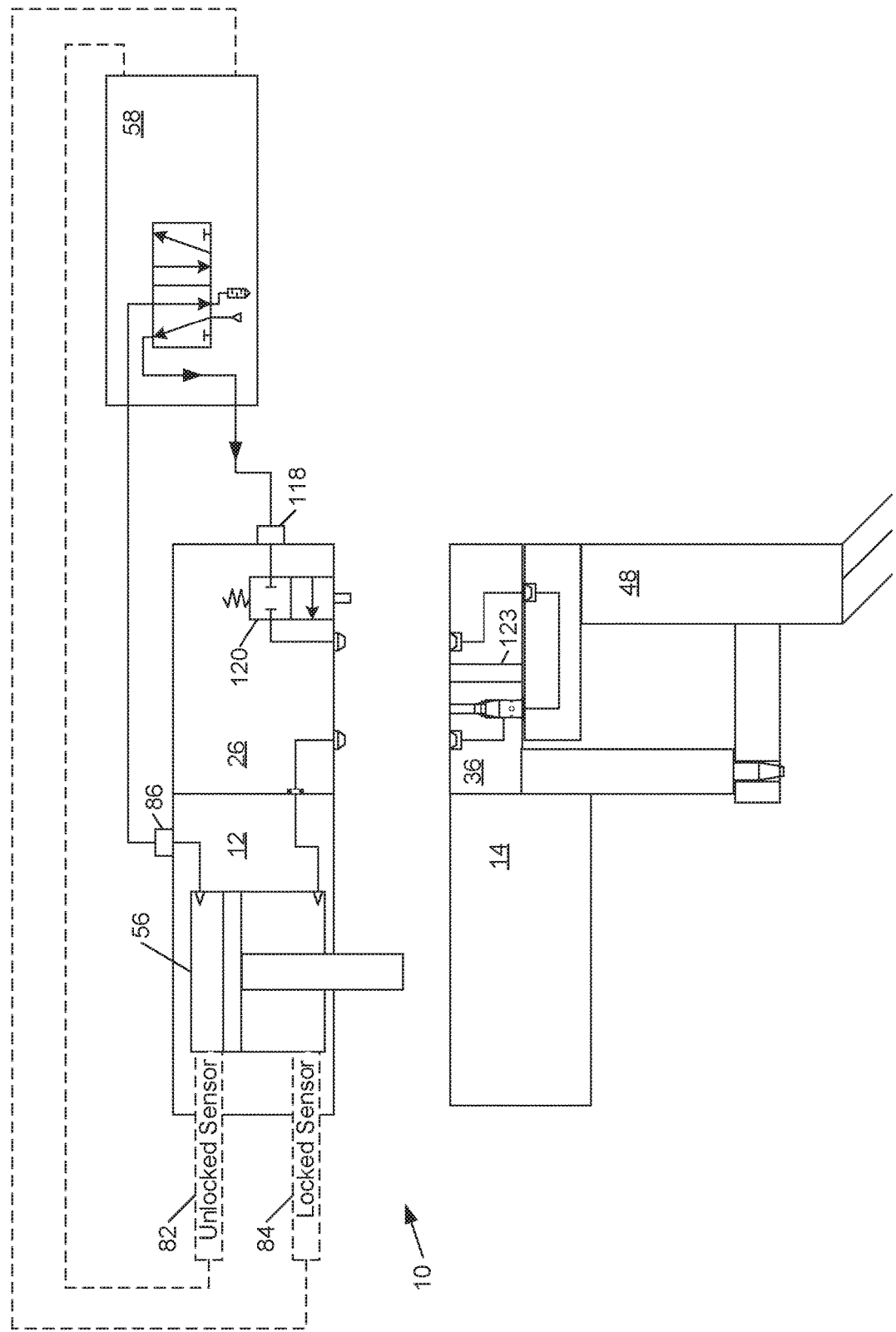
FIG. 12F is a pneumatic schematic of the seventh embodiment with the robot decoupled from a tool disposed in a tool stand.

FIG. 12F depicts the seventh embodiment after the master 12 and tool 14 units have decoupled, and the robot has removed the master unit assembly from the tool unit assembly (for example, to attach a different tool). To prevent the piston 56 from moving to the coupled position, which may preclude attaching to a different tool unit 14, the air supply system 58 continues to output pneumatic fluid on the Unlock Air output (avoiding pressurizing the Lock Air line). However, the valve 120 in the master pneumatic module 26 halts the flow of pneumatic fluid, as the plunger is no longer depressed by contact with the tool pneumatic module 36. The Unlocked sensor, if present, indicates that the piston 56 is in the unlocked, or decoupled, position, and ready to attach to a different robotic tool.

Figure 15:
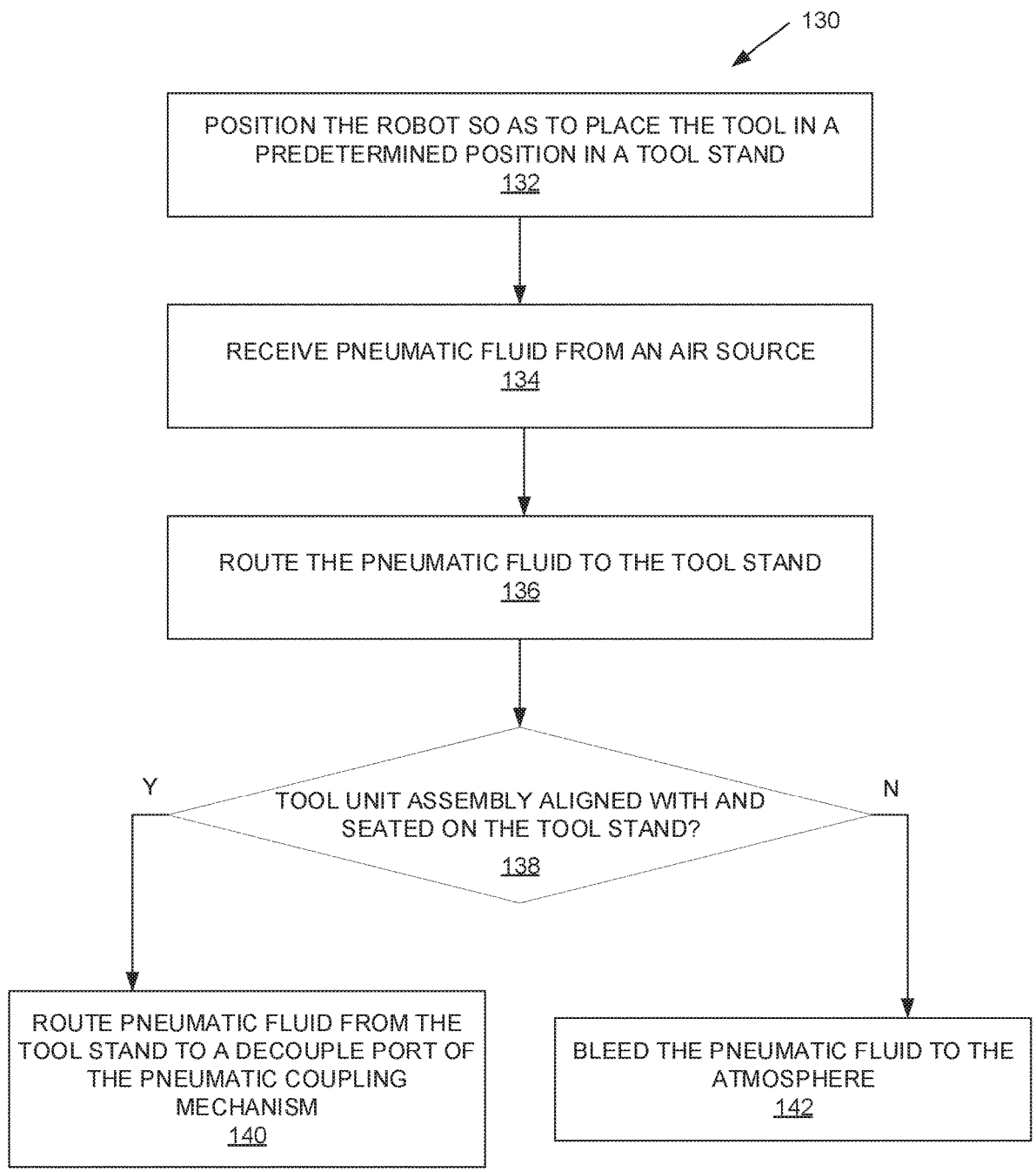
FIG. 15 is a flow diagram of an inherently safe method of detaching a robotic tool from a robot.

FIG. 15 depicts an inherently safe method 130 of detaching a robotic tool from a robot, according to the seventh embodiment. A master unit assembly 12, 26 of a tool changer 10 is attached to the robot and a tool unit assembly 14, 36 of the tool changer 10 is attached to the robotic tool. A pneumatic coupling mechanism 56 selectively couples the master 12, 26 and tool 14, 36 unit assemblies to each other. The robot is positioned so as to place the tool in a predetermined position in a tool stand 48 (block 132). Pneumatic fluid is received from an air source 58 (block 134). The pneumatic fluid is routed to the tool stand (block 136). For example, as depicted in FIG. 11, the pneumatic fluid is received at unlock air input port 118, passes through valve 120 (because the master 26 and tool 36 pneumatic modules abut), and then through couplings 30, passage 62, and couplings 68 to the tool stand 48. If the tool unit assembly 14, 36 is seated on the tool stand, and properly aligned (block 138), pneumatic fluid is received from the tool stand 48 via the safety coupling 122. This pneumatic fluid is then routed to a decouple port of the pneumatic coupling mechanism 56 (block 140), such as via passage 76, couplings 40, and passage(s) 60. On the other hand, if the tool unit assembly 14, 36 is not seated on the tool stand, or is not properly aligned (block 138), pneumatic fluid from the tool stand 48 is bled to the atmosphere (block 142), as the lower bore of the coupling member 122*b* of the safety coupling 122 will fail to properly seal. In this case, pressure is lost, and the pneumatic coupling mechanism 56 cannot be moved to the decouple position.

This seventh embodiment of the present invention provides the critical safety feature of ensuring that a robotic tool is safely disposed in a tool stand 48 prior to a tool device 14 being able to decouple from the master device 12. Because the actual motive force to drive the piston 56 to the decouple position is routed through the tool stand, whenever the tool pneumatic module 36 is not properly disposed on the tool stand, it is impossible for the master unit 12 to decouple the tool unit 14—even if a software glitch or other improper operation allowed such a command to be issued. Furthermore, the tool, and the tool pneumatic module 36, must be in the proper position and alignment on the tool stand to decouple, as enforced by the safety coupling 122. Through-bores 123 mitigate even the remote possibility of an accidental tool drop when blowing the tool changer 10 clean with compressed air.

The seventh embodiment is very cost-effective—requiring only a single air control system 58 on the robot arm (no separate air supply or control valve is necessary on every tool stand). Furthermore, the tool stand loop-back feature and the tool pneumatic module 36 comprise only fittings, couplings, and air passages—there are no valves, controller, electronics, or the like required. Only a single valve is required in the master pneumatic unit 26, to arrest the flow of any pneumatic fluid output by the Unlock Air output of the air control system 58 when the master 12 and tool 14 units are decoupled and separated.

As used herein, the term "pneumatic fluid" means pressurized gas, such as for example compressed air, operative to transfer energy in pneumatic systems. In particular, pneumatic fluid is gas at a pressure higher than ambient atmospheric pressure. In general, it is assumed that pneumatic fluid is properly conditioned, in terms of gas composition, humidity, pressure, and the like, as is properly filtered to be substantially free from particulates or contaminants.

Although described as being disposed in master and tool unit pneumatic modules 26, 36 attached to the master and tool units 12, 14, respectively, in other embodiments the pneumatic valves, pneumatic conduits, pneumatic passages, safety couplings, control signals, and the like may be disposed in the master and tool units 12, 14 themselves. Accordingly, as used herein, the term "master unit assembly" refers to, for each embodiment, either the assembly of a master unit 12 and master unit pneumatic module 26, or a master unit 12 alone that includes the operative pneumatic components of the master unit pneumatic module 26. Similarly, the term "tool unit assembly" refers to, for each embodiment, either the assembly of a tool unit 14 and tool unit pneumatic module 36, or a tool unit 12 alone that includes the operative pneumatic components of the tool unit pneumatic module 36.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic tool changer, comprising:
   a master unit assembly operative to connect to a robot;
   a tool unit assembly operative to connect to a robotic tool and further operative to align with and seat on a tool stand when the connected robotic tool is disposed in the tool stand;
   a pneumatically actuated coupler disposed in one of the master and tool unit assemblies operative to selectively couple the master and tool unit assemblies together;
   wherein pneumatic fluid operative to cause the coupler to decouple the master and tool unit assemblies is received by the tool changer from an air control system, routed from the tool changer to the tool stand, and received from the tool stand by the tool changer via a safety coupling only if the tool unit assembly is seated on, and aligned with, the tool stand, whereby the coupler can decouple only when the connected robotic tool is disposed in the tool stand.

2. The tool changer of claim 1, wherein the safety coupling comprises a female coupling member formed in the tool changer, the female coupling member comprising:
   a first bore open to the an exterior and facing the tool stand, the first bore sized and shaped to receive a corresponding male coupling member disposed on the tool stand;
   a second bore in air flow communication with the first bore, the second bore open to the exterior;
   a first sealing member disposed proximate an intersection between the first and second bores; and
   a pneumatic fluid passage connecting the first bore in air flow communication.

3. The tool changer of claim 2 wherein the first and second bores are co-axial.

4. The tool changer of claim 2, wherein, when the tool connected to the tool changer is disposed in the tool stand:
   the corresponding male coupling member on the tool stand is disposed within the first bore and at least partially within the second bore;
   the first sealing member is operative to seat against the male coupling member so as to seal the first bore from the second bore, and hence from the exterior through the second bore; and
   an exterior surface of the tool changer at the first bore is operative to seat against a second sealing member disposed on the tool stand, so as to seal the first bore from the exterior;
   whereby the first bore is sealed against the exterior, and the pneumatic fluid routed from the tool stand through air flow openings in the male coupling member and through the first bore flows through the pneumatic fluid passage; and
   whereby any misalignment of the tool changer on the tool stand causes one or both seals to fail, and the pneumatic fluid routed from the tool stand through air flow openings in the male coupling member and through the lower bore, escapes to the exterior.

5. The tool changer of claim 1 wherein
   the coupler is disposed in the master unit assembly;
   each of the master and tool unit assemblies comprises respective first and second pneumatic couplings positioned to mate in pneumatic fluid flow relationship when the master and tool unit assemblies are coupled together, and operative to transfer the pneumatic fluid between the tool unit assembly and the master unit assembly; and
   the master unit assembly includes a pneumatic fluid conduit operative to conduct the pneumatic fluid between the tool unit assembly and a decouple port of the pneumatically actuated coupler via one of the first and second pneumatic couplings.

6. The tool changer of claim 5 wherein
   the tool unit assembly further comprises third and fourth pneumatic couplings positioned to mate in pneumatic fluid flow relationship with corresponding pneumatic couplings on the tool stand when the tool connected to the tool unit assembly is disposed in the tool stand; and
   wherein pneumatic fluid supplied from the tool unit assembly to the tool stand via the third pneumatic coupling is received by the tool unit assembly from the tool stand via the fourth pneumatic coupling.

7. The tool changer of claim 1 further comprising one or more alignment pins operative to mate with corresponding alignment holes in the tool stand when the tool connected to the tool unit assembly is disposed in the tool stand.

8. An inherently safe method of detaching a robotic tool from a robot, the method comprising:
- providing the robotic tool changer according to claim 1;
- positioning the robot so as to place the tool unit assembly with the connected robotic tool in a predetermined position in the tool stand;
- receiving, by the tool changer, pneumatic fluid from the air control system;
- routing the pneumatic fluid to the tool stand;
- receiving pneumatic fluid from the tool stand via the safety coupling operative to pass the pneumatic fluid under pressure only if the tool unit assembly is seated on, and aligned with, the tool stand, and operative to bleed the pneumatic fluid to the atmosphere if the tool unit assembly is not seated on, or is misaligned with, the tool stand; and
- if the tool unit assembly is seated on, and aligned with, the tool stand, routing pneumatic fluid from the safety coupling to a decouple port of the pneumatic coupler, causing the pneumatic coupler to decouple the master unit assembly from the tool unit assembly.

9. The method of claim 8 further comprising, upon decoupling the master unit assembly from the tool unit assembly, ceasing to route pneumatic fluid to the tool stand.

10. The method of claim 9, wherein ceasing to route pneumatic fluid to the tool stand comprises closing a pneumatic fluid valve interposed between the air control system and the tool stand.

11. The method of claim 10, wherein:
- the pneumatic fluid is received from the air control system by the master unit assembly;
- the valve is disposed in the master unit assembly;
- the valve is opened by abutment to the tool unit assembly; and
- the valve is closed by action of a spring when the master unit assembly does not abut the tool unit assembly.

* * * * *